(12) United States Patent
Ngo et al.

(10) Patent No.: US 10,515,054 B2
(45) Date of Patent: Dec. 24, 2019

(54) FAST AND EFFICIENT MULTI-THREADED ALGORITHM FOR DELETING AN ARBITRARILY WIDE AND DEEP DIRECTORY TREE USING LIMITED SYSTEM RESOURCES

(71) Applicant: Hitachi Vantara Corporation, Santa Clara, CA (US)

(72) Inventors: Hoc Dinh Ngo, San Jose, CA (US); Daniel Picken, Sunnyvale, CA (US)

(73) Assignee: HITACHI VANTARA CORPORATION, Santa Clara, CA (US)

( * ) Notice: Subject to any disclaimer, the term of this patent is extended or adjusted under 35 U.S.C. 154(b) by 0 days.

(21) Appl. No.: 15/559,002

(22) PCT Filed: Jun. 19, 2015

(86) PCT No.: PCT/US2015/036774
§ 371 (c)(1),
(2) Date: Sep. 15, 2017

(87) PCT Pub. No.: WO2016/204790
PCT Pub. Date: Dec. 22, 2016

(65) Prior Publication Data
US 2018/0095984 A1  Apr. 5, 2018

(51) Int. Cl.
*G06F 16/16*   (2019.01)
*G06F 16/11*   (2019.01)
*G06F 16/188*  (2019.01)
*G06F 16/17*   (2019.01)
(Continued)

(52) U.S. Cl.
CPC .............. *G06F 16/162* (2019.01); *G06F 3/06* (2013.01); *G06F 16/11* (2019.01); *G06F 16/1727* (2019.01); *G06F 16/188* (2019.01); *G06F 21/6218* (2013.01); *G06F 2221/2143* (2013.01)

(58) Field of Classification Search
None
See application file for complete search history.

(56) References Cited

U.S. PATENT DOCUMENTS 6,826,615 B2   11/2004  Barrall et al.
7,457,822 B1   11/2008  Barrall et al.
8,224,877 B2    7/2012  Barrall et al.
(Continued)

FOREIGN PATENT DOCUMENTS

WO   2001028179 A2   4/2001
WO   2012071335 A1   5/2012

OTHER PUBLICATIONS

International Search Report and Written Opinion issued in co-pending application No. PCT/US2015/36774, dated Sep. 16, 2015, in 7 pages.

*Primary Examiner* — Matthew J Ellis
(74) *Attorney, Agent, or Firm* — Procopio, Cory, Hargreaves & Savitch LLP

(57) ABSTRACT

Example implementations described herein include systems and methods for processing the deletion of a directory that can include one or more subdirectories. In a system including a server having a hardware-side and a software-side that manages one or more storage systems or storage devices, a client may request the deletion of a directory, whereupon the processing of the directory occurs in a work queue and subtree queue for processing subdirectories.

17 Claims, 44 Drawing Sheets

(51) Int. Cl.
   *G06F 3/06*      (2006.01)
   *G06F 21/62*     (2013.01)

(56) References Cited

U.S. PATENT DOCUMENTS

| | | | |
|---|---|---|---|
| 8,738,570 | B2 | 5/2014 | Picken et al. |
| 2004/0243686 | A1* | 12/2004 | Schilders ................ H04L 29/06 709/213 |
| 2006/0059326 | A1* | 3/2006 | Aasheim ............. G06F 12/0246 711/203 |
| 2008/0016132 | A1* | 1/2008 | Merhar ................ G06F 16/162 |
| 2011/0040810 | A1* | 2/2011 | Kaplan ............... G06F 17/3007 707/822 |
| 2011/0082892 | A1* | 4/2011 | Ogasawara ............. G06F 9/526 707/819 |
| 2011/0296299 | A1* | 12/2011 | Parker ................. G06F 17/2247 715/255 |
| 2012/0150819 | A1* | 6/2012 | Lindahl ............... G06F 16/2282 707/687 |
| 2012/0271799 | A1* | 10/2012 | Barrall ................ G06F 16/1873 707/649 |
| 2013/0179395 | A1 | 7/2013 | Heman et al. |
| 2013/0346725 | A1* | 12/2013 | Lomet ..................... G06F 12/10 711/206 |
| 2014/0181053 | A1* | 6/2014 | Belanger ........... G06F 17/30002 707/687 |
| 2015/0039566 | A1* | 2/2015 | Baumann ................ G06F 9/451 707/684 |
| 2016/0140201 | A1* | 5/2016 | Cowling ............... G06F 16/273 707/614 |

* cited by examiner

OR

FAST AND EFFICIENT MULTI-THREADED ALGORITHM FOR DELETING AN ARBITRARILY WIDE AND DEEP DIRECTORY TREE USING LIMITED SYSTEM RESOURCES

CROSS-REFERENCE TO RELATED APPLICATIONS

This application is a U.S. National Stage entry of PCT Application No. PCT/US2015/036774, filed on Jun. 19, 2015. The contents of the foregoing are herein incorporated by reference in its entirety for all purposes.

BACKGROUND

Field

The present disclosure is related to storage system, and more specifically, for tree management in storage systems.

Related Art

In the related art, data storage systems often are configured to manage file systems that include huge amounts of storage space. It is common for file systems to include many terabytes of storage space spread over multiple storage devices. In such file system managing data storage systems, clients/host computers issue request packets relating to one or more access requests to objects (such as e.g. files and/or directories) of the managed file system according to one or more network protocols.

SUMMARY

Aspects of the present disclosure include a server configured to manage one or more storage systems. The server can include a first type processing device having a memory configured to store a request associated with a client for deletion of a directory tree representative of a directory stored in the one or more storage systems and a second type processing device comprising one or more programmable hardware implemented chips. The second type processing device can be configured to move the directory tree to an isolated portion of the one or more storage systems, the isolated portion configured to be inaccessible by the associated client; read each of one or more objects of the directory tree; push the each of the one or more objects of the directory tree in a work queue; for the work queue of the server not exceeding a threshold, place the each of the one or more objects of the directory tree into the work queue; for the work queue exceeding the threshold, remove all objects of the directory tree from the work queue; and for the work queue having at least one object of the one or more objects of the directory tree, pop an object of the one or more objects of the directory tree from the work queue to a thread process configured to delete a directory tree object.

Aspects of the present disclosure may further include a server configured to manage one or more storage systems. The server may involve a first type processing device having a memory configured to store a deletion request of a directory tree representative of a directory stored in the one or more storage systems; and a second type processing device having one or more programmable hardware implemented chips. The second type processing device can be configured to read one or more objects of the directory and push each of the one or more objects in a first queue; for the each of the one or more objects being indicative of a subdirectory: create a directory work item and for the first queue having a number of objects not exceeding a threshold and push the directory work item into the first queue; for the first queue having a number of objects exceeding a threshold: push the directory work item into a second queue, the second queue implemented in a last in first out manner; and remove all objects in the first queue.

Aspects of the present disclosure may further include a computer program, storing instructions for executing a process. The instructions may include storing a request associated with a client for deletion of a directory tree representative of a directory stored in one or more storage systems; moving the directory tree to an isolated portion of the one or more storage systems, the isolated portion configured to be inaccessible by the associated client; reading each of one or more objects of the directory tree; for a work queue not exceeding a threshold, pushing the each of the one or more objects of the directory tree into the work queue; for the work queue exceeding the threshold, removing all objects of the directory tree from the work queue; and for the work queue having at least one object of the one or more objects of the directory tree, popping an object of the one or more objects of the directory tree from the work queue to a thread process configured to delete a directory tree object. The instructions may be stored in a non-transitory computer readable medium.

DETAILED DESCRIPTION

Figure 1:
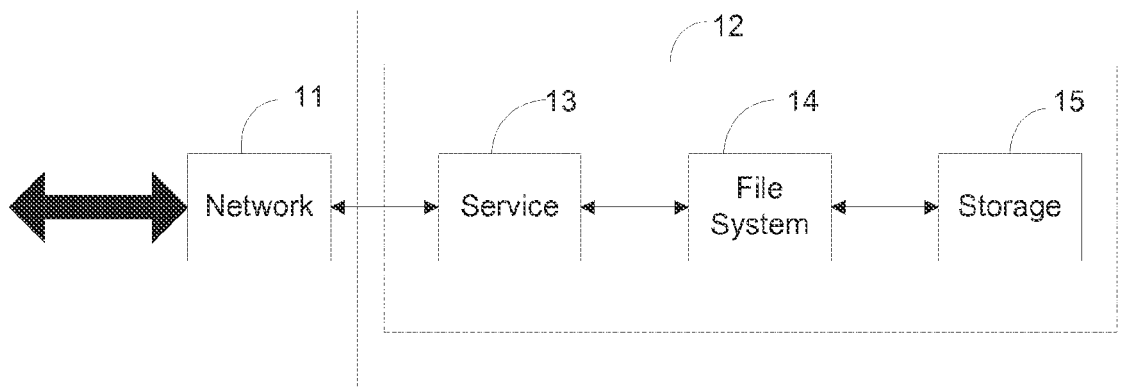
FIG. 1 is a logical block diagram of a file server to which various example implementations of the present disclosure can be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In example implementations, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In example implementations, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in example implementations, file systems are managed using a hierarchy of virtual storage constructs referred to as ranges, stripesets, and spans. File system functionality of a file server may include object management, free space management (e.g. allocation) and/or directory management.

A "range" is composed of either a primary SD on its own or a primary/secondary SD pair that are supposed to contain identical data and therefore offer the same storage capacity as a single SD.

A "stripeset" is composed of one or more ranges.

A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" or "storage block" is a unit of storage in the file system that corresponds to portion of physical storage in which user data and/or system data is stored. A file system object (discussed below) generally includes one or more blocks. A "data block" is a unit of data (user data or metadata) to be written to one storage block.

FIG. 1 is a logical block diagram of a file server to which various example implementations of the present disclosure can be applied. A file server of this type is described in U.S. Pat. No. 7,457,822, entitled "Apparatus and Method for Hardware-based File System" which is incorporated herein by reference in its entirety for all purposes and PCT application publication number WO 01/28179 A2, published Apr. 19, 2001, entitled "Apparatus and Method for Hardware Implementation or Acceleration of Operating System Functions" which is incorporated herein by reference in its entirety for all purposes. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. Further, each of the various modules may be hardware implemented or hardware accelerated.

Figure 2:
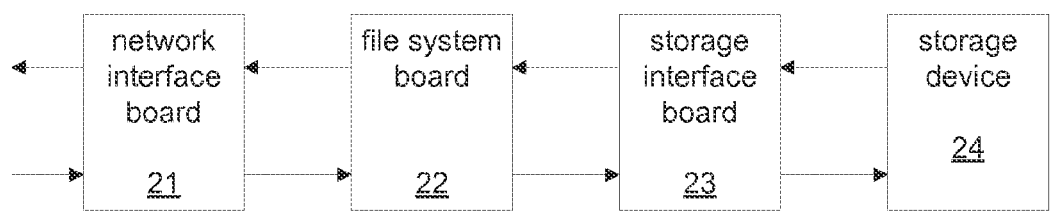
FIG. 2 is a logical block diagram of an implementation of FIG. 1, in accordance with an example implementation.

FIG. 2 is a logical block diagram of an implementation of FIG. 1, in accordance with an example implementation. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is incorporated herein by reference in its entirety for all purposes. However, in an alternative implementation, the service module 13, file system module 14, and storage module 15 of FIG. 1 can be implemented integrally on a singular board such as a board having a single field programmable array chip (FPGA). In yet another alternative implementation, the network interface board 21 can be configured on a first board which is separate from the file system board 22 and storage interface board 23 which are configured together on a second board. It should be noted that the present disclosure is in no way limited to these specific board configurations or any particular number of boards.

Figure 3:
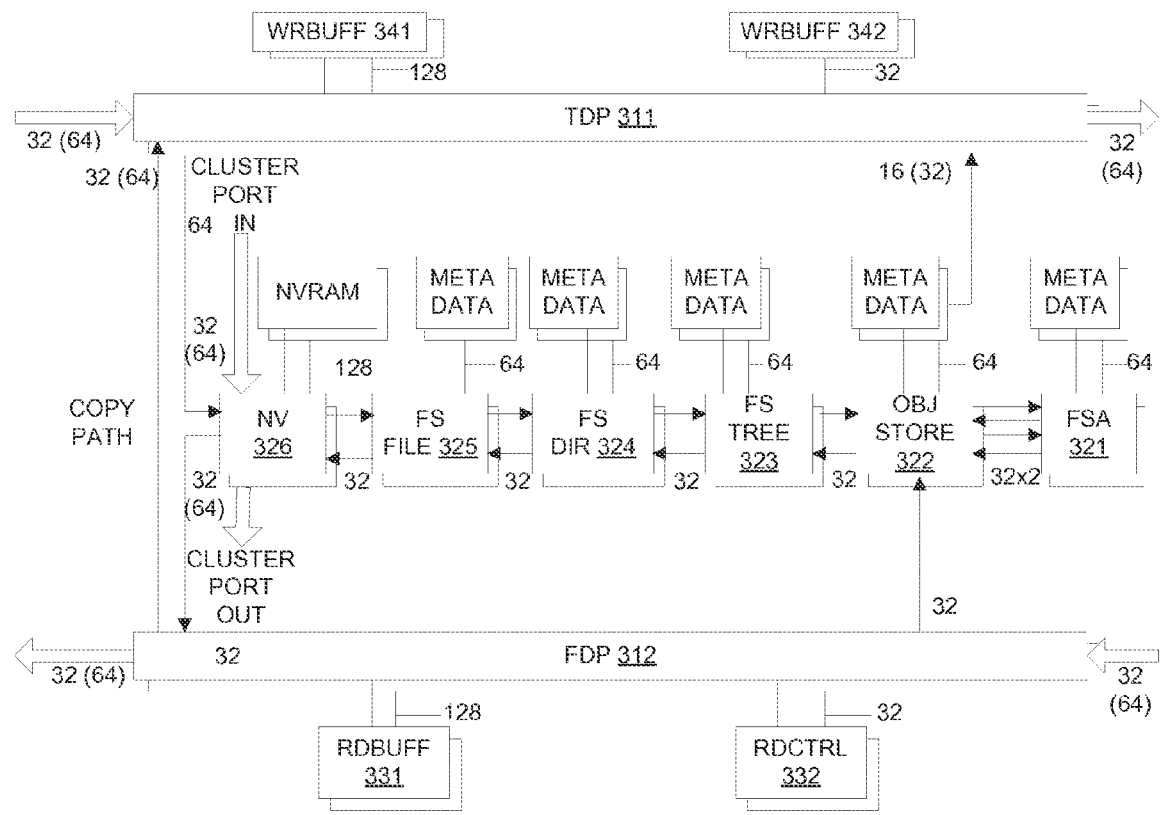
FIG. 3 is a block diagram of an implementation of a file system module in accordance with an example implementation.

FIG. 3 is a block diagram of an implementation of a file system module in accordance with an example implementation. The file system module implementation may be used in systems of the type described in FIGS. 1 and 2. Example bus widths for various interfaces are shown, although it should be noted that the present disclosure is in no way limited to these bus widths or to any particular bus widths.

The data flow in this example implementation is shown by upper bus 311, which is labeled TDP, for To Disk Protocol, and by lower bus 312, which is labeled FDP, for From Disk Protocol, such Protocols referring generally to communication with the storage module 15 of FIG. 1 as may be implemented, for example, by storage interface board 23 of FIG. 2. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

Figure 4:
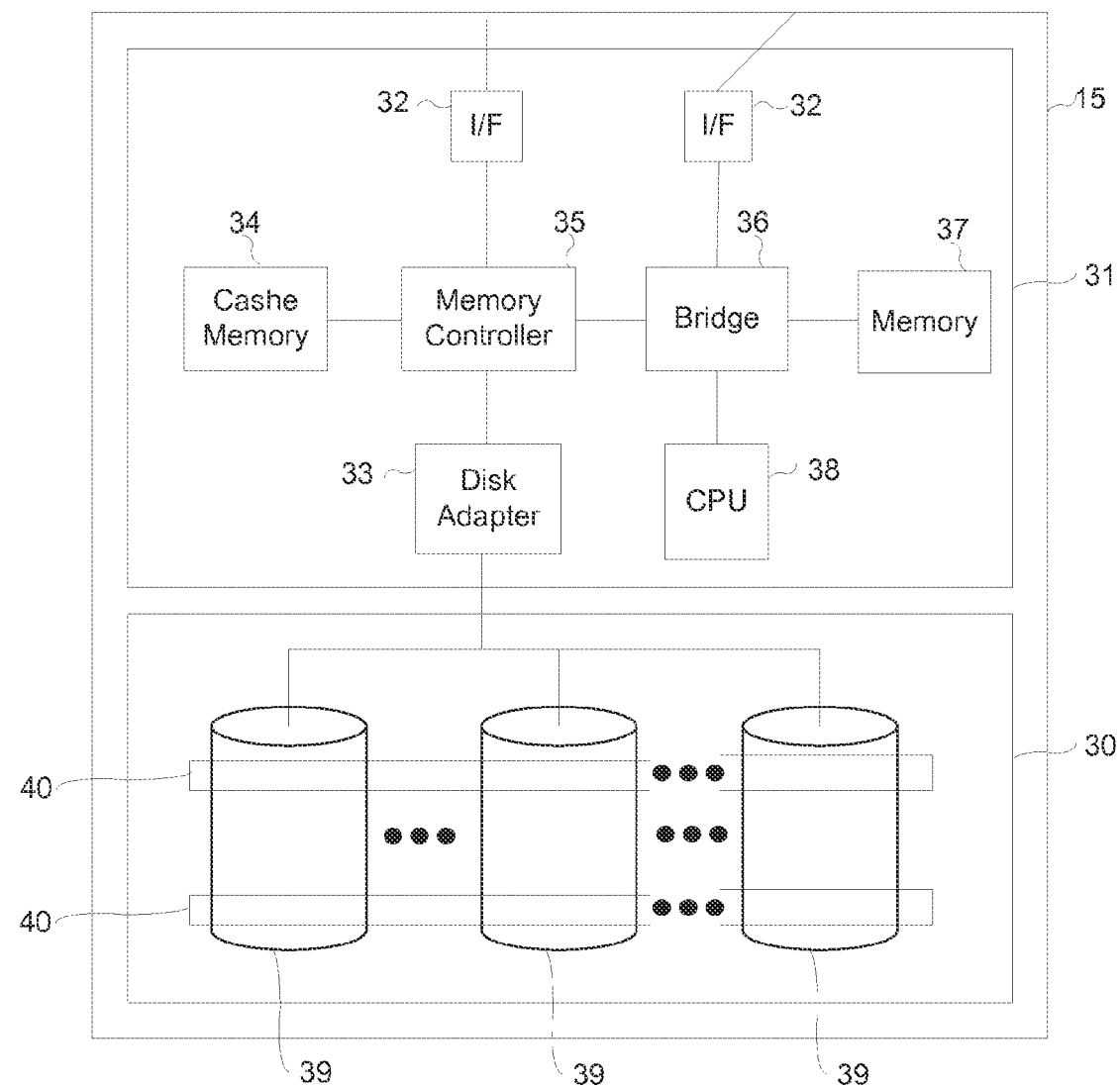
FIG. 4 illustrates a detailed physical block diagram of a storage module 15 according to an example implementation.

FIG. 4 illustrates a detailed physical block diagram of a storage module 15 according to an example implementation. The storage module 15 is configured by a storage part 30 configured from a plurality of hard disk drives 39, and a control unit 31 for controlling the hard disk drives (otherwise referred to as a disk) 39 of the storage part 30.

The hard disk drive 39, for instance, is configured from an expensive disk drive such as an FC (Fibre Channel) disk, or an inexpensive disk such as an SATA (Serial AT Attachment) disk drive or an optical disk drive or the like. One or more logical volumes are defined in the storage areas (hereinafter referred to as "RAID groups") 40 provided by one or more of the hard disk drives 39. Data from the host system 2 is accessed (read from and written into) the logical volumes 26 in block units of a prescribed size.

A unique identifier (Logical Unit Number: LUN) is allocated to each logical volume 26. In the case of this implementation, the input and output of data are performed by setting the combination of the foregoing identifier and a unique number (LBA: Logical Block Address) that is allocated to the respective logical blocks as the address, and designating this address.

The control unit 31 comprises a plurality of interfaces (I/F) 32, a disk adapter 33, a cache memory 34, a memory controller 35, a bridge 36, a memory 37, and a CPU 38.

The interface 32 is an external interface used for sending and receiving write data, read data and various commands to and from the storage system 15. The disk adapter 33 is an interface to the storage part 21, and, for example, is used for sending and receiving write data, read data or various commands to and from the storage part 30 according to a fibre channel protocol.

The cache memory 34, for instance, is configured from a nonvolatile semiconductor memory, and is used for temporarily storing commands and data to be read from and written into the storage part 30. The memory controller 35 controls the data transfer between the cache memory 34 and the memory 37, and the data transfer between the cache memory 34 and the disk adapter 33. The bridge 36 is used for sending and receiving read commands and write commands and performing filing processing and the like between the memory controller 36 and the CPU 38, or between the memory controller 36 and the memory 37.

In addition to being used for retaining various control programs and various types of control information, the memory 37 is also used as a work memory of the CPU 38. The CPU 38 is a processor for controlling the input and output of data to and from the storage part 30 in response to the read command or write command, and controls the interface 34, the disk adapter 33, the memory controller 35 and the like based on various control programs and various types of control information stored in the memory 37.

Returning to FIG. 3, a series of separate sub-modules of the file system module handle the tasks associated with file system management. Each of these sub-modules may have its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit map.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files. File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name, this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

The Non-Volatile Storage Processing sub-module 326 interfaces with associated non-volatile storage (called NVRAM in FIG. 4) to provide a method for recovery in the event of power interruption or other event that prevents cached data—which is slated for being saved to disk—from actually being saved to disk. In particular, since, at the last checkpoint, a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

Figure 7:
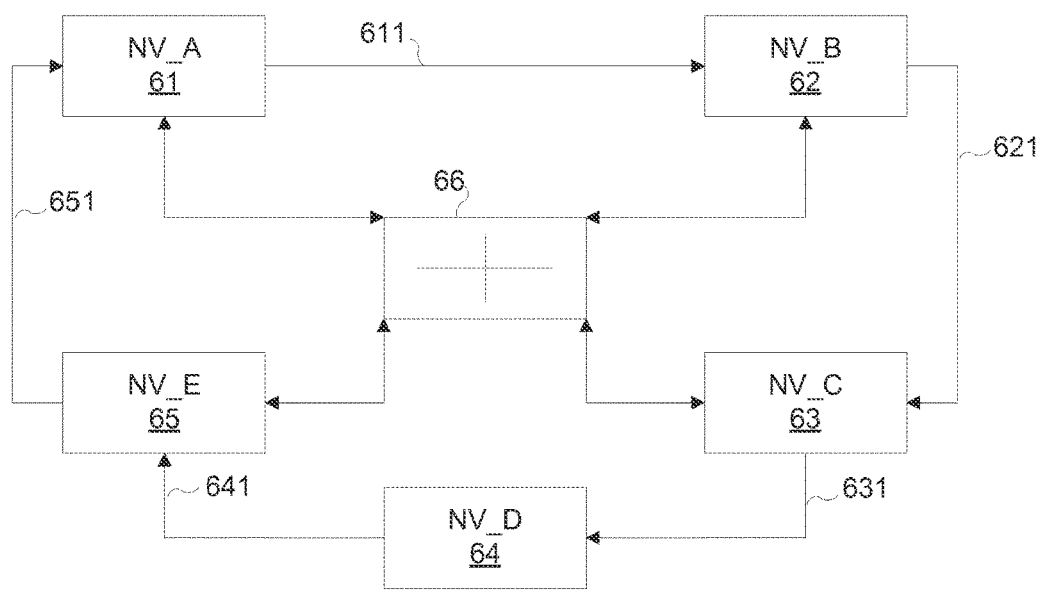
FIG. 7 is a block diagram of a clustered file server arrangement in accordance with an example implementation wherein non-volatile memory is mirrored in a virtual loop configuration.

When file server systems are clustered, non-volatile storage may be mirrored using a switch to achieve a virtual loop. FIG. 7 is a block diagram of a clustered file server arrangement in accordance with an example implementation wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

Figure 5:
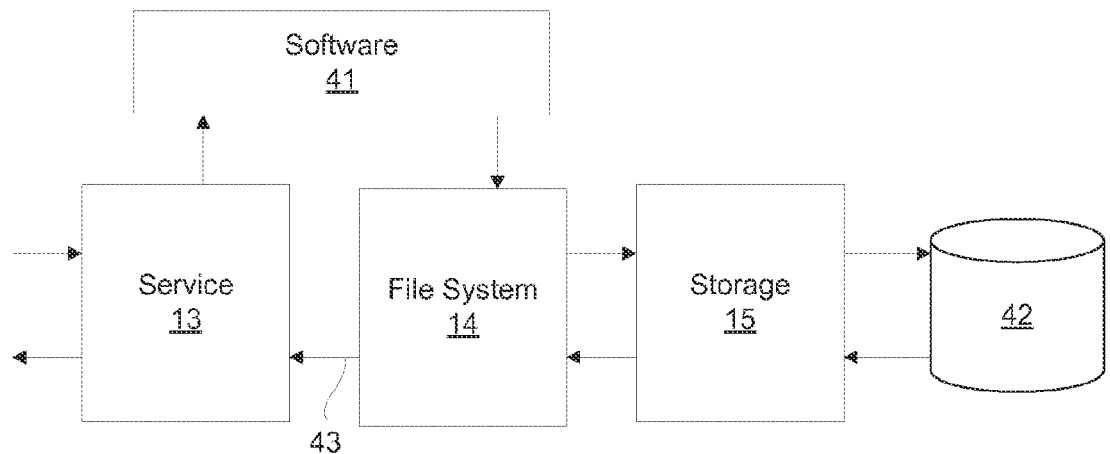
FIG. 5 is a block diagram showing how control flow may be used in example implementations to permit automatic response by the file service module to a network request without prior intervention of software control.

FIG. 5 is a block diagram showing how control flow may be used in example implementations to permit automatic response by the file service module to a network request without prior intervention of software control. In FIG. 5, there is shown service module 13, file system module 14, and storage module 15, as in FIG. 2, with service module 13 and file system module 14 under the control of software 41 and with storage module 15 in communication with storage arrangement 42. The connections between blocks represent control flows rather than data flows. On identification of a file service request by service module 13, the request is typically passed from the service module 13 to software control 41, for example, to handle security and other complex tasks. Then under software control 41, the request is processed by the file system module 14. On the other hand, the response to a file system request, which is not necessarily as complex, is routed from the file system module 14 directly back to the service module 13 over control flow 43 rather than being routed back through software control 41. The software control 41 is eventually informed that the request has been satisfied.

Figure 6:
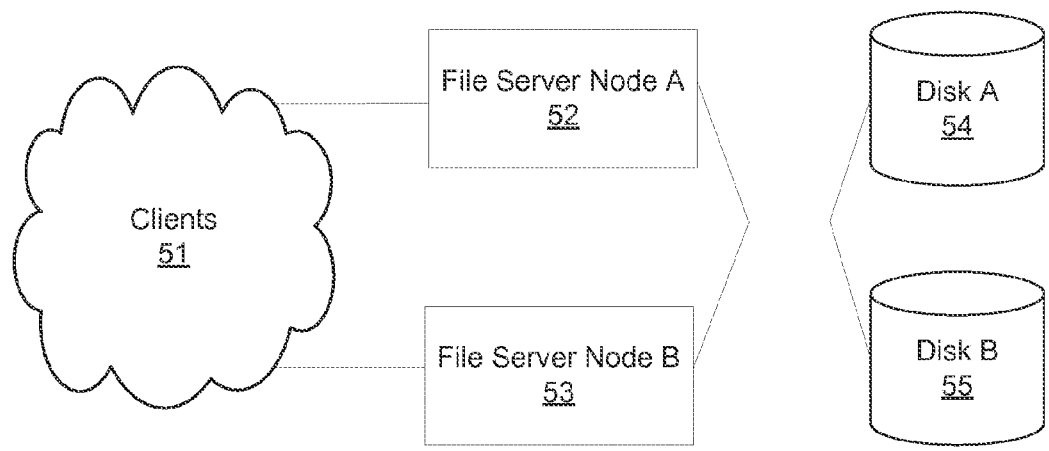
FIG. 6 is a block diagram of a clustered file server arrangement having sector cache locking in accordance with an example implementation.

In a cluster of file server nodes accessing common storage, it is necessary to deal with instances wherein multiple nodes may seek to perform conflicting tasks with respect to a common storage location. FIG. 6 is a block diagram of a clustered file server arrangement having sector cache locking in accordance with an example implementation. In this example implementation, file server node A (item 52) and file server node B (item 53), are both in communication with clients 51 and are configured so that each server node may access (that is, read from and write to) both disk A (item 54) and disk B (item 55). Disks A and B are arbitrary storage designators, and are not limited to single disks and also include the use of several disks, or a particular region on a single disk drive, and the mode of storage is any device suitable for, including but not limited to, magnetic and magneto-optical.

When file server systems are clustered, non-volatile storage may be mirrored using a switch to achieve a virtual loop. FIG. 7 is a block diagram of a clustered file server arrangement in accordance with an example implementation wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). The Non-Volatile Storage Processing sub-modules 326 interface with associated non-volatile storage (called NVRAM in FIG. 4) to provide a method for recovery in the event of power interruption or other event that prevents cached data—which is slated for being saved to disk—from actually being saved to disk. Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module. In order to prevent overflow of NVRAM, a checkpoint is forced to occur, for example, whenever the amount of data in NVRAM has reached a pre-determined threshold. A checkpoint is only valid until the next checkpoint has been created, at which point the earlier checkpoint is no longer considered current.

Example File System

Figure 8:
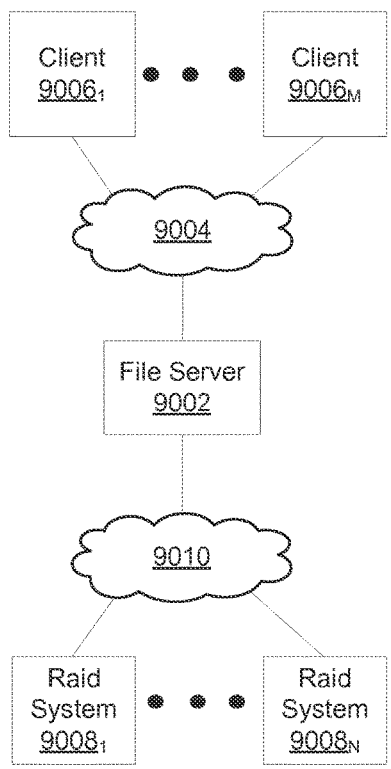
FIG. 8 is a schematic block diagram of a file storage system in accordance with an example implementation.

FIG. 8 is a schematic block diagram of a file storage system in accordance with an example implementation. The file storage system in FIG. 8 is also described in WO 2012/071335 and U.S. application Ser. No. 13/301,241 entitled "File Cloning and De-Cloning in a Data Storage System", which was filed on Nov. 21, 2011, and are incorporated herein by reference in its entirety for all purposes.

Among other things, the file storage system includes a number of file servers (a single file server 9002 is shown for the sake of simplicity and convenience) in communication with various client devices 90061-9006M over a communication network 9004 such as an Internet Protocol network (e.g., the Internet) and also in communication with various RAID systems 90081-9008N over a storage network 9010 such as a FibreChannel network. The client devices 90061-9006M and the file server 9002 communicate using one or more network file protocols, such as CIFS and/or NFS. The file server 9002 and the RAID systems 90081-9008N communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more file systems. The file server 9002 can be configured to allow client access to portions of the file systems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based file system including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more).

File System Tree Structure

The file server 9002 stores various types of objects in the file system. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the file system is managed using a tree structure having root node (referred to as a dynamic superblock or DSB) that is preferably stored at a fixed location within the storage system. Among other things, storing the DSB at a fixed location makes it easy for the file server 9002 to locate the DSB. The file server 9002 may maintain multiple DSBs to store different versions of the file system representing different checkpoints (e.g., a current "working" version and one or more "checkpoint" versions). In an example implementation, the DSB includes a pointer to an indirection object (described in detail below), which in turn includes pointers to other objects.

Figure 9:
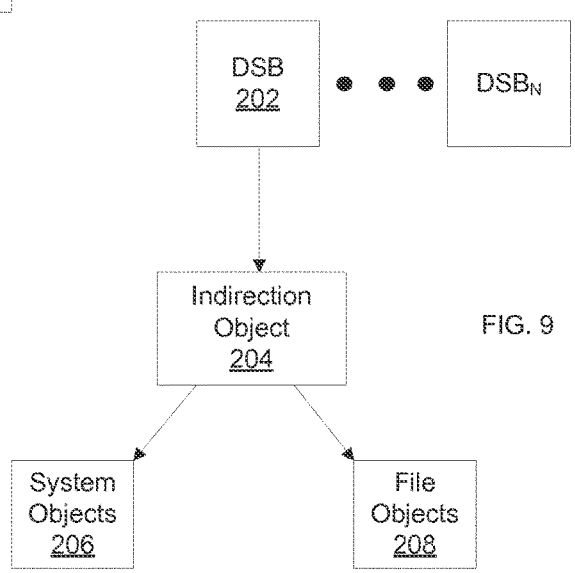
FIG. 9 is a schematic block diagram showing the general format of a file system instantiation in accordance with an example implementation.

FIG. 9 is a schematic block diagram showing the general format of a file system instantiation in accordance with an example implementation. The DSB 202 is a special structure that represents the root of the file system tree structure. Among other things, the DSB 202 includes a pointer to an indirection object 204, which in turn includes pointers to other objects in the file system including system objects 206 and file objects 208.

In example implementations. N dynamic superblocks (N>2) are maintained for a file system, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an example implementation, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the file system, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 10:
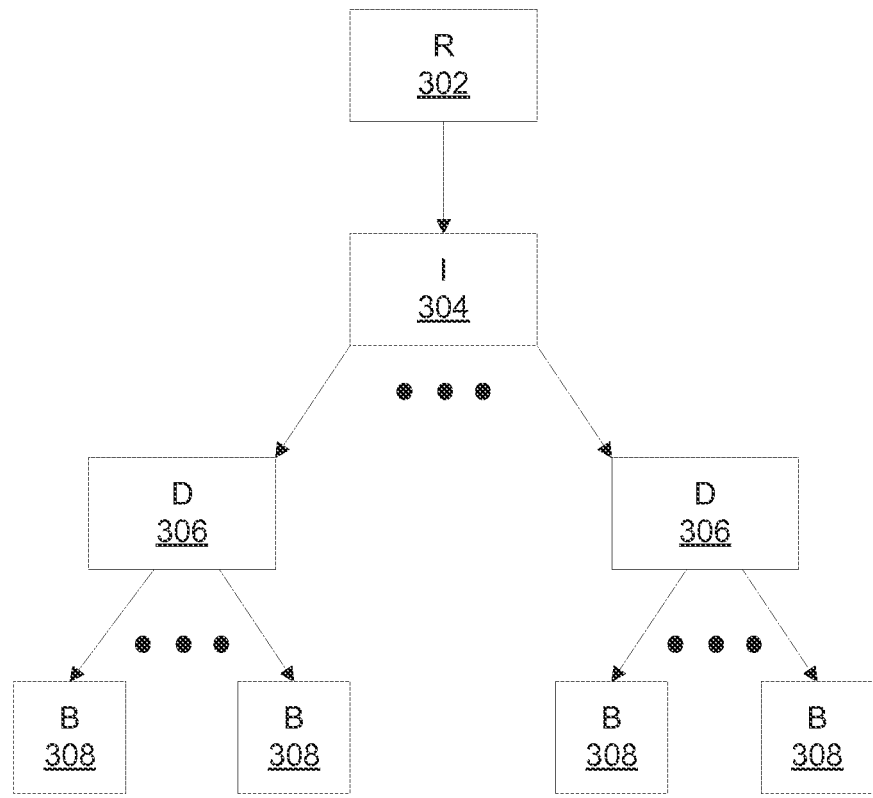
FIG. 10 is a schematic block diagram showing the general format of an object tree structure in accordance with an example implementation.

FIG. 10 is a schematic block diagram showing the general format of an object tree structure in accordance with an example implementation. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 11:
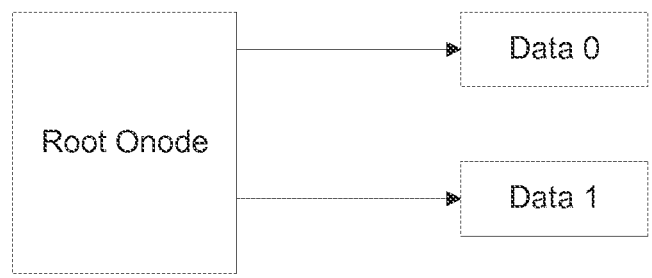
FIG. 11 is an exemplary block diagram showing use of a root onode with no other onodes in accordance with an example implementation.

As data is added to the object, it is first of all put into data blocks pointed to directly from the root node. This is illustrated in the diagram of FIG. 11, showing use of a root node with no other nodes. Note that, for the sake of simplicity in this and all the following diagrams, the root node and direct node are shown as having only two data pointers, and the indirect node is shown as only having two indirect or direct node pointers.

Figure 12:
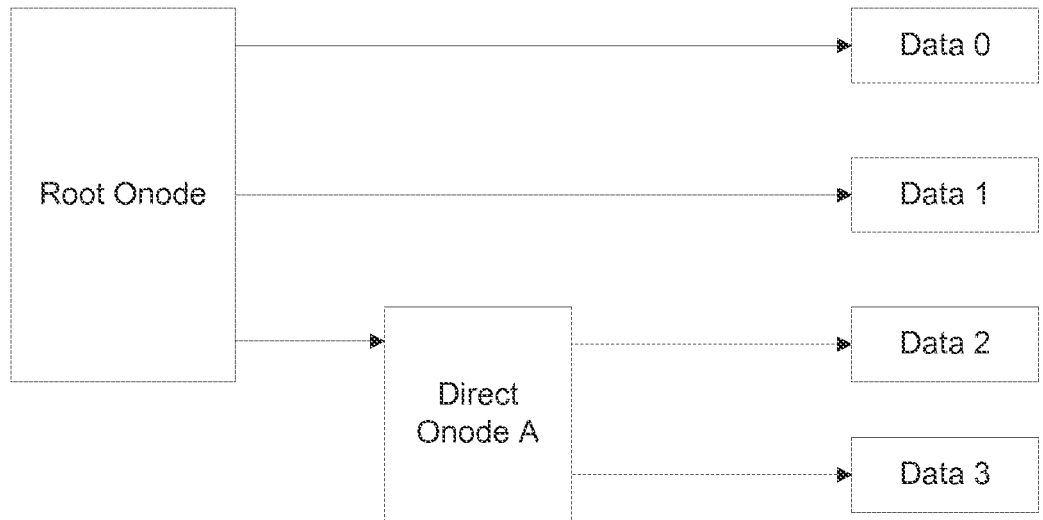
FIG. 12 is an exemplary block diagram showing employment of a root onode with a direct onode in accordance with an example implementation.

Once all the direct block pointers in the root node are filled, then a direct node A is created with a pointer from the root node to the direct node. FIG. 12 shows employment of a root node with this direct node A. Note that the root node has multiple data block pointers but only a single pointer to either a direct or an indirect node.

Figure 13:
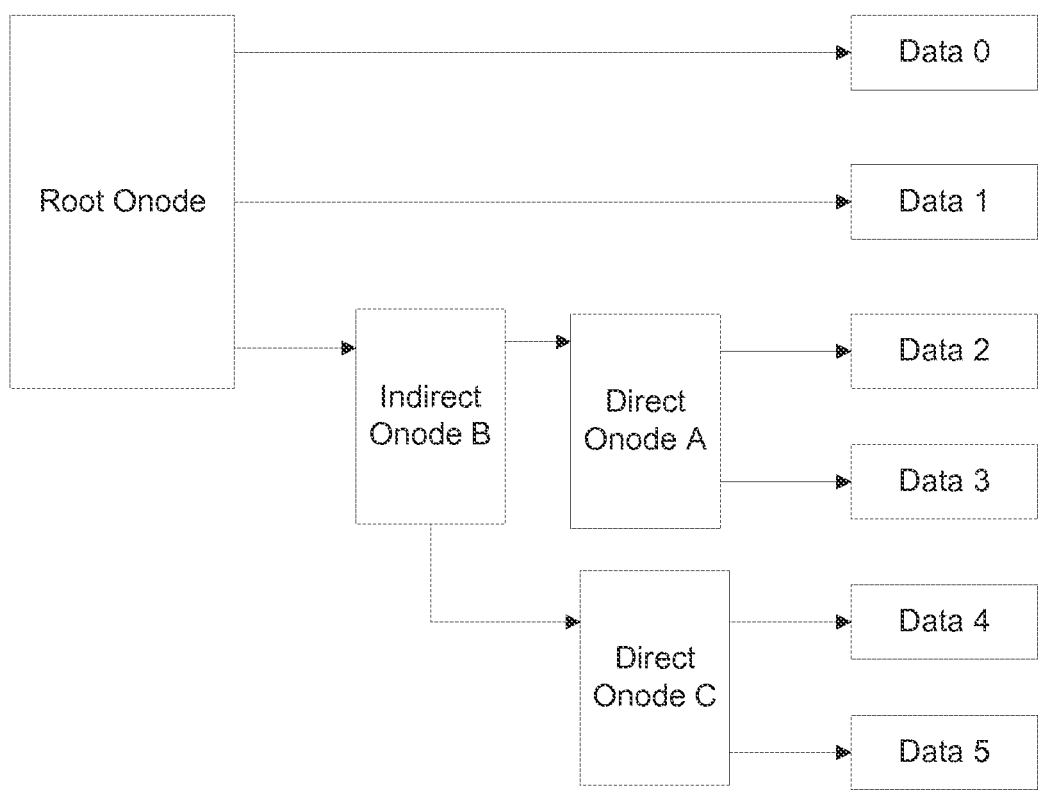
FIG. 13 is an exemplary block diagram showing employment of a root onode with an indirect onode as well as direct onodes in accordance with an example implementation.

If the data in the object grows to fill all the data pointers in the direct node, then an indirect node B is created, as illustrated in FIG. 13. FIG. 13 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 14:
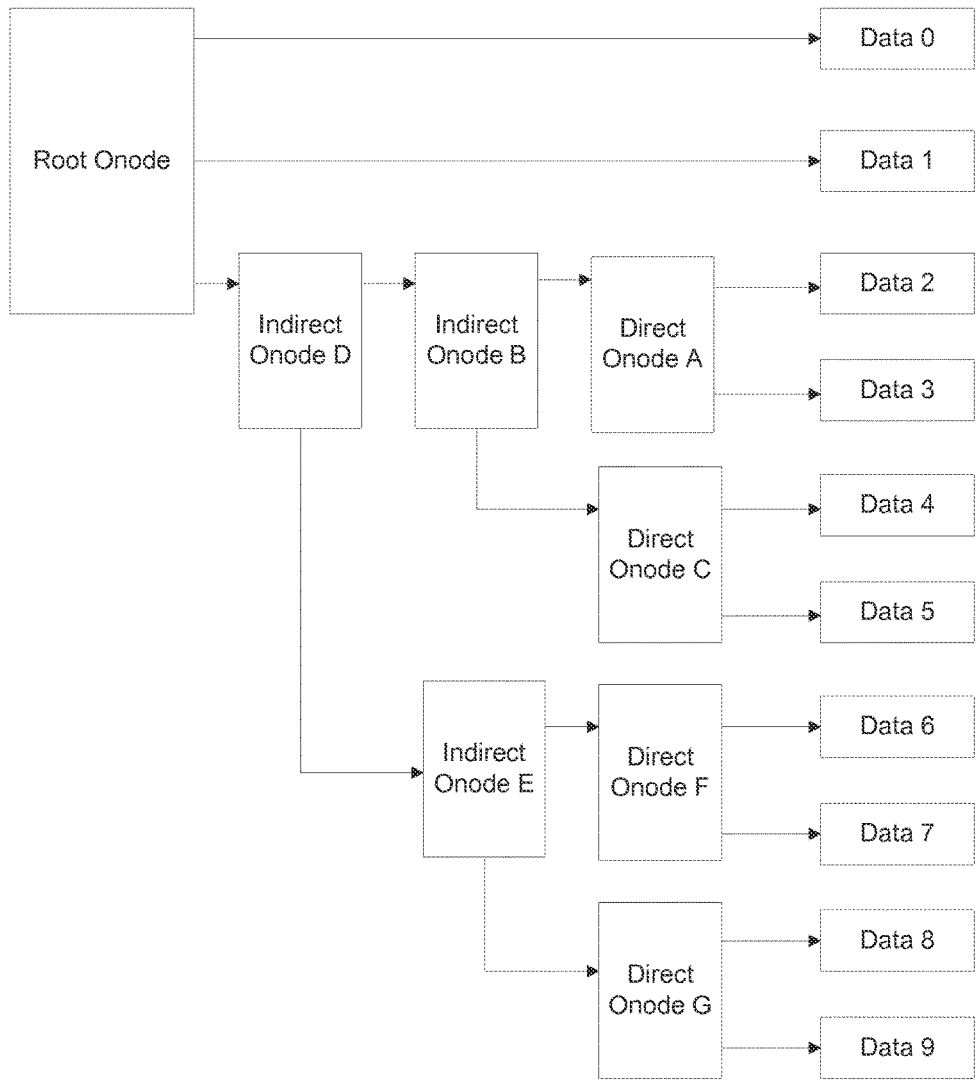
FIG. 14 is an exemplary block diagram illustrating use of multiple layers of indirect onodes placed between the root onode and the direct onodes in accordance with an example implementation.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 14, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an example implementation, the checkpoint number at which the object was created is also stored in the object root node. Also in the object root node is a parameter to identify the type of object for which the object root node is providing metadata. The object type may, for example, be any of a free space object, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct no Node structure may also be established, in an example implementation, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an example implementation, a portion of the object root node is reserved for storage of file attributes.de as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

More generally, the following structures for storage of file attributes are defined in an example implementation:
  enode (little overhead to update, limited capacity). This structure is defined in the object root node and is 128 bytes in an example implementation.
  software metadata object (expensive in overhead to update, near infinite capacity). This is a dedicated object for storage of metadata and therefore has its own storage locations on disk; the object is identified in the enode.

Thus, in an example implementation, each object root node stores the following types of information:
  The checkpoint number.
  The data length for this version of the object.
  The number of levels of indirection used in the runlist for this object.
  The type of the object. This is primarily used as a sanity check when a request comes in to access the object.
  A pointer to an older root node version made for a retained checkpoint (if there is one).
  A pointer to a newer root node version (will only be valid if this is a copy of a root node made for a retained checkpoint).
  Up to 16 data block pointers per root onode. Each data block descriptor includes a pointer to a data block, the checkpoint number, and a bit to say whether the block is zero filled.
  A single pointer to either a direct node or an indirect node.
  The 128 bytes of enode data for this object.
  A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:
  The checkpoint number.
  Pointers to either indirect or direct nodes (e.g., up to 60 such pointers).
  A CRC and various sanity dwords to allow the indirect node to be checked for validity.

As discussed above, the direct node provides direct pointers to data blocks on the disk. The following information is stored in the direct node in an exemplary embodiment:
  The checkpoint number.
  A number of data block descriptors (e.g., up to 62 such descriptors). Each data block descriptor includes a pointer to a data block, the checkpoint number, and a bit to say whether the block is zero filled.
  A CRC and various sanity dwords to allow the indirect node to be checked for validity.

As data is deleted from the object and data blocks and direct and indirect nodes are no longer required, they are returned to the free space allocation controller.

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

Figure 15:
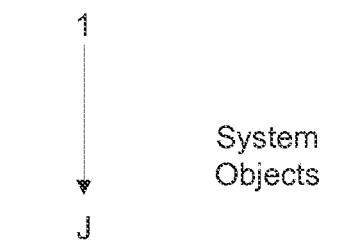
FIG. 15 illustrates a representation of object number assignments for an example implementation.

FIG. 15 illustrates a representation of object number assignments for an example implementation. Specifically, the file system may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

Figure 16:
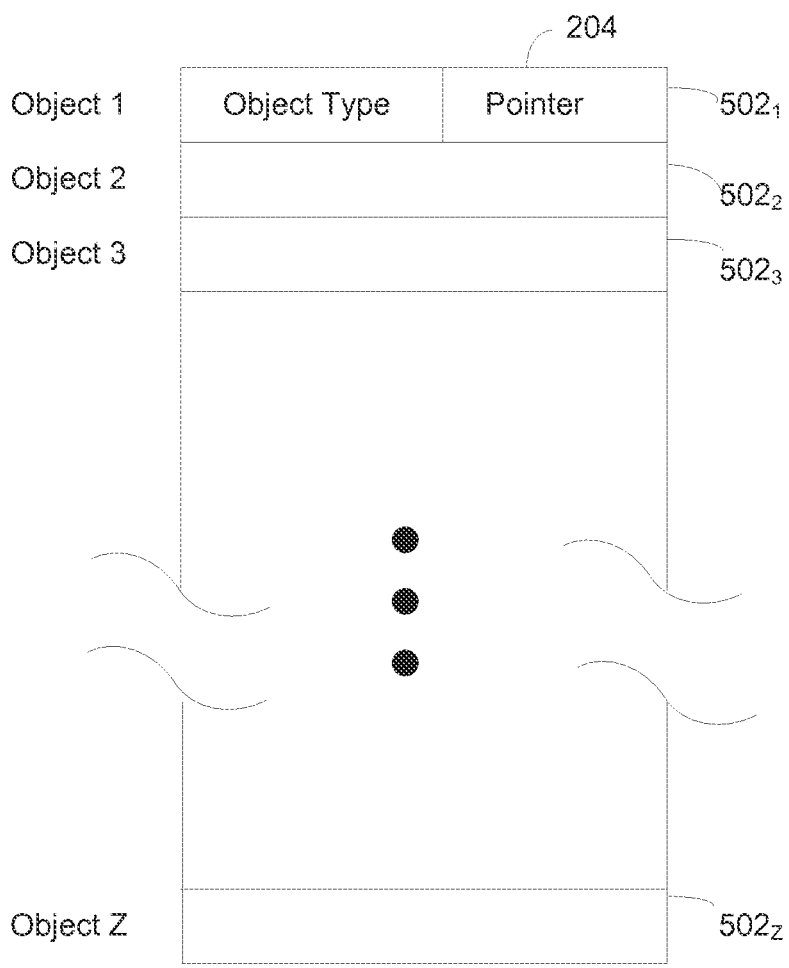
FIG. 16 is an exemplary schematic block diagram showing the general format of the indirection object in accordance with an example implementation.

In an example implementation, the indirection object 204 is logically organized as a table, with one table entry per object indexed by object number. As illustrated in FIG. 16, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

In an example implementation, the indirection object may be implemented as a "pseudo-file" having no actual storage blocks. In an example implementation, instead of having pointers to actual data blocks in the object tree structure (e.g., as shown in FIG. 9), such pointers in the indirection object tree structure point to the root nodes of the corresponding objects. Thus, in an example implementation, the indirection object maps each object number to the sector address of the root node associated with the corresponding file system object. The indirection object tree structure can then be traversed based on an object number in order to obtain a pointer to the root node of the corresponding object.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 17:
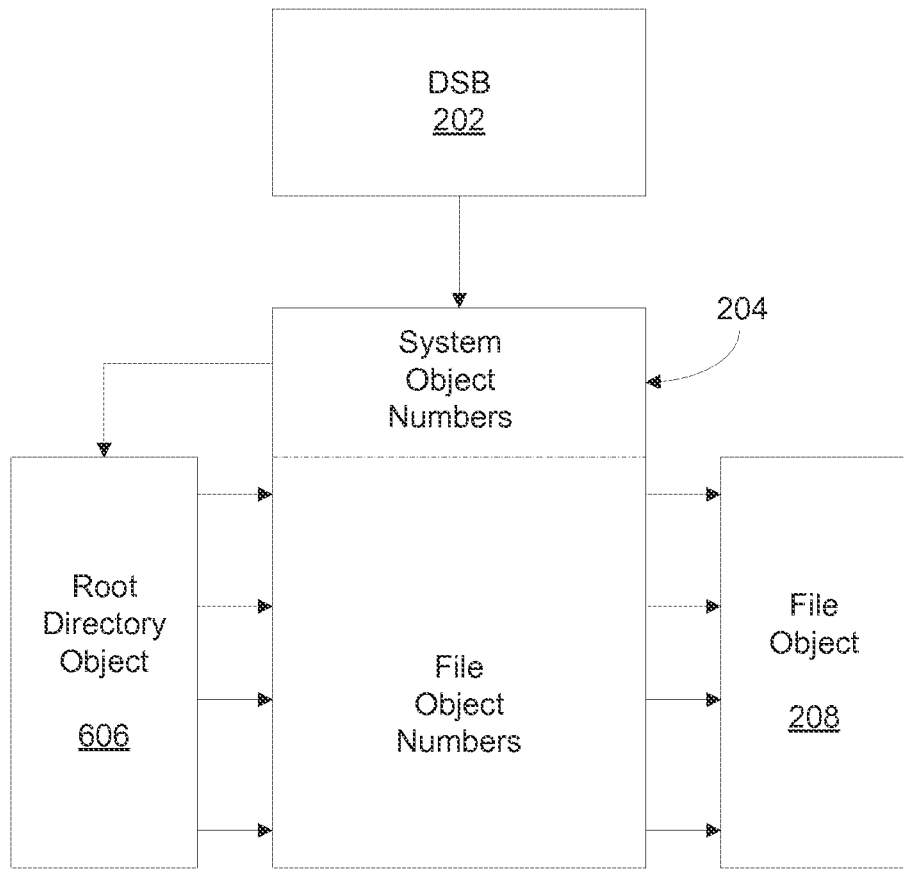
FIG. 17 is an exemplary schematic block diagram demonstrating the general relationship between the DSB, the indirection object, the root direction object, and the file objects, in accordance with an example implementation.

FIG. 17 is a schematic block diagram demonstrating the general relationship between the DSB 202, the indirection object 204, the root directory object 606, and the file objects 208, in accordance with an example implementation. As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

Directory Tree Management

For root directory objects having a tree structure as described above, example implementations also facilitate a tree delete feature which provides a mechanism for removing a directory tree from its position in the file system. The tree delete feature can implemented with multithreads that can process a queue that has directory work items, where the queue size can be limited to a maximum count configurable by the operator (e.g. a maximum of M=5000 directory work items).

For deletion purposes two data structures are defined, one to describe the tree delete job and one to describe a directory to be processed for deletion.

The first data structure is a job object associated with a tree delete job request by a client. The job object contains information such as the job ID, the tree object number, the "active" subtree object number, the job status. In general, a tree delete job can proceed in multiple stages such that one and only one subtree can be processed for deletion in each stage. The subtree being processed for deletion is called the job's active subtree. That is why the job object defines a tree object number to store the object number of the job's original tree root directory, and an "active" subtree object number to store the object number of the root directory of the subtree that is currently active. Note that when the server receives a tree delete job request, it will assign the request a new job ID and create a new job object, where it sets both the tree object number and the active subtree object number to the same value. It also initializes the job status to "waiting". When the job is processed later by tree delete workers, the job status will be changed to "executing". When the job processing ends, the job status will be marked as "done" if the entire original directory tree is deleted successfully, or "failed" otherwise.

The second data structure is to describe a directory for deletion. A directory in a subtree is described by a data structure called the directory work item, which includes details such as the directory object number, the subtree object number, a priority level that is one higher than the immediate parent directory, a work item status (work item processing is done or not done), a work item state (work item is resigned from the work queue or not).

To delete a directory D, example implementations first create a work item for D and push it onto the work queue. Later, a tree delete worker will pop the work item off the queue and apply the deletion algorithm to process it. In general, the worker will enumerate entries in D and process one entry at a time. If the entry is a file, the worker will delete the file. If the entry is a directory, the worker will create a new work item for it and push onto the work queue. In this way, all of the workers will continuously pop work items off the priority work queue, or create and push new work items onto the queue.

Figure 18:
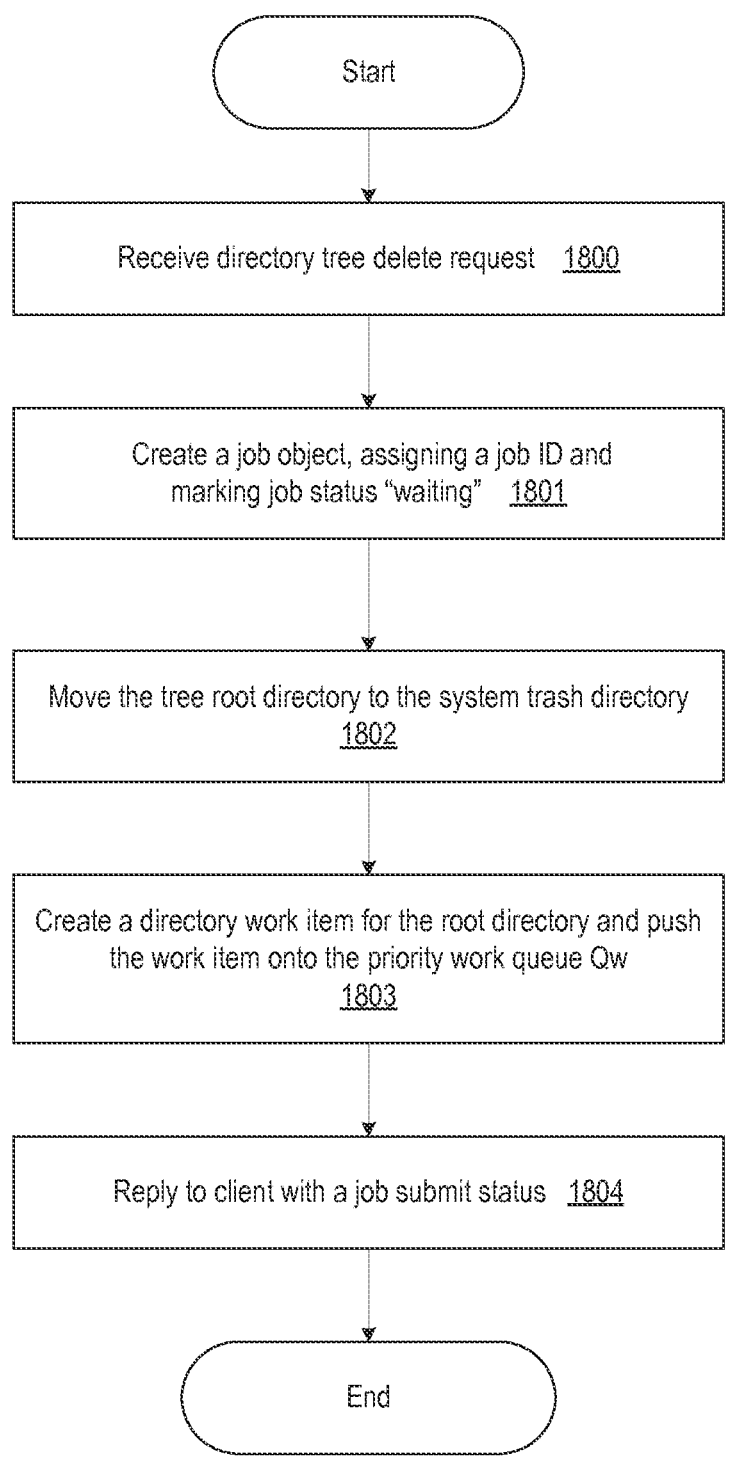
FIG. 18 schematically shows how a directory tree delete job request is converted to a directory work item in the priority work queue in accordance with an example implementation.

The first directory work item of a tree delete job is always created and pushed by a different fiber called the tree delete server. FIG. 18 schematically shows how a directory tree delete job request is converted to a directory work item in the priority work queue in accordance with an example implementation. Specifically. FIG. 18 illustrates the flow diagram for a server handling a tree delete job request. Upon receipt of a tree delete job request at 1800, the server creates a job object associated with the request at 1801, where it assigns a new job ID and marks the job status as "waiting" when initializing the job object as described previously. Next, the server moves the directory tree to the system trash directory at 1802. The server then creates a directory work item associated with the job's tree root directory and pushes it onto the priority work queue Qw at 1803. Finally, the server replies to the client with a job submit status at 1804.

Note that in this example implementation, the server does not delete any directory. Rather, its main mission is to create the first work item for the job and push it onto the work queue, relegating the deletion of the entire directory tree to the pool of N tree delete workers. When this first work item is later processed by a tree delete worker, the tree delete algorithm will cause the entire directory tree to be traversed in the depth-first manner as described below.

In an example of a tree delete algorithm, suppose the tree delete worker pool has N=20 workers dedicated to processing all directory work items on the work queue. By design, all idle tree workers in the pool always watch for work to do from the work queue.

As soon as work items appear in the priority work queue, where the highest priority work item is always at the front of the queue, one random idle worker will pop the front work item off the work queue to process for deletion.

Figure 19:
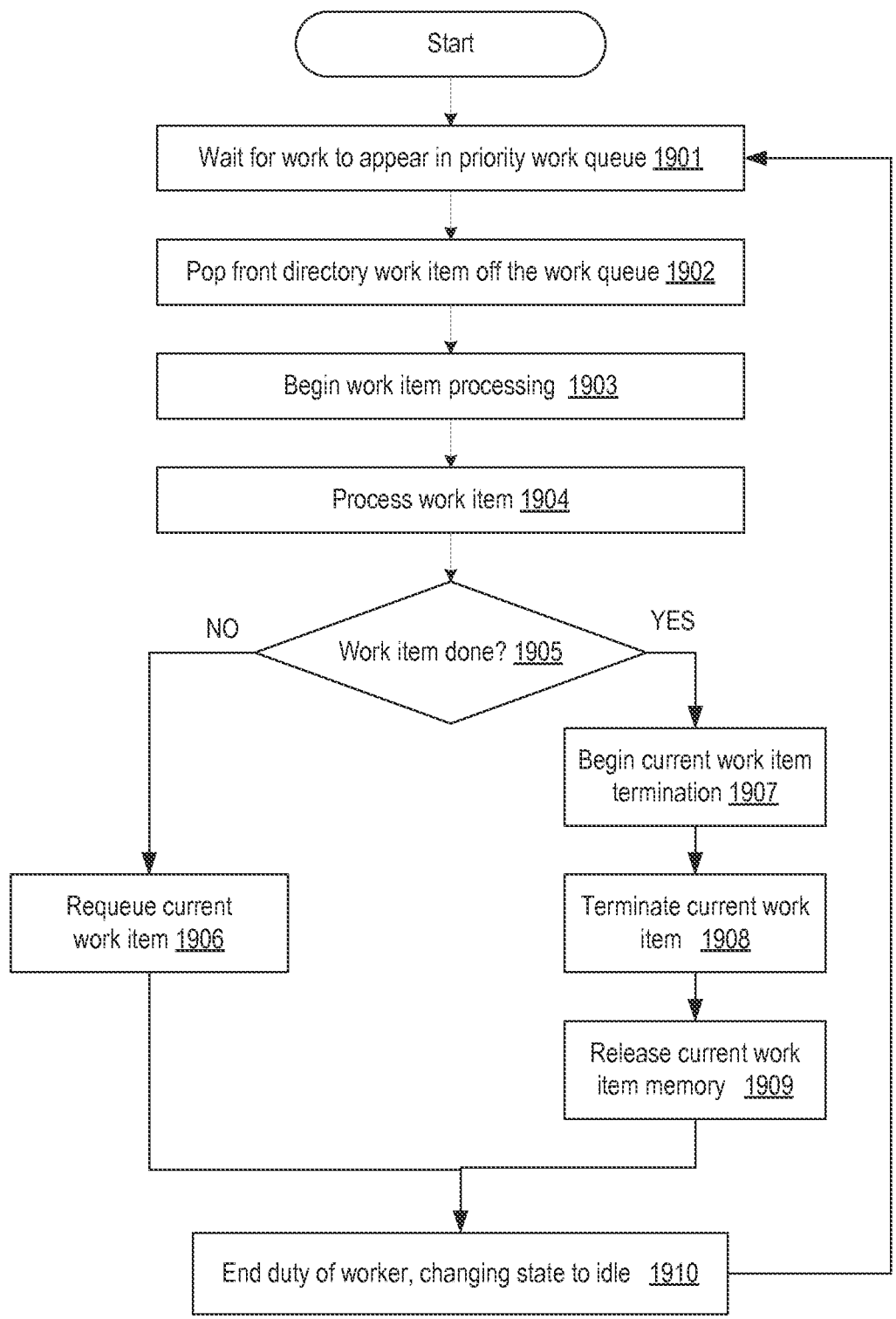
FIG. 19 illustrates an example duty cycle of a tree delete worker in accordance with an example implementation.

FIG. 19 illustrates an example duty cycle of a tree delete worker in accordance with an example implementation. The tree delete worker is normally in the idle state at 1901, waiting for work to appear in the work queue. If the queue has work items, the worker will transition immediately to a busy state by proceeding to 1902 to pop the front work item off the work queue.

The work item processing phase begins at 1903 and the main actions occur at 1904. The goal at 1904 is to unlink the directory that is specified in the work item. The details of the work item processing phase at 1904 are illustrated in detail in FIG. 20. After this phase is completed, the worker checks the work item status at 1905. If the status is "not done" (NO, e.g. because the directory is not empty), the worker will requeue the current work item at 1906 and end its duty at 1910. Otherwise (YES), the worker begins the current work item termination phase at 1907.

The termination phase attempts to update the work item state, job status, and trigger subtree processing if any. The implementation of the termination phase 1908 is illustrated in detail in FIGS. 22 and 25. Once the termination phase is done, the worker releases the current work item memory at 1909 and ends its duty at 1910 by changing its working state to idle and going back to 1901 to begin a new cycle.

From the example implementations above, it is shown that within a cycle a tree delete worker can drain or load the work queue. The work queue can never become full if the tree has less than M subdirectories or if the rate of draining the work queue is faster than loading. The second scenario usually occurs for a very shallow tree; in this case the root directory can be arbitrarily wide.

In general, an arbitrarily wide and deep tree can cause the work queue to be full, which will fail the tree deletion process. There are many solutions to the issue. For example, in a first example implementation, the tree delete job can be failed. In a second example implementation, there is an identification of a hierarchy of subtrees of reasonable lengths (e.g., as defined by the operator) whereupon the subtrees are trimmed one subtree at a time, starting from the deepest subtree. A third example implementation is to move all newly encountered directories to the root level whenever the free tree delete heap pool resources are exhausted (or reach a certain low level threshold). A fourth example implementation is to not use the work queue at all.

The first and second example implementations described above have the same general flowchart in FIG. 19. However, the expanded views of certain phases can be different. The specific differences are captured in FIGS. 20-22 for the first described example implementation, and FIGS. 20, 23-25 for the second described example implementation.

First Example Implementation of a Tree Delete Method Algorithm

The entire flowchart in FIG. 19 applies to the first example implementation as described above. The differences lie in the detailed flowcharts that are described in subsequent figures for the first example implementation to support failing the tree delete job gracefully when the tree delete heap pool resources are all used up.

Figure 20:
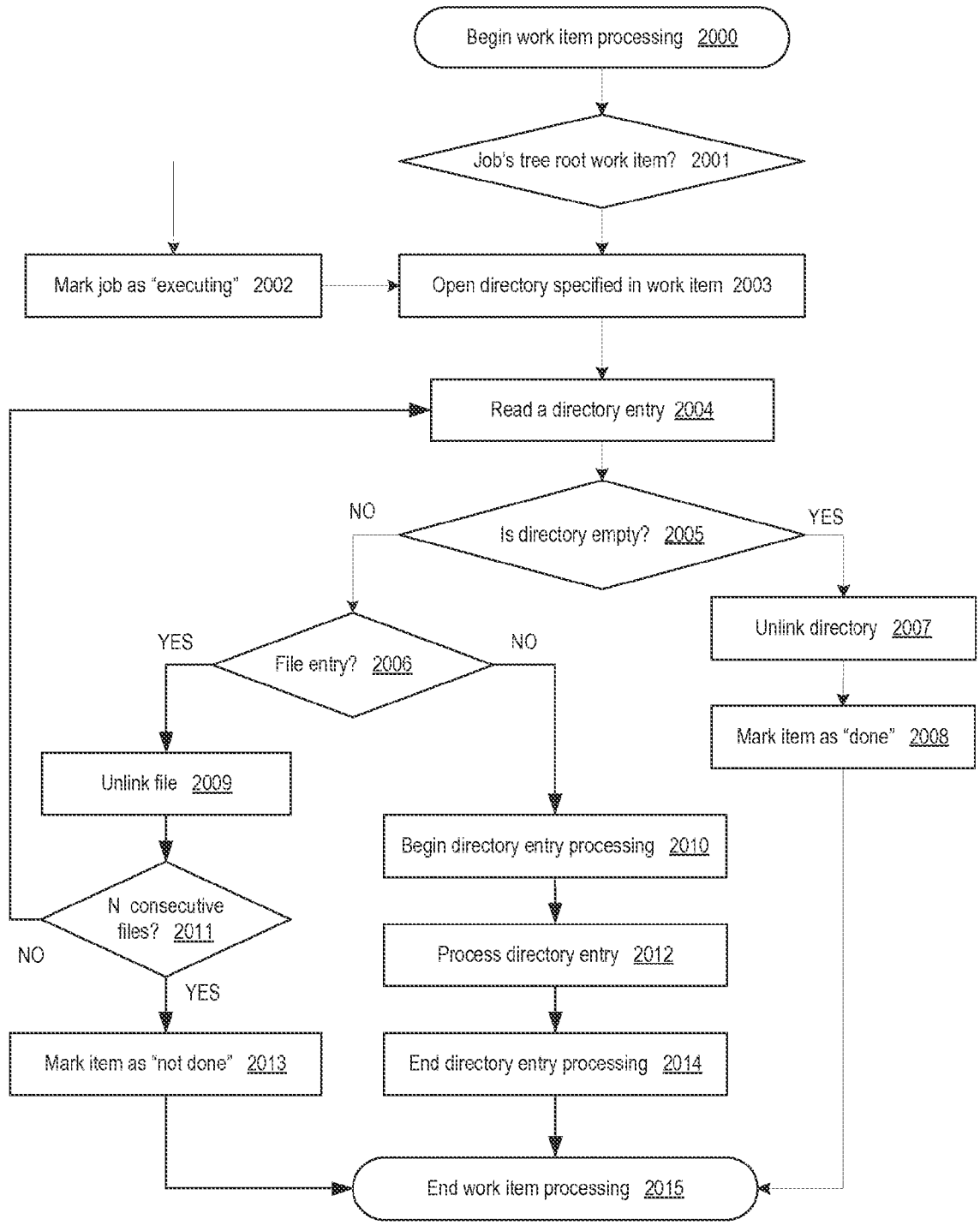
FIG. 20 illustrates the detailed work item processing phase, in accordance with an example implementation.

FIG. 20 illustrates the detailed work item processing phase, in accordance with an example implementation, that is represented by the flow at 1903 and 1904 of FIG. 19. This phase begins immediately when the front work item is popped off the work queue at 1902. The worker will determine at 2001 if this is the first ever work item of a tree delete job by comparing the directory object number in the work item with the job's tree object number in the job object. If so (YES), it will change the job status from "waiting" to "executing" at 2002.

Next, the worker opens the directory specified in the work item at 2003 to read a directory entry at 2004 and checks the result if the directory is empty at 2005. If so (YES), the worker will unlink the directory at 2007, mark the work item status as "done" at 2008, and proceed to 2015 to end the work item processing phase. Otherwise (NO), it will determine if the entry is a file at 2006.

If the entry is a file (YES), the flow proceeds to 2009 wherein the worker unlinks the file. Note that the worker also keeps a counter of consecutive files that it has deleted so far for the current work item. This counter is not shown in the flowchart. The worker checks if this counter reaches the limit N (the same value as the number of tree delete workers) at 2011. If (NO), the worker proceeds to 2004 to read the next directory entry. Otherwise (YES), the worker proceeds to 2013 to mark the work item as "not done" and end the phase at 2015. Marking "not done" is necessary to force the worker to traverse in the depth-first manner. This can be seen in the flow at 1906 in FIG. 19, where the worker will proceed to 1910 and 1901 to begin another cycle. In the new cycle, the priority of the work item will be either equal to, or greater than, the priority of the work item in the last cycle. If greater, it means the worker is descending to the next directory level.

If the entry is a directory (NO), the worker will proceed to 2010 to begin the directory entry processing phase. The implementation of the directory entry processing phase 2012 is described with respect to FIG. 21, and is common to both the first and the second example implementations as described above. When this phase ends at 2014, the worker will conclude the work item processing phase at 2015. The ending of the work item processing is common to both the first and the second example implementations as described above.

Figure 21:
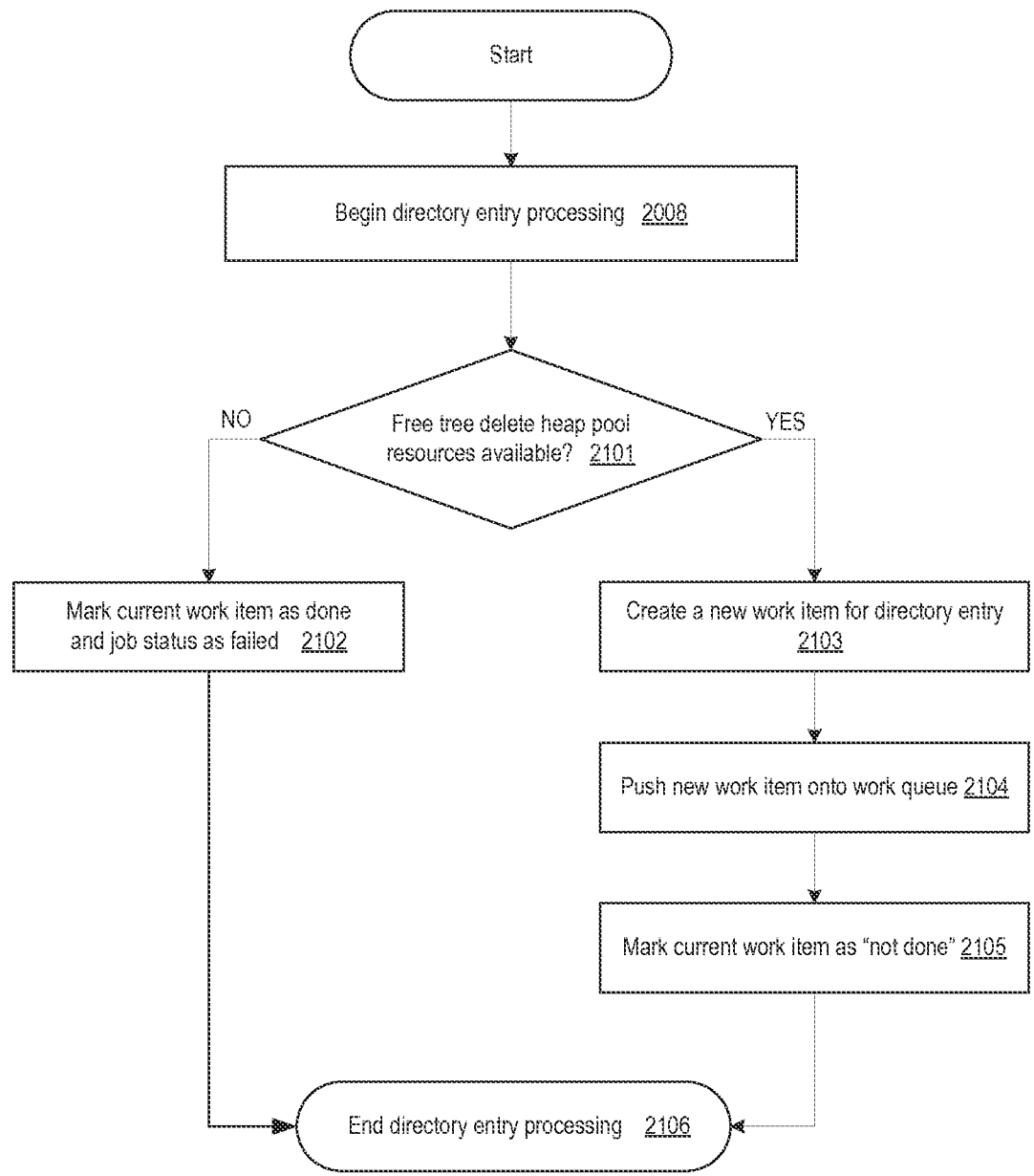
FIG. 21 shows the detailed directory entry processing phase in accordance with an example implementation.

FIG. 21 shows the detailed directory entry processing phase in accordance with the second example implementation. Specifically, FIG. 21 expands on the flow at 2008 and 2010 of FIG. 20. First, the worker checks if there are free tree delete heap pool resources at 2101.

If the resources are available (YES), the worker will proceed to 2103 to create a new work item for the directory entry and push it onto the work queue at 2104. It then proceeds to mark the current work item as "not done" at 2105, and end the phase at 2106. Note that the process at 2103 is common to both the first and the second example implementations as described above. If the resources are not available (NO), the worker will fail the job as designed for the first example implementation. To this end, it proceeds to 2102 to mark the work item as "done" and the job status as "failed", then end the phase at 2106.

Figure 22:
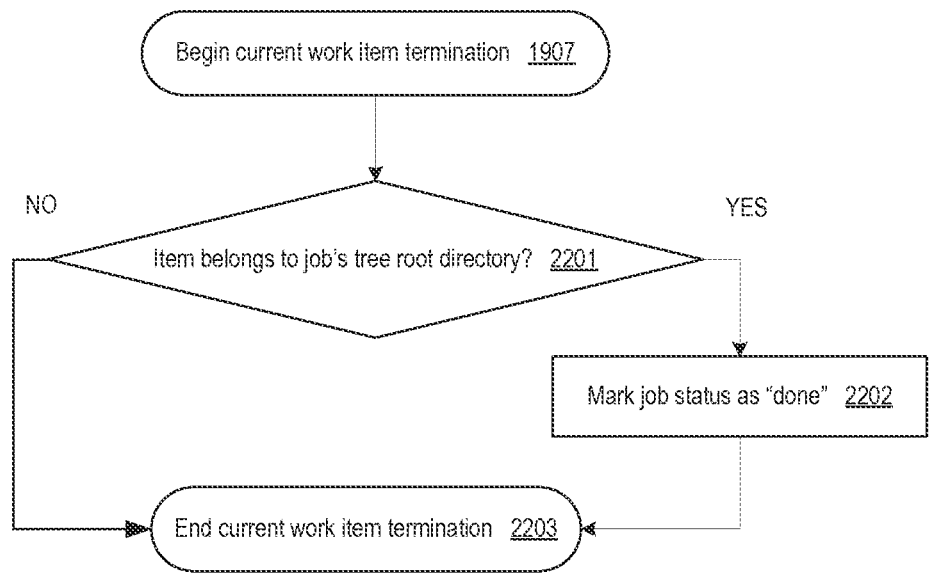
FIG. 22 illustrates an example transfer to a system trash directory, in accordance with an example implementation.

FIG. 22 shows the detailed view of the current work item termination phase in accordance with the first example implementation. In particular, FIG. 22 illustrates the expansion of the flow at 1907 and 1908 of FIG. 19 for the first and second example implementations. The worker will check at 2201 if the work item belongs to the job's tree root directory by comparing the directory object number in the work item and the job's tree object number in the job object. If they are equal (YES), the worker will proceed to 2202 to mark the job status as "done" and end the phase at 2203. If they are not equal (NO), the current work item is not at the job's tree root directory yet and hence the job deletion is still in progress. Thus, the worker proceeds to 2203 to end the current work item phase. Once the phase is ended, the worker will proceed to 1909 in FIG. 19 to release the current work item memory and end its duty at 1910.

Second Example Implementation for a Tree Delete Algorithm

The entire flowchart in FIG. 19 applies to the second example implementation. The differences lie in the detailed flowcharts in other figures that are specifically marked to support multiple subtrees. The algorithm for the second example implementation is as follows.

Basically, the original tree is descended by all workers in depth-first order. Whenever the tree delete heap pool resources are drained to a critical low limit (the minimum free allocations threshold is chosen to be equal to the number of workers, i.e., N=20), the first worker that experiences the limit will be responsible for setting up a new subtree and marking the current tree as "abandoned".

The first worker experiencing the limit sets up a new subtree by choosing the parent directory P of the current work item of the worker as the root of a new subtree. It then creates a new work item for this new subtree and pushes it onto a special First-In-Last-Out (FILO, i.e. last in first out) queue called the subtree queue. This worker then marks the current tree as "abandoned" by changing the active subtree object number in the job object to the new subtree object number, which is the object number of the parent directory P.

Once the active subtree object number is changed, if a work item is popped off the work queue, the work item will be immediately recognized by its processing worker that it belongs to an abandoned subtree. This is because the subtree object number in the work item no longer matches the active subtree object number in the job object. The processing worker then marks the work item state as "resigned" (i.e., resigned from the deletion process) to allow it to move to the termination phase where the work item will be destroyed to release memory back to the pool. Thus, all remaining work items in the work queue, one after another, will be popped off and destroyed in the same way. This destruction process is very fast because it involves no media access. When it ends, the work queue is empty so the total heap pool allocations consumed come from the subtree queue only, which is subject to the limit M/2. Thus, there will be at least M/2 free allocations in the tree delete heap pool available to service the next subtree.

Figure 23:
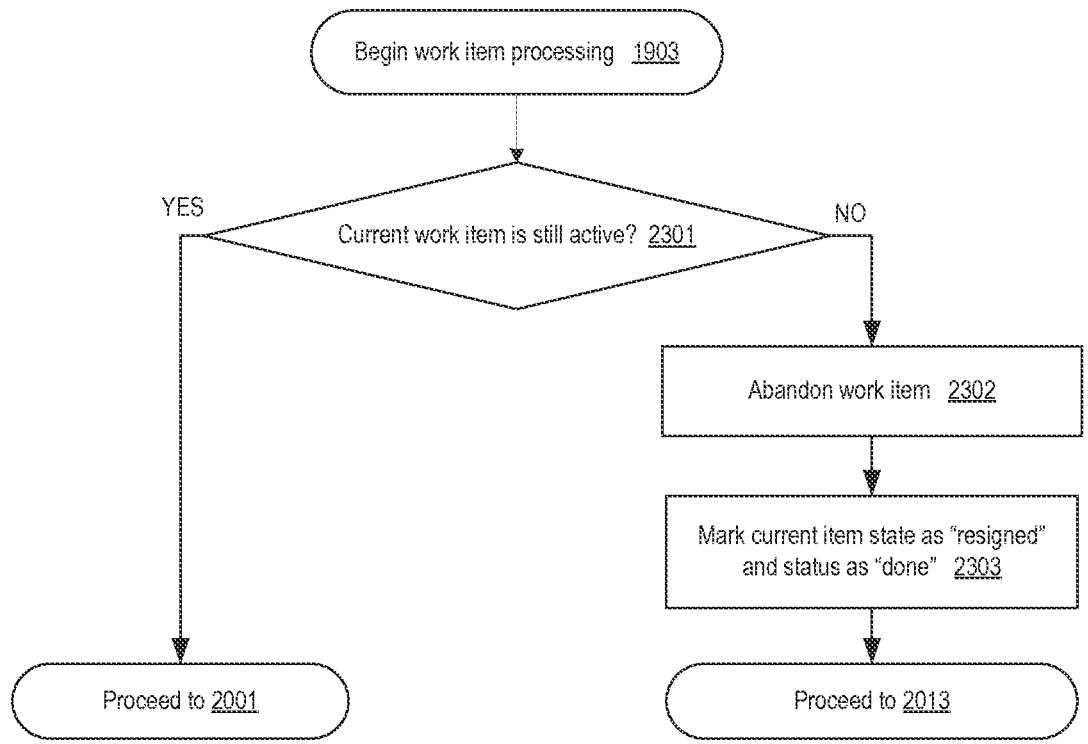
FIG. 23 shows how a worker executes the work item processing phase, in accordance with an example implementation.

FIG. 23 shows how a worker executes the work item processing phase, in accordance with the second example implementation. Specifically. FIG. 23 is an expansion of the flow at 1903 and 1904 of FIG. 19. After popping a work item off the work queue, the worker checks at 2301 if the item belongs to an active subtree by comparing the subtree object number in the work item and the active subtree object number in the job object.

If the two subtree object numbers match (YES), the work item belongs to the currently active subtree and the worker proceeds to 2001 in FIG. 20. If they do not match (NO), the worker will proceed to 2303 to abandon the work item by marking its state as "resigned" and its status as "done". It then proceeds to 2013 in FIG. 20 to end the work item processing phase. Note some aspects of the flow diagram in FIG. 20 are common to both the first and the second example implementations, as indicated in the description above.

Figure 24:
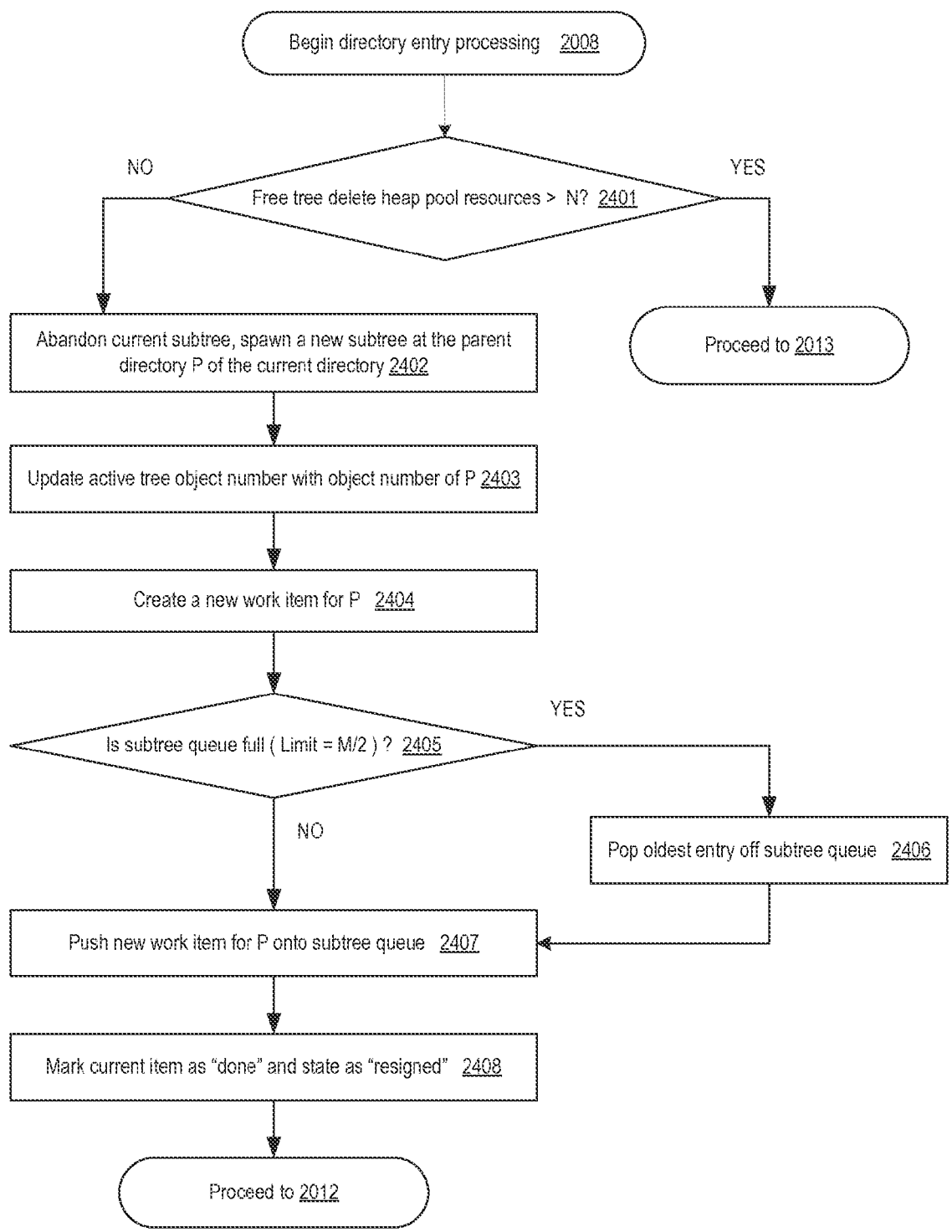
FIG. 24 shows the directory entry processing phase, in accordance with an example implementation.

FIG. 24 shows the directory entry processing phase, in accordance with the second example implementation. Specifically, FIG. 24 illustrates an expanded view of the flow of 2008 and 2010 of FIG. 20. The worker first checks if the amount of free tree delete heap pool resources is greater than the minimum free resources threshold at 2401. This threshold is chosen to be N, the number of tree delete workers. In general, the threshold can be chosen to be N or greater to ensure that each worker can obtain an allocation to create a new work item as described shortly at 2404.

If the amount of free heap pool resources is abundant (YES), the worker will proceed to 2103 in FIG. 21 to create a new work item for the directory entry, then push it onto the work queue at 2104, mark the current work item as "not done" at 2105 (actually, the current work item has not changed its "not done" status since its creation), and end the phase. Otherwise (NO), the worker proceeds to 2402 to abandon the current subtree and spawn a new subtree as follows.

The root of the subtree to be spawned will be chosen to be the parent directory P of the directory specified in the current work item. The worker will update the job's active subtree object number with the object number of P at 2403 and create a new work item for P at 2404. This creation is possible because a small number of resources are still available due to the condition at 2401. The worker then checks at 2405 if the subtree queue is full based on its limit of M/2, which is 2500 in the example implementation. If so (YES), the worker will pop the oldest entry off the subtree queue at 2406 to make room for the new work item. Finally, the worker will push the new work item onto the subtree queue at 2407. Because the current subtree is abandoned, the worker marks the current work item at 2408 as "done" and its state as "resigned, then proceeds to 2012 in FIG. 20 to end the directory entry processing phase.

Figure 25:
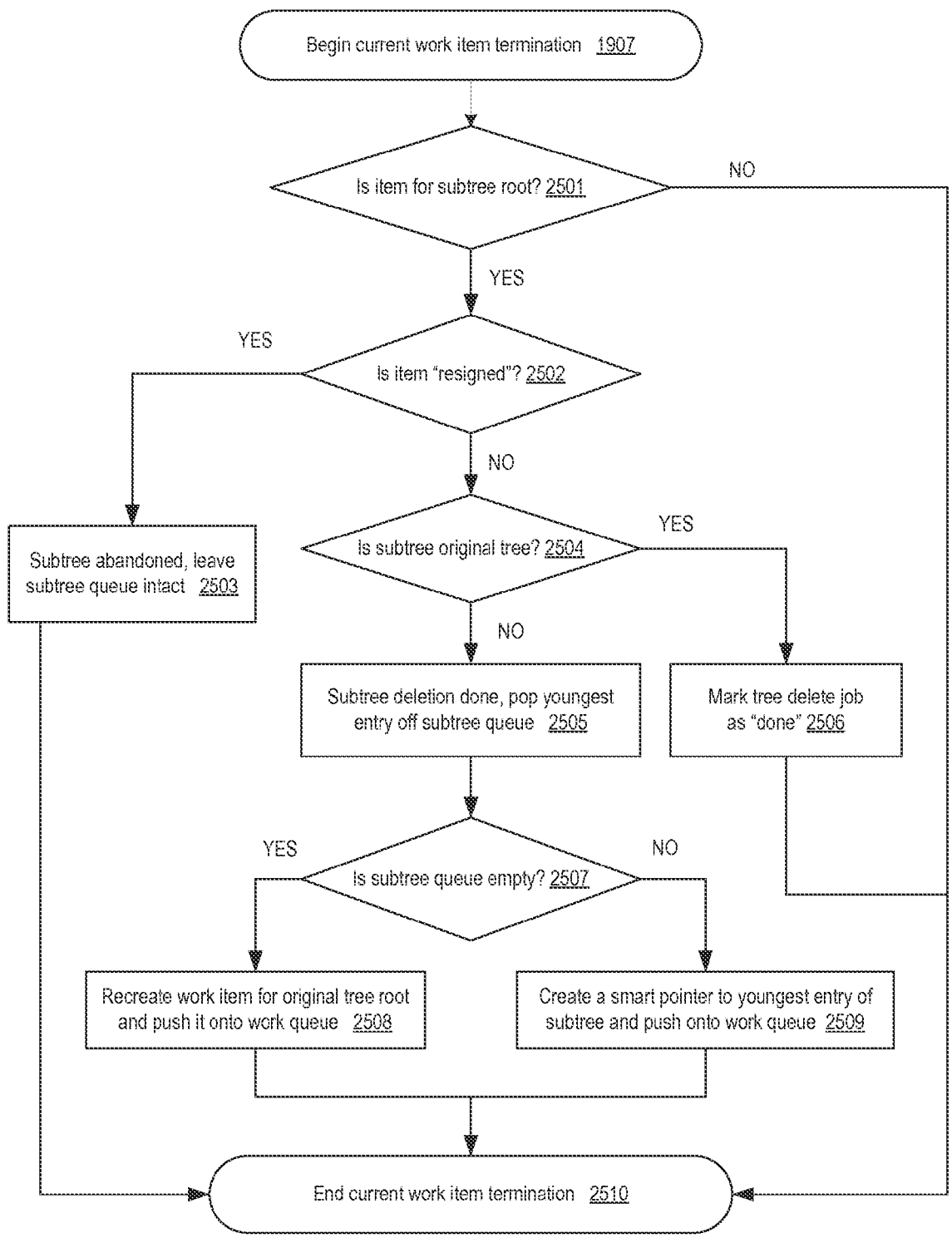
FIG. 25 shows the detailed processing of the current work item termination phase, in accordance with an example implementation.

FIG. 25 shows the detailed processing of the current work item termination phase, in accordance with the second example implementation. Specifically, FIG. 25 illustrates an expansion of the flow for 1907 and 1908 of FIG. 19. The worker checks at 2501 if the current work item is associated with the root of the subtree by comparing the directory object number and the subtree object number in the work item. If the object numbers are not equal (NO), the worker proceeds to 2510 to end the current work item termination phase. Thus, for all non-tree-root work items, the flow at 1908 in FIG. 19 is a no-op. Otherwise (YES), the worker will check further at 2502 if the current work item state is "resigned". The result is handled as follows.

If the state is resigned (YES), the worker will recognize at 2503 that the entire current subtree has been abandoned. Thus, the worker will leave the subtree queue intact and end the current phase at 2510. If the state is not resigned (NO), the worker will check further at 2504 if the current subtree originates from the same directory as the job's original tree. The result is handled as follows.

If the current subtree root is the job's original tree root (YES), the current work item must be the last one in the tree delete job. Thus, the worker will mark the tree delete job as "done" at 2506, then proceed to 2510 to end the current phase. If not (NO), the worker, now recognizing that the current subtree has been completely unlinked, will pop the youngest entry off the subtree queue at 2505. It then proceeds to 2507 to check the status of the resulting subtree queue If the resulting subtree queue is empty (YES), the worker will proceed to 2508 to recreate the work item for the job's original tree root directory, push it onto the work queue, and end the current phase at 2510. Otherwise (NO), the worker will proceed to 2509 to create a smart pointer to the subtree queue's youngest entry, push it onto the work queue, and end the current phase.

In summary, the second example implementation handles a large tree as follows. If the descended path creates too many work items on the work queue, the traversed path will be abandoned by clearing the work queue to release memory, but the work item corresponding to the first directory of the traversed path (i.e., the subtree root) will be kept in the FILO subtree queue. A new subtree will then be spawned near the end of the traversed path just abandoned. A work item will be created for the new subtree root directory, and pushed onto the subtree queue and the work queue. As a result, the process of deleting the new subtree will begin immediately. If the new subtree is still too large, it will be abandoned again and another new subtree will be spawned near where the previous subtree stopped. This process repeats until the final subtree, which is a leaf of the original tree, is shallow enough to be deleted completely. Once the final subtree is gone, its corresponding entry in the subtree queue will be removed, causing the next youngest entry in the subtree queue to be placed onto the work queue for deletion. This process repeats until all the abandoned subtrees in the subtree queue are deleted. Then the original tree, now truncated, will be submitted for deletion. This process repeats until the original tree is completely gone.

Third Example Implementation of a Tree Delete Method

In an example implementation for making the tree shallower by moving directories to the root level, whenever the queue is full, the next sub-directory encountered will be moved to the root level (priority 1). As a result, the root directory ends up having multiple new shallow subtrees, whose root directories all have priority 2 and, hence, will not be added to the queue by any worker until the job's tree root directory is processed again. Thus, this scheme will never exceed the tree delete heap pool limit. However, in such an implementation, the job's root directory can become very large (wide), the move operations can become very expensive, and if the job is aborted, the original directory hierarchy is changed and hard to restore. This behavior may not be desirable depending on the desired implementation.

Fourth Example Implementation of a Tree Delete Method

In an example implementation for not saving state while descending to the leaf directories, the process involves a depth-first traversal method where the worker traverses toward the leaf directories without saving state information along the directory path, i.e., it will not create and push directory work items onto the work queue. Once reaching a leaf directory, the worker will delete all the files therein, then the leaf directory itself. Once this is done, the worker moves to the current parent directory and treats it as a new tree so that the same deletion algorithm can be applied. In this example implementation, no queue is required, thereby eliminating the need for memory resources to be allocated to the queue. Further, in the event of the server receiving a client request to abort the job, the job will be aborted and the original directory hierarchy is preserved in the remaining subdirectories. However, in such an implementation it can be difficult to parallelize tree deletion to take advantage of the workers dedicated to tree delete.

Figure 26A:
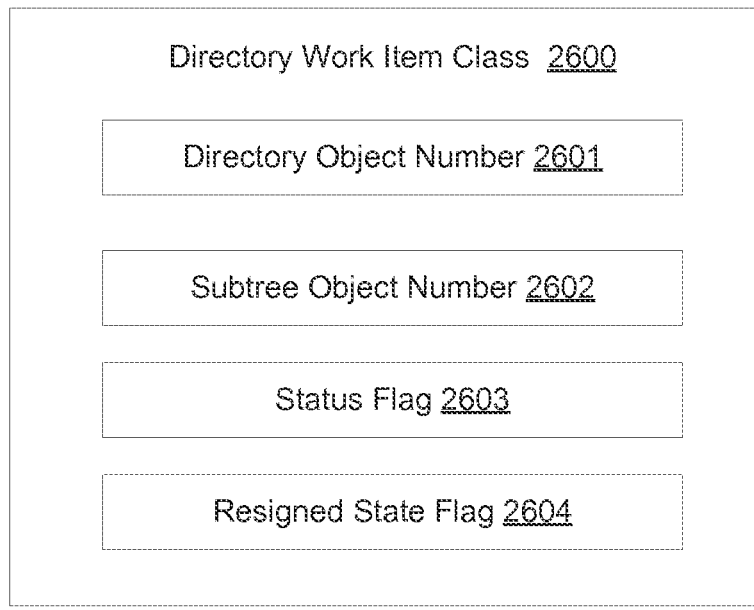
FIG. 26A illustrates an example directory work item class 2600, in accordance with an example implementation.

FIG. 26A illustrates an example directory work item class 2600, in accordance with an example implementation. This class holds the information about the directory to be processed for deletion. In the directory work item class, the fields include the directory object number 2601 which indicates the object number of the directory to be processed for deletion, the subtree object number 2602 which indicates the subtree's root object number, the status flag 2603, and the resigned state flag 2604. If the status flag 2603 is set to "done", the work item is fully processed and can be destroyed. If the status flag is set to "not done", the work item needs to be requeued so that the unfinished work in the work item can be resumed later. If the resigned state flag 2604 is set to true, then the item is resigning itself from the work queue. This implies the deletion of the current tree is suspended and the work item should be destroyed. If the resigned state flag 2604 is set to false, the item is not resigning from the work queue. This implies the current tree is being deleted, and the work item will be executed as described above.

Figure 26B:
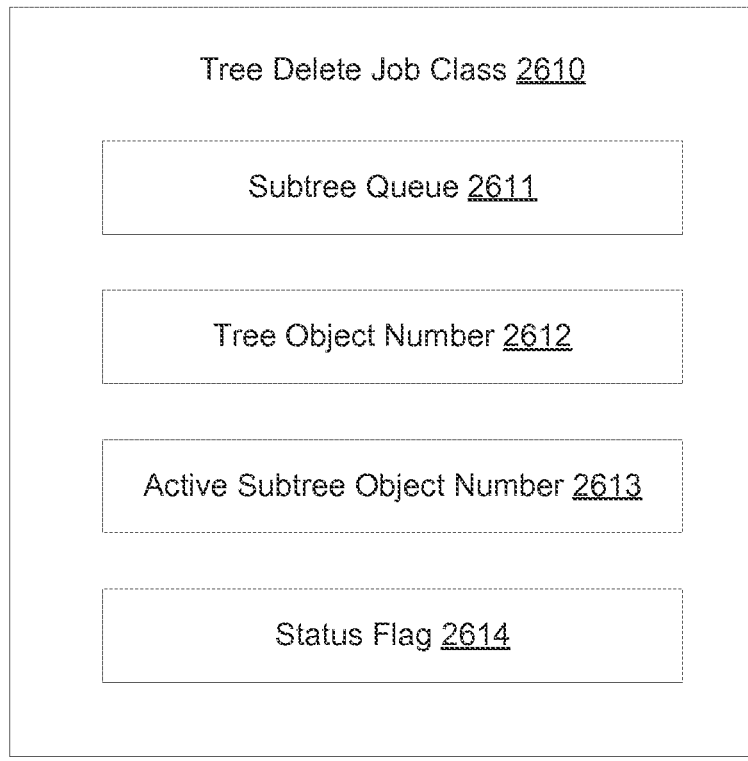
FIG. 26B illustrates a job class 2610, in accordance with an example implementation.

FIG. 26B illustrates a job class 2610, in accordance with an example implementation. The Job class 2610 holds the information about a tree delete job, such as the pathname of the directory to delete, the start and stop time of the job, the numbers of files and directories deleted, the status of the job, and so on: For facilitating the tree delete job, the following information is also included in the job class.

Subtree queue 2610 includes a FILO queue to contain work items associated with the subtree root directories. Whenever a new subtree is spawned at a certain subdirectory, a new work item for the subdirectory will be created and pushed on to the subtree queue 2101. Active tree root object number 2102 indicates the object number of the root directory of the subtree being deleted (e.g., active subtree). Note the example implementations described above can spawn many new subtrees with only one subtree being deletable at any time; this subtree is designated as active.

The job class also contains the tree object number 2612, the active subtree object number 2613, and the status flag 2614. The tree object number 2612 is the object number of the root directory of the tree specified in the client's tree delete request. The active subtree object number 2613 is the root directory object number of the currently active subtree. The status flag 2614 indicates the status of the job, which is set to "waiting" initially by the server, then changed to "executing" when the first work item of the job is processed by a tree delete worker, and finally to "done" if the entire tree is deleted successfully, or "failed" otherwise. If a client wants to know the status of a particular job, it has to send a job status request with the specific job ID. The client can also abort a particular job by sending a job abort request with the specific job ID. The processing of these two requests is not discussed here.

Figure 26C:
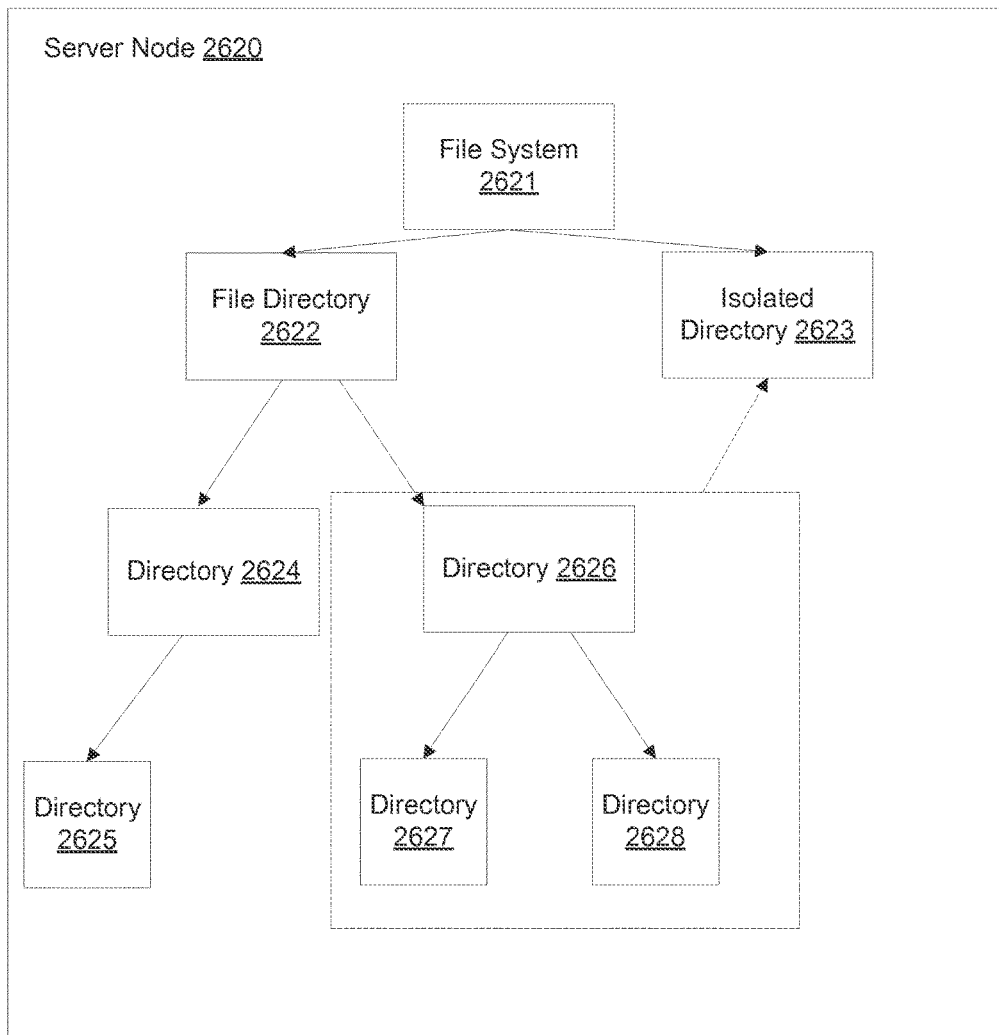
FIG. 26C illustrates an example transfer to a system trash directory, in accordance with an example implementation.

FIG. 26C illustrates an example transfer to a system trash directory, in accordance with an example implementation. In this example server node 2620, the server node 2620 manages a file system 2621. The server node 2620 may be implemented as a physical server node or as a virtual node spanning across one or more storage systems managed by the server. Server node 2620 may manage one or more file systems 2621, which may have the file directory 2622 to manage data that is accessible by client devices, and a directory space that is isolated 2623 from client access.

In the example of FIG. 26C, file directory 2622 may include one or more directories 2624 and 2626 which may include one or more subdirectories 2625, 2627 and 2628. Directory 2626 is designated to be deleted by the client, which also includes subdirectories 2627. To delete the directory 2626, the directory 2626 and associated subdirectories 2627 and 2628 are moved over to the isolated directory 2623. Thus, in the example implementations described above, the directory object can be moved over to the isolated portion of the storage system for the workers to execute the delete operation.

Figure 26D:
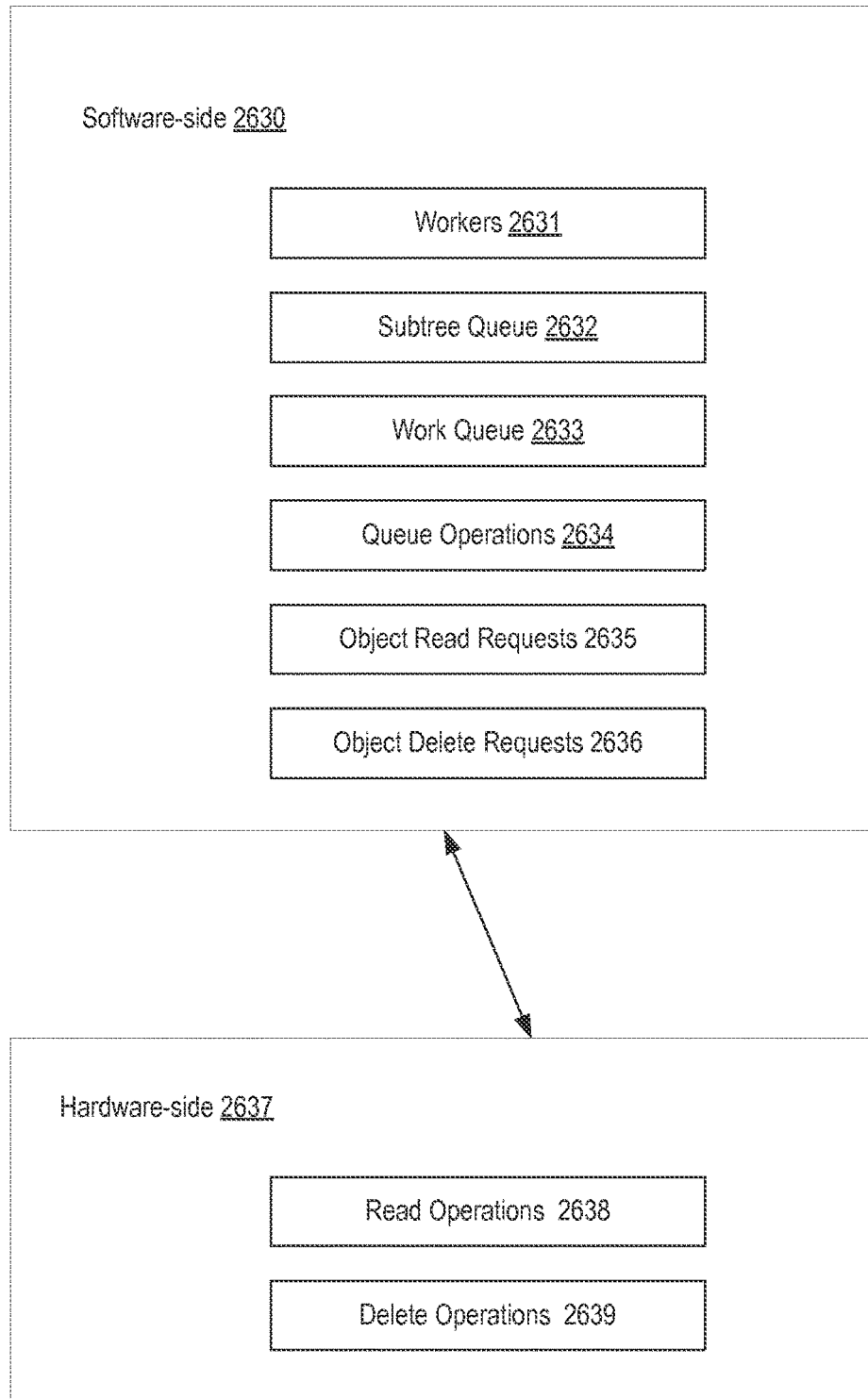
FIG. 26D illustrates an example architecture including a hardware-side and a software-side for conducting deletion operations, in accordance with an example implementation.

The implementation of the server to manage the one or more storage systems, or to manage physical storage nodes can involve an architecture as follows. There is a processing device which can include a memory configured to store a request associated with a client for deletion of a directory tree. The directory tree can be representative of a directory stored in the one or more storage systems managed by the server. The server may also include another processing type of device which involves at least one or more programmable hardware implemented chips FIG. 26D illustrates an example architecture including a hardware-side and a software-side for conducting deletion operations, in accordance with an example implementation. In the example architecture of FIG. 26D, an apparatus (e.g., server) can manage storage systems through the implementation of a processing device configured as a software-side 2630, and another processing device configured as a hardware-side 2636.

The software-side 2630 is implemented as a software layer that can be facilitated by at least one dedicated programmable hardware chip. It facilitates one or more workers 2631 to service subtree queue 2632 and work queue 2633 by performing queue operations 2634 such as pushing and popping directory work items. Based on the information in the directory work items, the software-side sends object read requests 2635 to the hardware-side 2637 to read directory entries, and sends object delete requests 2636 to delete files and empty directories stored in the one or more storage systems.

The hardware-side 2637 can be implemented with a memory and other hardware elements to facilitate the receipt and storage of object read requests 2635 and object delete requests 2636.

In accordance with FIGS. 18 to 25, the software-side 2630 can be configured to move the directory tree to an isolated portion of one or more storage systems where the isolated portion is configured to be inaccessible by the associated client; to read one or more directories of the directory tree; and to push one or more directory work items of the directory tree onto the work queue 2633. If the work queue 2633 does not exceed a preset threshold, the software-side pushes the work items of the directory tree onto the work queue 2633. The threshold can be set as described in FIGS. 18-25.

If the work queue 2633 exceeds the threshold, the software-side 2630 removes all work items of the directory tree from the work queue. If the work queue 2633 has at least one work item of the directory tree, the software-side 2630 configures the workers 2631 to pop the front work items off the work queue to delete the directories specified in the work items.

To implement the thread process from the workers 2631, the software-side 2630 is configured to push popped subdirectory objects onto the subtree queue 2632. As the software-side 2630 manages the functionality of the subtree queue 2503, it may also copy the last pushed work item in the subtree queue 2503 to the work queue 2633.

The software-side 2630 may also, when the subtree queue 2632 exceeds a predetermined threshold, pop the oldest work item off the subtree queue 2632 and cancel a delete operation of the directory tree. If the subtree queue 2632 is empty, the software-side 2630 is configured to recreate the work item associated with the root directory of the original tree and push it onto the work queue 2633.

The software-side 2630 may execute the thread process with the at least one or more programmable hardware implemented chips on the popped work item. The thread process can be configured to delete the file if the popped item is a file, and, if the popped item is a directory, create a subdirectory work item and push it onto the work queue. Further details of the software-side 2630 and the hardware-side 2637 are provided below.

Figure 27A:
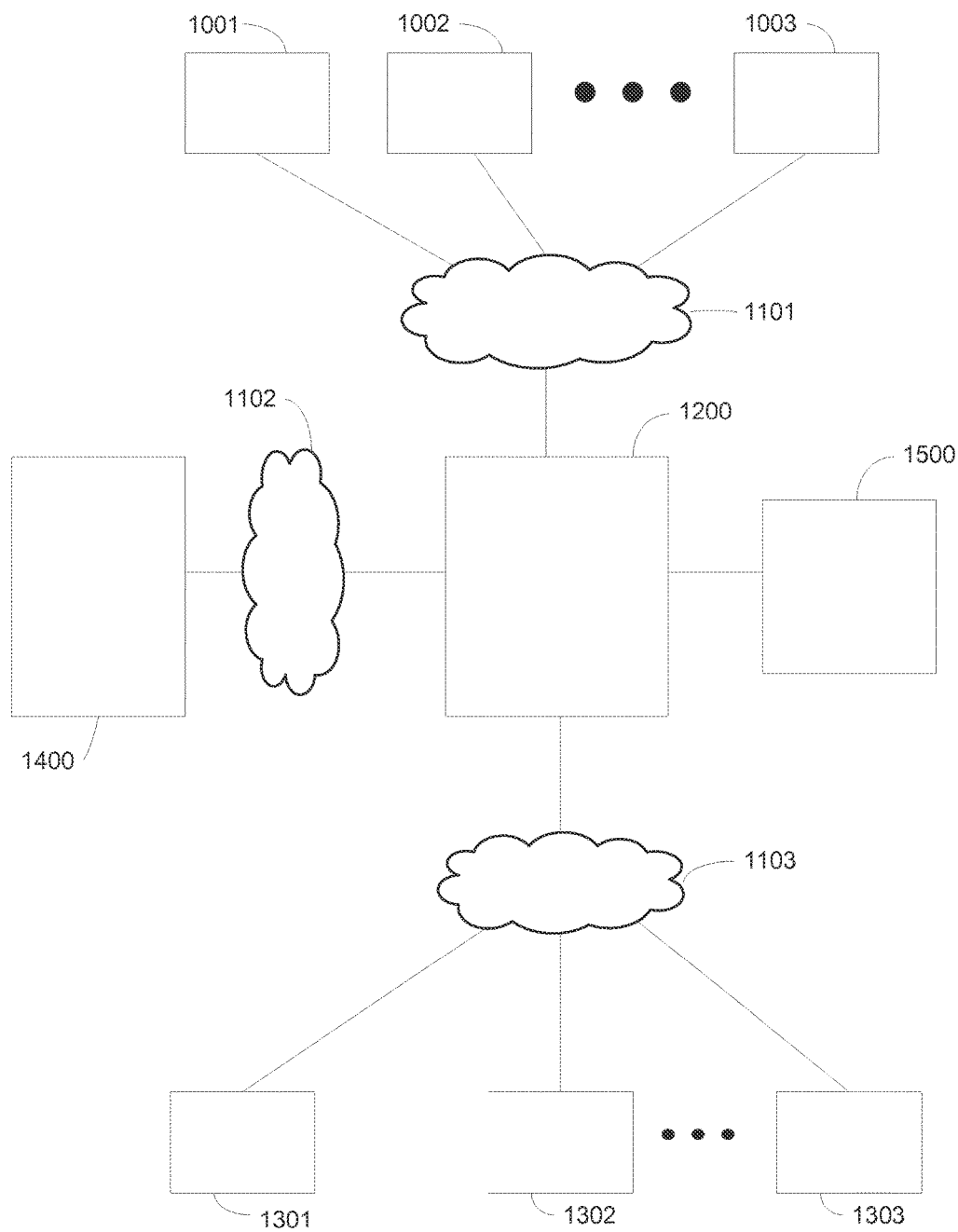
FIG. 27A illustrates a schematic diagram showing a data storage system according to an example implementation.

FIG. 27A illustrates a schematic illustration of a configuration of a data storage system, in accordance with an example implementation. The data storage system comprises a file system server 1200 connected to at least one host computer (client) and in FIG. 27A exemplarily a plurality of host computers (clients) 1001, 1002 and 1003 via a communication network 1101 (which may be organized and managed as a LAN, for example). The file system server 1200 is further connected to a plurality of storage apparatuses 1301, 1302 and 1303 via another communication network 1103 (which may be organized and managed as a SAN, for example). In other embodiments, only one storage apparatus may be connected to the file system server 1200, or in other example implementations the file system server and the one or more storage apparatuses may be implemented within one single device.

The file system server 1200 is adapted to manage one or a plurality of file systems, each file system being accessible by one or more of the host computers 1001 to 1003, possibly depending on individually set access rights, and, for accessing the one or more file systems, the host computers issue access requests to the file system server 1200.

Such access may include operations such as write new user data (e.g. write new files) and create new directories of the file system(s), read user data (read user data of one or more files), lookup directories, delete user data (such as delete existing files) and delete directories, modify user data (e.g. modify an existing file such as by modifying the file data or extend the file data by adding new user data to the file), create copies of files and directories, create soft links and hard links, rename files and directories etc. Also, the host computers 1001 to 1003 may issue inquiries with respect to metadata of the file system objects (e.g. metadata on one or more files and metadata on one or more directories of the file systems).

The file system server 1200 manages the access requests and inquiries issued from the host computers 1001 to 1003, and the file system server 1200 manages the file systems that are accessed by the host computers 1001 to 1003. The file system server 1200 manages user data and metadata. The host computers 1001 to 1003 can communicate via one or more communication protocols with the file system server 1200, and in particular, the host computers 1001 to 1003 can send I/O requests to the file system server 1200 via the network 1101.

A management computer 1500 is exemplarily connected to the file system server 1200 for enabling control and management access to the file system server 1200. An administrator/user may control and adjust settings of the file system management and control different functions and settings of the file system server 1200 via the management computer 1500. For controlling functions and settings of the file system management of the file system server 1200, the user can access the file system server 1200 via a Graphical User Interface (GUI) and/or via a Command Line Interface (CLI). In other example implementations, such control of the file system management of the file system server 1200 can be performed via one or more of the host computers instead of the management computer 1500.

The file system server 1200 is additionally connected to the one or more storage apparatuses 1301 to 1303 via the network 1103, and the user data (and potentially also the metadata of the one or more file systems managed on the file system server 1200) is stored to storage devices of the storage apparatuses 1301 to 1303, wherein the storage devices may be embodied by plural storage disks and/or flash memory devices. In some example implementations, the storage devices of the storage apparatuses 1301 to 1303 may be controlled according to one or more RAID configurations of specific RAID levels.

Exemplarily, the file system server 1200 is additionally connected to a remote storage apparatus 1400 via another communication network 1102 for remote mirroring of the file system data (user data and/or metadata) to a remote site. Such remote mirroring may be performed synchronously and asynchronously, for example, and settings of the function of the remote mirror operation may be controlled also via the management computer 1500. The storage apparatus 1400 may be comprised of one or more apparatuses similar to the storage apparatuses 1301 to 1303 or it may be embodied by another remote file system server connected to one or more apparatuses similar to the storage apparatuses 1301 to 1303.

Figure 27B:
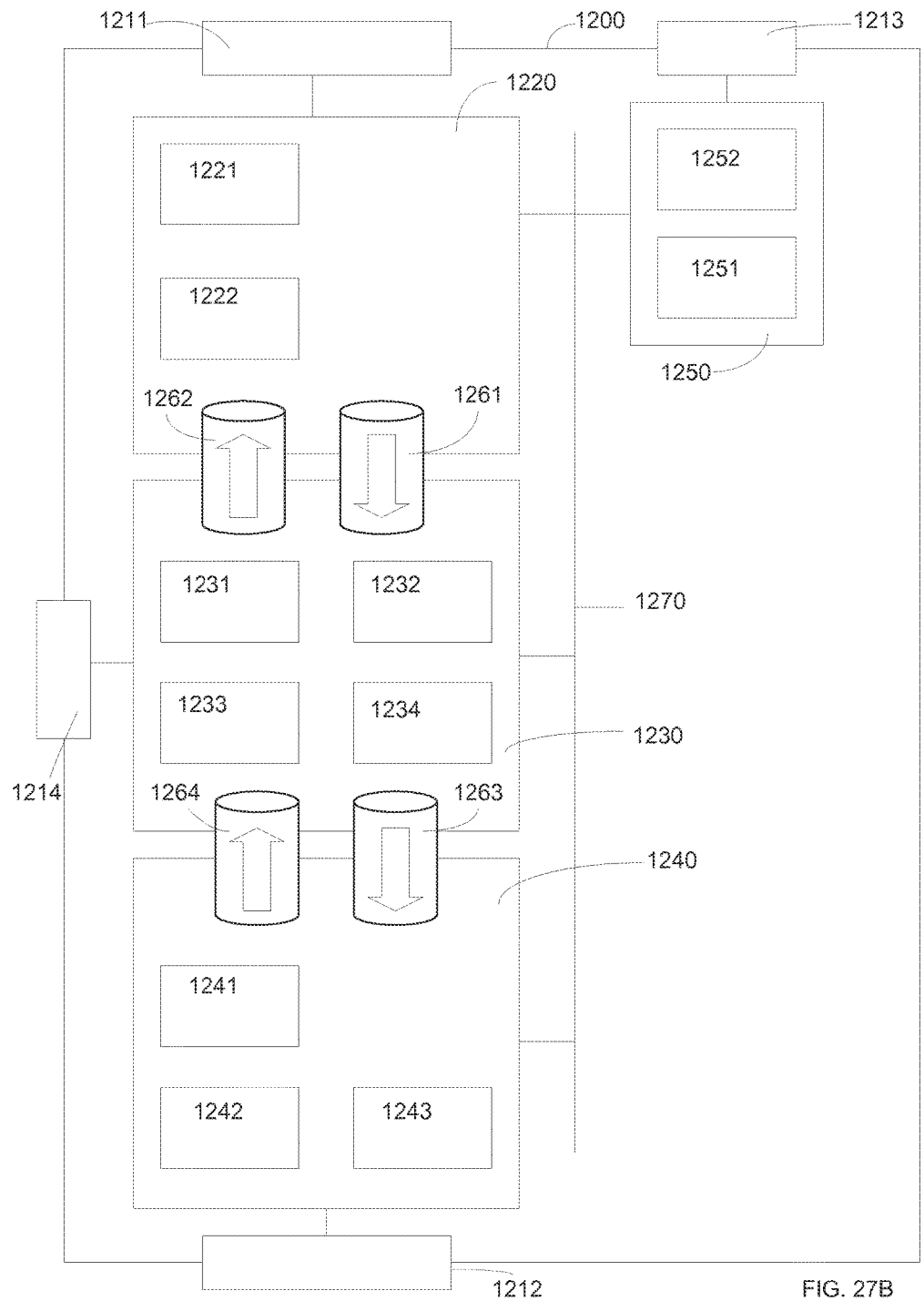
FIG. 27B illustrates a schematic diagram showing an architecture of a file system server according to an example implementation.

FIG. 27B illustrates a schematic illustration of a configuration of a file system server 1200 (file system management apparatus) according to an example implementation, with FIGS. 1 to 3 being implementations. The file system server 1200 comprises a network interface 1211 for connection to the host computers 1001 to 1003 (e.g. based on Ethernet connections or other technologies), a disk interface 1212 (or also referred to as a storage interface in that the "disk interface" of the file system server may not connect to a disk itself but rather connect to a network for communicating with a storage apparatus such as one or more storage arrays) for connection to the storage apparatuses 1301 to 1303 (e.g. based on Fibre Channel connections or other technologies), a management interface 1213 for connection to the management computer 1500 (e.g. based on Ethernet connections or other technologies), and a remote network interface 1214 for connection to the remote storage apparatus 1400 (e.g. based on Fibre Channel or Ethernet connections or other technologies).

The inner architecture of the file system server 1200 exemplarily includes four functionally and/or structurally separated portions, each of which may be implemented as a software-based implementation, as a hardware-based implementation or as a combination of software-based and hardware-based implementations. For example, each of the portions may be provided on a separate board, in a separate module within one chassis or in a separate unit or even in a separate physical chassis.

In some example implementations, the below described network interface portion 1220, the data movement and file system management portion 1230 and the disk interface portion 1240 can be realized as one or more hardware-side processing devices with each including one or more programmable hardware-based chips such as FPGAs. The hardware-side processing devices execute processing based on programmable hardware-implemented ICs, while the management portion 1250 is preferably realized as a software-side processing device including one or more CPUs executing control and management programs by use of the one or more CPUs.

Specifically, the file system server 1200 includes a network interface portion 1220 (also referred to as NIP) that is connected to the network interface 1211, a data movement and file system management portion 1230 (also referred to as DFP) which may be further separated (functionally and/or structurally) into a data movement portion (also referred to as DMP) and a file system portion (also referred to as FMP), a disk interface portion 1240 (also referred to as DIP) that is connected to the disk interface 1212, and a management portion 1250 (also referred to as MP). The various components may be connected by one or more bus systems and communication paths such as, e.g. the bus system 1270 in FIG. 27. Exemplarily, the data movement and file system management portion 1230 is connected to the remote network interface 1214.

The network interface portion 1220 is configured to manage receiving and sending data packets from/to hosts via the network interface 1211. The network interface portion 1220 includes a processing unit 1221 (which may include one or more processors such as one or more CPUs (e.g., one or more CPUs may be provided as single-core CPUs or as one or more multi-core CPUs) and/or one or more programmed or programmable hardware-implemented chips or ICs such as for example one or more Field Programmable Gate Arrays referred to as FPGAs) and a network interface memory 1222 for storing packets/messages/requests received from the host(s), prepared response packets/messages prior to sending the packets to host(s), and/or for storing programs for control of the network interface portion 1220 and/or the processing unit 1221.

The network interface portion 1220 is connected to the data movement and file system management portion 1230 via the fastpath connections 1262 and 1261 for sending received packets, messages, requests and user data of write requests to the data movement and file system management portion 1230 and for receiving packets, messages, requests, file system metadata and user data in connection with a host-issued read request from the data movement and file system management portion 1230. The fastpath connections (communication paths 1261 and 1262) may be embodied, for example, a communication connection operating according to Low Differential Voltage Signaling (LVDS, see e.g. ANSI EIA/TIA-644 standard) such as one or more LVDS communication paths so as to allow for higher data throughput and low noise.

The data movement and file system management portion 1230 is configured to manage data movement (especially of user data) between the network interface portion 1220 and the disk interface portion 1240, and to further manage the one or more file system(s), in particular manage file system objects of the one or more file systems and metadata thereof, including the management of association information indicating an association relation between file system objects and actual data stored in data blocks on the storage devices or the storage apparatuses 1301 to 1303.

The data movement and file system management portion 1230 comprises a processing unit 1231 (which may involve one or more processors such as one or more CPUs and/or one or more programmed or programmable hardware-implemented chips or ICs such as for example one or more Field Programmable Gate Arrays referred to as FPGAs) and a DFP memory 1232 for storing packets/messages/requests received from the NIP, prepared response packets/messages prior to sending the packets to the NIP, and/or for storing programs for control of the data movement and file system management portion 1230 and/or the processing unit 1231.

The data movement and file system management portion 1230 is connected to the disk interface portion 1240 via the fastpath connections 1263 and 1264 for sending received packets, messages, requests and user data of write requests to the disk interface portion 1240 and for receiving packets, messages, requests, and user data in connection with a host-issued read request from the disk interface portion 1240. The fastpath connections (communication paths 1263 and 1264) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 exemplarily further includes a metadata cache 1234 for storing (or temporarily storing) metadata of the file system(s) and file system objects thereof used for managing the file system.

The data movement and file system management portion 1230 exemplarily further includes a non-volatile memory 1233 (such as e.g. an NVRAM) for storing data of packets, messages, requests and, especially, for storing user data associated with write requests and read requests. Especially, since the data of write requests can be saved quickly and efficiently to the non-volatile memory 1233 of the DFP 1230, the response to the hosts can be issued quickly directly after the associated data has been safely stored to the non-volatile memory 1233 even before actually writing the data to one or more caches or to the storage devices of the storage apparatuses 1301 to 1303.

The disk interface portion 1240 is configured to manage receiving and sending user data, data packets, messages, instructions (including write instructions and read instructions) from/to storage apparatuses 1301 to 1303 via the network interface 1212.

The disk interface portion 1240 comprises a processing unit 1241 (which may comprises one or more processors such as one or more CPUs and/or one or more programmed or programmable hardware-implemented chips or IC's such as for example one or more Field Programmable Gate Arrays referred to as FPGAs) and a disk interface memory 1242 for storing packets/messages/requests received from the DFP and/or for storing programs for control of the disk interface portion 1240 and/or the processing unit 1241.

In addition, the disk interface portion 1240 exemplarily further includes a user data cache 1243 (sometimes also referred to as disk interface cache or sector cache, not to be confused with a cache of a storage apparatus described later) for storing or temporarily storing data to be written to storage apparatuses and/or data read from storage apparatuses via the disk interface 1212.

Finally, the management portion 1250 connected to the management interface 1213 includes a processing unit 1251 (which may comprises one or more processors such as one or more CPUs and/or one or more programmed or programmable hardware-implemented chips or ICs such as for example one or more Field Programmable Gate Arrays referred to as FPGAs) and a management memory 1252 for storing management information, management setting information and command libraries, and/or for storing programs for control of the management portion 1250 and/or the processing unit 1251, e.g. for controlling a Graphical User Interface and/or a Command Line Interface provided to the user of the management computer 1500.

Figure 28A:
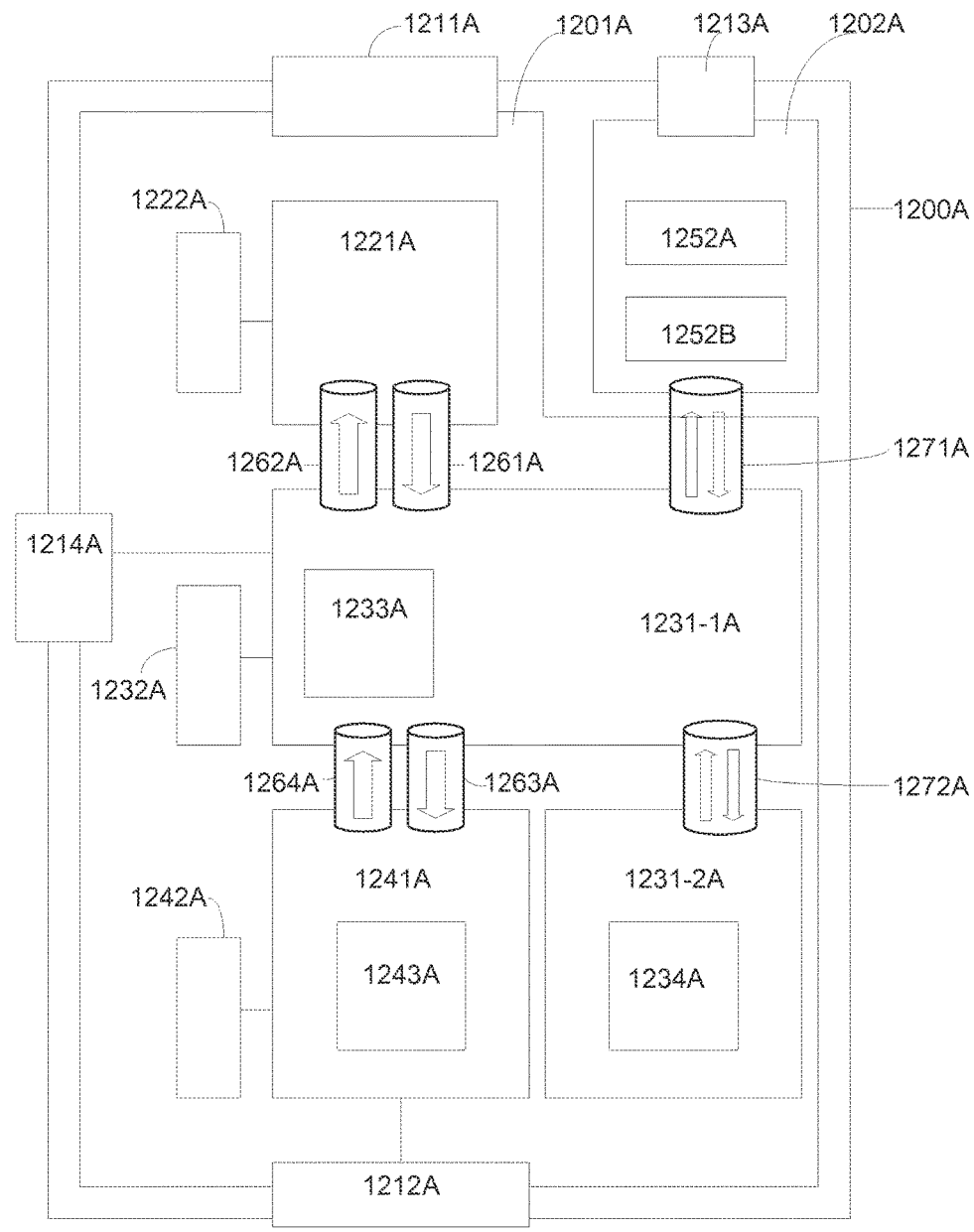
FIG. 28A illustrates another schematic diagram showing an architecture of a file system server according to an example implementation.

FIG. 28A illustrates a schematic illustration of a more specific configuration of a file system server 1200A (file system management apparatus) according to an example implementation. Exemplarily, the file system server 1200A includes a file system unit 1201A and a management unit 1202A. In some example implementations, the file system unit 1201A and the management unit 1202A may be embodied by separate boards, i.e. a file system board and a management board, that may be implemented in one server module (one or more of the modules may be implemented in one server chassis) or as separate modules. e.g. as a file system module and a management module, which may be implemented in one or more server chassis.

In this example of FIG. 28A, the management unit 1202A may functionally and/or structurally correspond to the management portion 1250 of FIG. 27. The management unit 1202A (e.g. a management board) comprises the management interface 1213A (corresponding to the management interface 1213), the processing unit 1251A (corresponding to the processing unit 1251), preferably comprising one or more CPUs. and the management memory 1252A (corresponding to the management memory 1252). In some embodiments, the management unit 1202A can be regarded as part of a software-side processing device (preferably including one or more CPUs).

The file system unit 1201A may functionally and/or structurally correspond to the portions 1220 to 1240 of FIG. 27. The file system unit 1201A (e.g. a file system board) comprises the network interfaces 1211A (corresponding to network interface 1211), the disk interface 1212A (corresponding to disk interface 1212), and the remote network interface 1214A (corresponding to remote network interface 1214).

Corresponding to the network interface portion 1220, the file system unit 1201A comprises a network interface memory 1222A and a network interface unit (NIU) 1221A which corresponds to processing unit 1221 and may be embodied by one or more programmed or programmable hardware-implemented chips or ICs such as for example one or more Field Programmable Gate Arrays referred to as FPGAs. In some example implementations, the network interface unit 1221A can be regarded as part of a hardware-side processing device (preferably including one or more programmable hardware-based chips such as e.g. FPGAs).

Corresponding to the disk interface portion 1240, the file system unit 1201A includes a disk interface memory 1242A and a disk interface unit 1241A (DIU), which corresponds to processing unit 1241, and may be embodied by one or more programmed or programmable hardware-implemented chips or ICs such as for example one or more Field Programmable Gate Arrays referred to as FPGAs. The disk interface unit 1241A includes the sector cache memory 1243A (corresponding to the sector cache memory 1243). In some example implementations, the disk interface unit 1241A can be regarded as part of a hardware-side processing device (including one or more programmable hardware-based chips such as e.g. FPGAs).

Corresponding to the data movement portion of the DFP 1230, the file system unit 1201A includes a DM memory 1232A (corresponding to DMP memory 1232), a DM unit 1231_1A (data movement management unit—DMU) and a FS unit 1231_2A (file system management unit—FSU) corresponding to processing unit 1231, and both being possibly embodied by one or more programmed or programmable hardware-implemented chips or ICs such as for example one or more Field Programmable Gate Arrays referred to as FPGAs. In some embodiments, the DM unit 1231_1A (for data movement management) and the FS unit 1231_2A (for file system management) can be regarded as part of a hardware-side processing device (preferably each including one or more programmable hardware-based chips such as e.g. FPGAs).

The DM unit 1231_1A comprises or is connected to the non-volatile memory 1233A (corresponding to the non-volatile memory 1233) and the FS unit 1231_2A comprises or is connected to the metadata cache memory 1234A (corresponding to the metadata cache memory 1234). The FS unit 1231_2A is configured to handle management of the file system(s), file system objects and metadata thereof and the DM unit 1231_1A is configured to manage user data movement between the network and disk interface units 1221A and 1241A.

The network interface unit 1221, the DM unit 1231_1A and the disk interface unit 1241A are respectively connected to each other by the data connection paths 1261A and 1262A, and 1263A and 1264A (e.g. fastpath connections corresponding to paths 1261 to 1264). In addition, the DM unit 1231_1A is connected to the management unit 1202A by communication path 1271A and to the DM unit 1231_1A by communication path 1272A (which may be implemented via fastpaths or regular data connections such as via an internal bus system etc.).

Figure 28B:
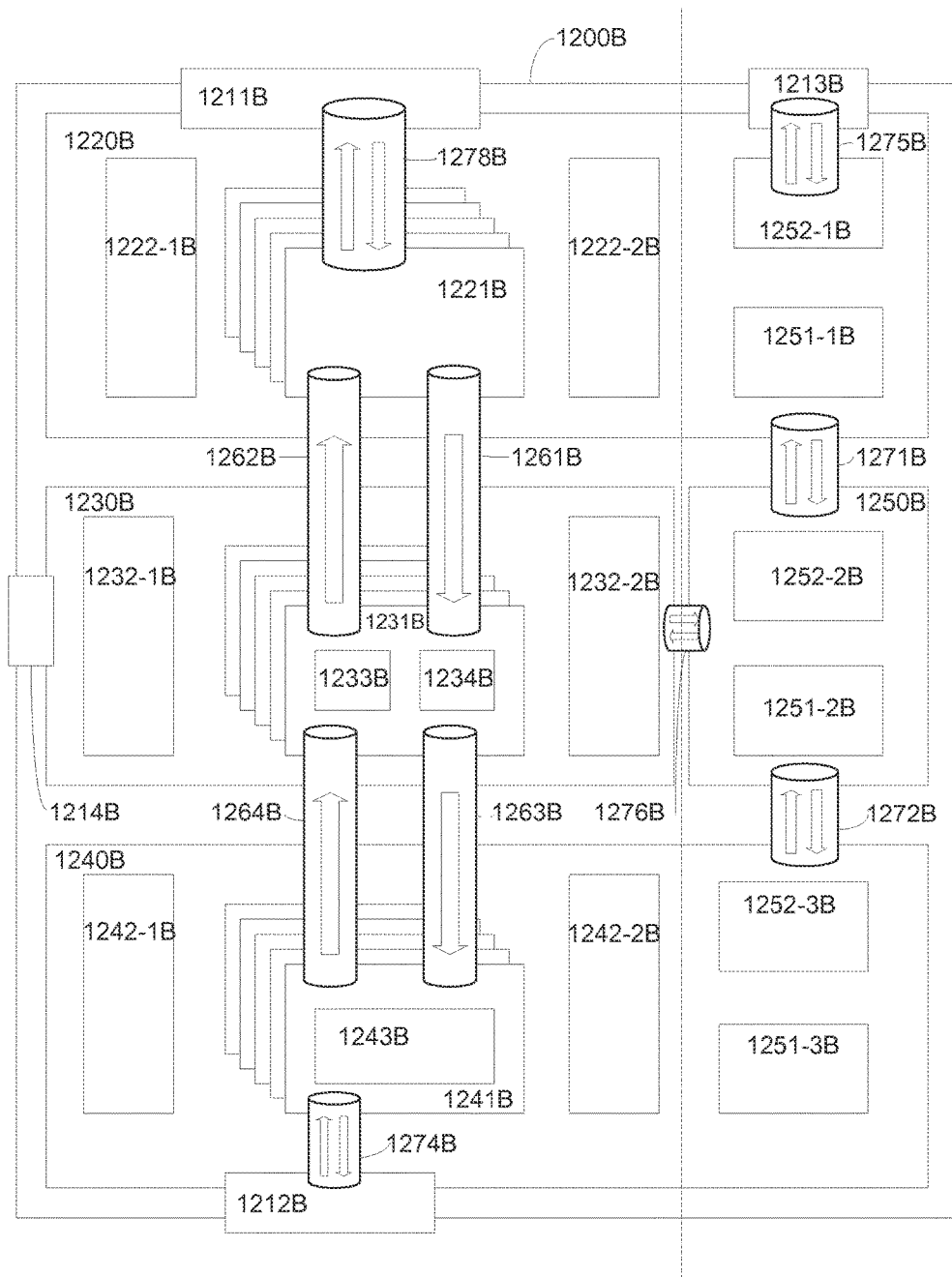
FIG. 28B illustrates another schematic diagram showing an architecture of a file system server according to an example implementation.

FIG. 28B illustrates a schematic illustration of another more specific configuration of a file system server 1200B (file system management apparatus) according to an example implementation. Exemplarily, the file system server 1200B includes a network interface module 1220B, a data movement and file system management module group including the data movement and file system module 1230B and a management module 1250B, and a disk interface module 1240B. In some example implementations, each of the above modules may be provided separately and inserted into a physical server chassis to be connected to each other according to a modular assembly (i.e. single modules may be exchanged if required, or sole or all of the modules may be provided at a higher number depending on the requirements).

For management purposes, each of the network interface module 1220B, the management module 1250B and the disk interface module 1240B includes a respective management memory 1252_1B, 1252_2B and 1252_3B and a respective processing unit 1251_1B, 1251_2B and 1251_3B (each of which may involve one or more processors such as one or more CPUs).

Accordingly, the components on the right side of the dashed line in FIG. 28B correspond to the management portion 1250 of FIG. 27, however, exemplarily, different processing units and associated memories are provided for controlling management of the network interfaces, the file system and data movement management, and the disk interfaces. The respective portions of the modules are communicably connected via communication paths 1271B, 1272B and 1275B to allow for communication to the management computer 1500 via the interface 1213B (the communication paths 1271B, 1272B and 1275B may be implemented via fastpaths or regular data connections such as via a bus system etc.).

Corresponding to the network interface portion 1220, the network interface module 1220B exemplarily comprises two network interface memories 1222_1B and 1222_2B and a plurality of network interface units (NIU) 1221B (corresponding to processing unit 1221) which are connected to the network interface via communication path 1273B and may be embodied by a plurality of programmed or programmable hardware-implemented chips or ICs such as for example Field Programmable Gate Arrays referred to as FPGAs.

Corresponding to the disk interface portion 1240, the disk interface module 1240B exemplarily includes two disk interface memories 1242_1B and 1242_2B and a plurality of disk interface units 1241B (DIU), which corresponds to processing unit 1241, and which may be embodied by a plurality of programmed or programmable hardware-implemented chips or ICs such as for example one or more Field Programmable Gate Arrays referred to as FPGAs. The disk interface units 1241B comprise or are connected to the sector cache memory 1243B (corresponding to the sector cache memory 1243) and are connected to the disk interface 1212B via communication path 1274B.

Corresponding to the DFP 1230, the file system and data movement management module 1201A includes a data movement management memory 1232_1 B, a file system management memory 1232_2B and a plurality of DFP units 1231B (corresponding to processing unit 1231) and which may be embodied by a plurality of programmed or programmable hardware-implemented chips or ICs such as for example Field Programmable Gate Arrays referred to as FPGAs. One or more of the DFP units 1231B can be responsible for management of data movement (e.g. similar to the responsibilities of unit 1231_1A) and one or more of the DFP units 1231B is/are responsible mainly for management of the file system and metadata (e.g. similar to the responsibilities of unit 1231_2A). The DFP units 1231B include or are connected to the non-volatile memory 1233B (corresponding to the non-volatile memory 1233) and the metadata cache memory 1234B (corresponding to the metadata cache memory 1234).

In the above aspects, data connection lines and data connection paths between modules, boards and units of the file server architecture, in particular those other than fastpaths, may be provided as one or more bus systems, e.g. on the basis of PCI, in particular PCI-E.

Figure 29:
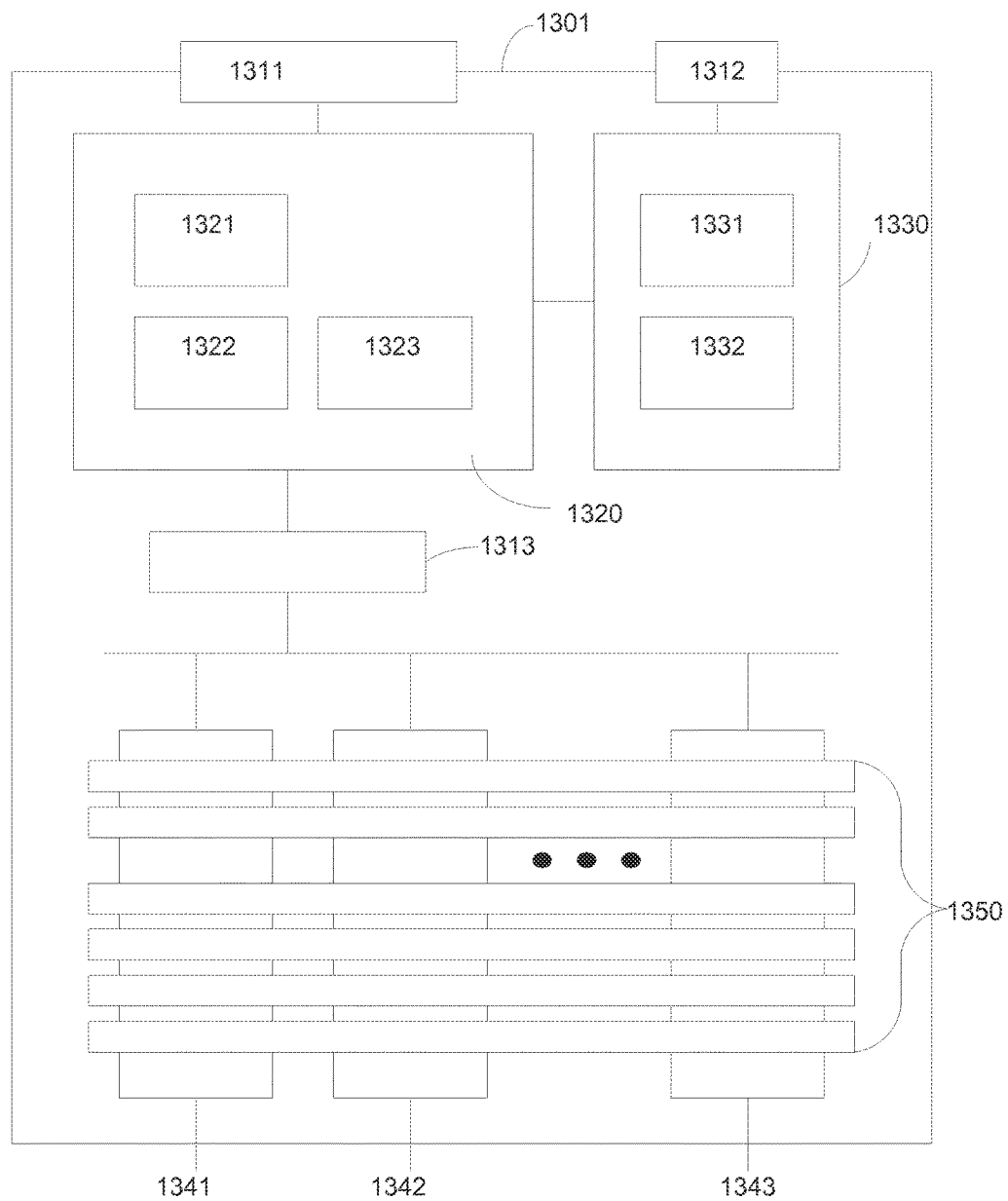
FIG. 29 illustrates a schematic diagram showing an architecture of a storage apparatus according to an example implementation.

FIG. 29 illustrates a schematic illustration of a configuration of a storage apparatus 1301 according to an example implementation, of which FIG. 4 is a related implementation. The storage apparatus 1301 (e.g. a storage array) includes a network interface 1311 for connection to the disk interface of the file system server 1200 via network 1103 and a memory control unit 1320 for controlling the data movement from/to the network interface 1311 and the disk interface 1313 that is connected to a plurality of storage devices 1341, 1342 and 1343 which may be embodied by storage drives such as storage disks such as Fibre Channel disks or SATA disks, by flash memory devices, flash memory drives, solid state drives, hybrid storage drives, magnetic drives and tapes and optical disks, or combinations thereof.

The memory control unit 1320 includes a processing unit 1321, a memory 1322 and a cache memory 1323. The memory control unit 1320 is configured to manage receiving and sending user data, data packets, messages, instructions (including write instructions and read instructions) from/to the file system server 1200.

The processing unit 1321 may include one or more processors such as one or more CPUs and/or one or more programmed or programmable hardware-implemented chips or ICs such as for example one or more Field Programmable Gate Arrays referred to as FPGAs, and the memory 1322 is provided for storing packets/messages/requests received from the file system server and response packets to be sent to the file system server, and/or for storing programs for control of the memory control unit 1320 and/or the processing unit 1321. The cache 11323 (sometimes also referred to as disk cache) is provided for storing or temporarily storing data to be written to disk and/or data read from disk via the disk interface 1313.

Finally, a management unit 1330 of the storage apparatus 1301 is connected to a management interface 1312 and comprises a processing unit 1331 (which may comprises one or more processors such as one or more CPUs and/or one or more programmed or programmable hardware-implemented chips or ICs such as for example one or more Field Programmable Gate Arrays referred to as FPGAs) and a management memory 1332 for storing management information, management setting information and command libraries, and/or for storing programs for control of the management unit 1330 and/or the processing unit 1331, e.g. for controlling a Graphical User Interface and/or a Command Line Interface provided to a user of a management computer (not shown, or may be the management computer 1500) connected via the management interface 1312.

The data to be stored on the storage devices 1341 to 1343 (storage disks and/or flash memory devices, herein commonly referred to as disks) is controlled to be stored in RAID groups 1350. The management of RAID groups distributed over the plurality of storage devices 1341 to 1343, and calculation of required parities according to selected RAID configurations is performed by the memory control unit 1320.

In some example implementations, the portions and parts left of the dashed line in FIG. 28B can be regarded as part of a hardware-based processing device (preferably including one or more programmable hardware-based chips such as e.g. FPGAs), and the portions and parts to the right-hand side of the dashed line in FIG. 28B can be regarded as part of a software-based processing device (preferably including one or more CPUs).

It is to be noted that example implementations as described above and below may relate to plural network communication protocols such as SMB (e.g. SMB1, SMB2, or higher), NFS (e.g. NFSv4[.1] or higher), RPCSEC_GSS, etc. Also, example implementations as described above and below may relate to different network protocols such as TCP or UDP.

FIGS. 30A to 30D illustrate metadata tables according to some example implementations.

Figure 30A:
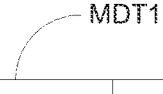
FIGS. 30A to 30D illustrate metadata tables according to some example implementations.

FIG. 30A illustrates an example of a metadata table MTD1 which may have entries which relate associated groups of IDs, each group of IDs including at least an interface ID, a network ID and a client ID (such as e.g. an IP address, a socket address or a socket pair ID). Each entry in the metadata table MTD1 associates an interface ID, a network ID and a client ID.

Specifically, each client of a certain tenant group may have a specific client ID and is associated with a certain communication network having a specific network ID and connects to the network interface via a specific interface having a specific interface ID. If another client from another tenant would use the same client IP (e.g. because different tenants use overlapping or even similar client ID ranges).

The idea is that the apparatus 1200, 1200A or 1200B or other apparatus such as a file server is connected to at least two groups of clients, wherein each group may be exemplarily associated with another tenant, and the at least two groups of clients may potentially use overlapping or even similar client ID ranges.

However, the network interface portion of the apparatus 1200, 1200A or 1200B has at least two interfaces and clients of different groups may communicably connect to different interfaces, wherein each of the interfaces (which may be different physical interfaces and/or different virtual interfaces sharing the same physical interfaces) has a unique interface ID. Also, clients of different groups may communicably connect via different networks, wherein each of the networks (which may be different physical network connections and/or different virtual networks such as VLAN, for example, sharing the same physical network connection) has a unique network ID.

Accordingly, even if two clients from different groups of clients would use the same client ID, for example, because the at least two groups of clients may potentially use overlapping or even similar client ID ranges, the clients could still be unambiguously identified by at least the unique combination of network ID and client ID or the unique combination of interface ID and client ID, and even more reliably by the redundant information of the unique combination of network ID, client ID and interface ID.

At the network interface portion of the apparatus 1200, 1200A or 1200B or other apparatus such as a file server, it is possible to determine the network ID and client ID based on header information of an incoming received message packet, and to further determine the interface ID of the interface at which the message packet is received.

Then, the respective network ID, client ID and interface ID can be looked up in the metadata table MDT 1 if FIG. 30A, and if the respective corresponding request exists, this means that the request is legitimate and can be processed, and if the respective corresponding request does not exists, the message packet can be dropped in order to avoid that clients of a certain client group accidentally access data of a file system used by clients of another client group.

Figure 30B:

FIG. 30B illustrates an example of a metadata table MTD2 which may have entries which relate associated groups of IDs, each group of IDs including at least the interface ID, the network ID and a virtual server ID. Here, the interface ID and the network ID are the same as in FIG. 30A above.

The idea is that the apparatus 1200, 1200A or 1200B or other apparatus such as a file server is connected to at least two groups of clients, but acts as different servers to the clients of the groups. e.g. in a virtual server infrastructure, wherein each of the at least two groups of clients is connected to another virtual server or another group of virtual servers as uniquely identified by the virtual server ID.

Specifically, each client group of a certain tenant group can be associated with a certain communication network having a specific network ID and connects to the network interface via a specific interface having a specific interface ID to a specific virtual server or virtual server group uniquely identified by the virtual server ID.

In some example implementations, the metadata tables in FIGS. 30A and 30B can be combined to one single table which has entries that relate an interface ID, a network ID, a client ID and a virtual server ID.

Figure 30C:
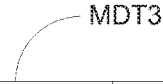
Figure 30D:

FIG. 30C illustrates an example of a metadata table MTD3 which may have entries which relate associated groups of IDs, each group of IDs including at least the network ID, the virtual server ID, and a file system ID. Here, the network ID and the virtual server ID are the same as in FIG. 30B above. The file system ID may uniquely identify one or more file systems and/or volumes of file system data relating to a file system that is accessed by the clients of the client group that are associated with the respective network ID according to the metadata tables of FIGS. 30A and 30B.

Figure 31A:
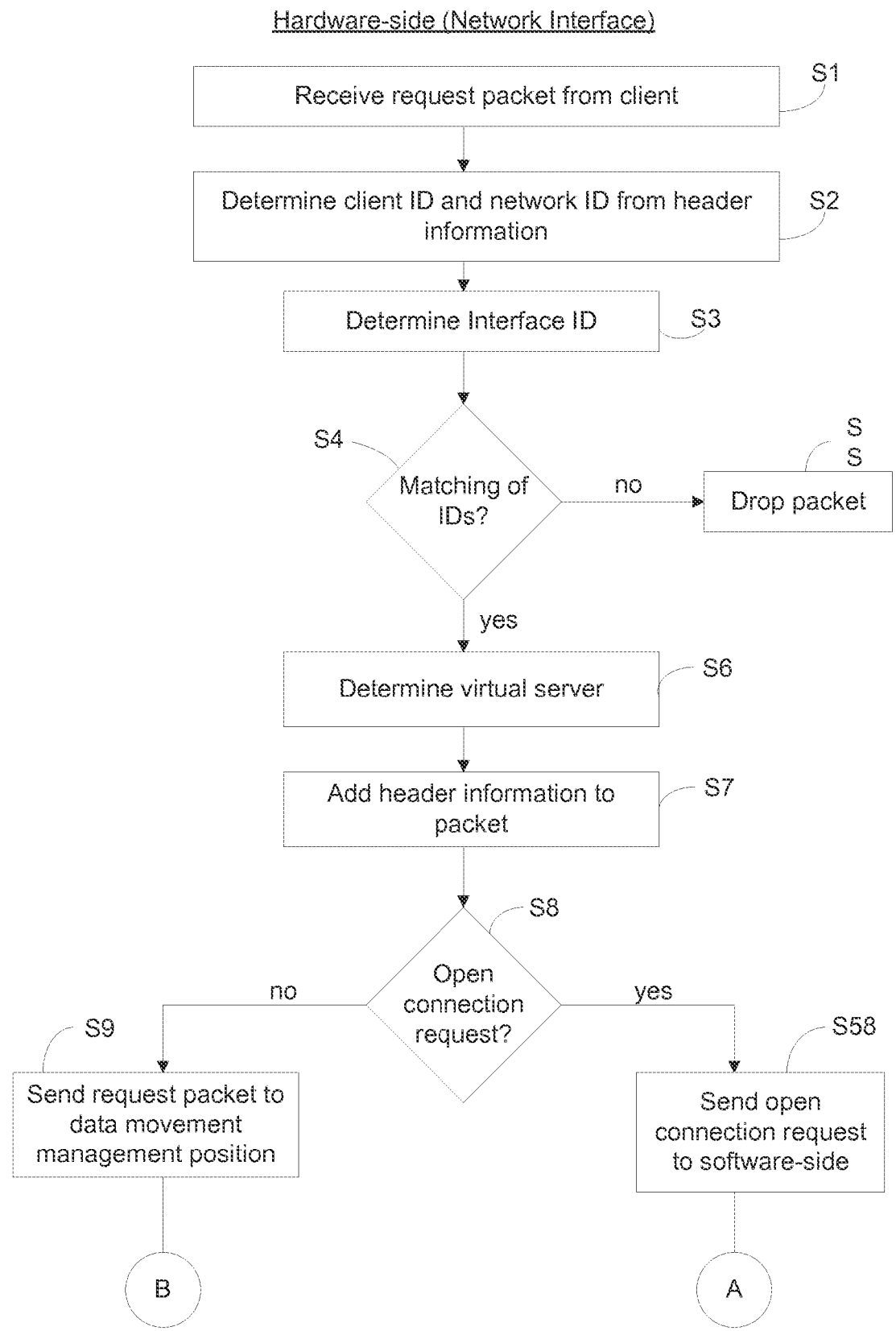
FIG. 31A illustrates a receipt process performed at a network interface portion at the hardware-side of the file system server according to an example implementation.

FIG. 31A illustrates a receipt process performed at a network interface portion at the hardware-side of the file system server according to an example implementation.

In step S1, a request packet is received from a client (e.g. host computer) via the communication network.

The request packet may relate to a first request by the client requesting to open a connection (open connection request. e.g. negotiate request) or, if the connection has been already established earlier, the request packet may relate to an input/output request to a file system or file system object of a file system managed by the file system server, such as requests for opening or closing a file or directory of the file system for subsequent access to it, a request for creating a new file or directory in the file system, a request to write or read user data to/from the file system, a request to obtain or modify metadata of a file or directory of the file system, a request to rename, move or copy a file or directory in the file system, a request to flush data from a cache to disk, etc.

Such requests to a file system may be generally distinguished as modifying requests (such as write to, rename, create, copy, or move a file system object) and non-modifying requests (such as read, get metadata etc.).

Also, the request packet may relate to a last request by the client requesting to close/terminate a connection (close connection request).

In step S2, the network interface portion determines the client ID of the client which has transmitted the received request packet and the network ID of the network of the client which has transmitted the received request packet based on the header information of the received request packet.

In step S3, the network interface portion determines interface ID of the interface via which the request packet has been received in step S1.

In step S4, based on the client ID, the network ID and the interface ID as determined in steps S2 and S3, the network interface portion determines whether a corresponding entry of the determined client ID, the network ID and the interface ID exists in the metadata table MTD1 stored in the memory or register of the network interface portion. If the corresponding entry of the determined client ID, the network ID and the interface ID exists in the metadata table MTD1, it is determined in step S4 that the determined IDs do match and indicate a correct request (step S4 returns YES). Otherwise, if step S4 returns NO and the determined client ID, the network ID and the interface ID does not exist in the metadata table MTD1, this implies that the client having the determined client ID may actually be a member of another client group using an overlapping or similar IP range, and the packet is dropped in step S5.

In step S5, in some example implementations, the main aspect is that the packet request is not processed. In some example implementations, it is possible to further issue an alert notification to the software-side of the apparatus 1200, 1200A or 1200B, and/or to return a failure response to the client. Also, an entry in a failure log register may be created for later reference.

If step S4 returns YES as the client ID, network ID and interface ID match according to the metadata table MTD1, the process continues with step S6 in which the network interface portion determines the corresponding virtual server ID based on the network ID and the interface ID determined in steps S2 and S3 and based on the metadata table MTD2 stored in the memory or register of the network interface portion (e.g. according to FIG. 30B or another metadata table combining the information from FIGS. 30A and 30B).

In step S7, the network interface portion add header information to the request packet, the additional header information including at least the virtual server ID determined in step S6, and preferably the virtual server ID determined in step S6, the client ID determined in step S2 and/or and at least one of the interface ID and the network ID determined in steps S2 and S3. In preferred embodiments, the client ID, network ID, interface ID and virtual server ID is included as additional header information.

In step S8, it is checked whether the received request packet relates to an open connection request for opening a connection, or whether the request packet may relate to an already established connection between the client and the file system server.

It is to be noted that example implementations of the present disclosure may relate to plural network protocols such as SMB (e.g. SMB1, SMB2, or higher), NFS (e.g. NFSv4[.1] or higher), RPCSEC_GSS, etc. In some protocols, such open connection requests may relate to a NEGOTIATE command, e.g. SMB2_NEGOTIATE in case of SMB2.

If step S8 returns YES (i.e. the request relates to an open connection request), the process proceeds with step S58 of sending the received request packet to the software side portion for further processing of the received request. Here, the network interface portion may extract the header of the request packet and only send the extracted header to the software side.

On the other hand, if step S8 returns NO as the request does not relate to an open connection request but relates to an already established connection, the received packet is send to the data management movement portion of the hardware-side of the file system server in step S9. An exception may be a close connection request which may be also send directly to the software-side similar to step S58.

Figure 31B:
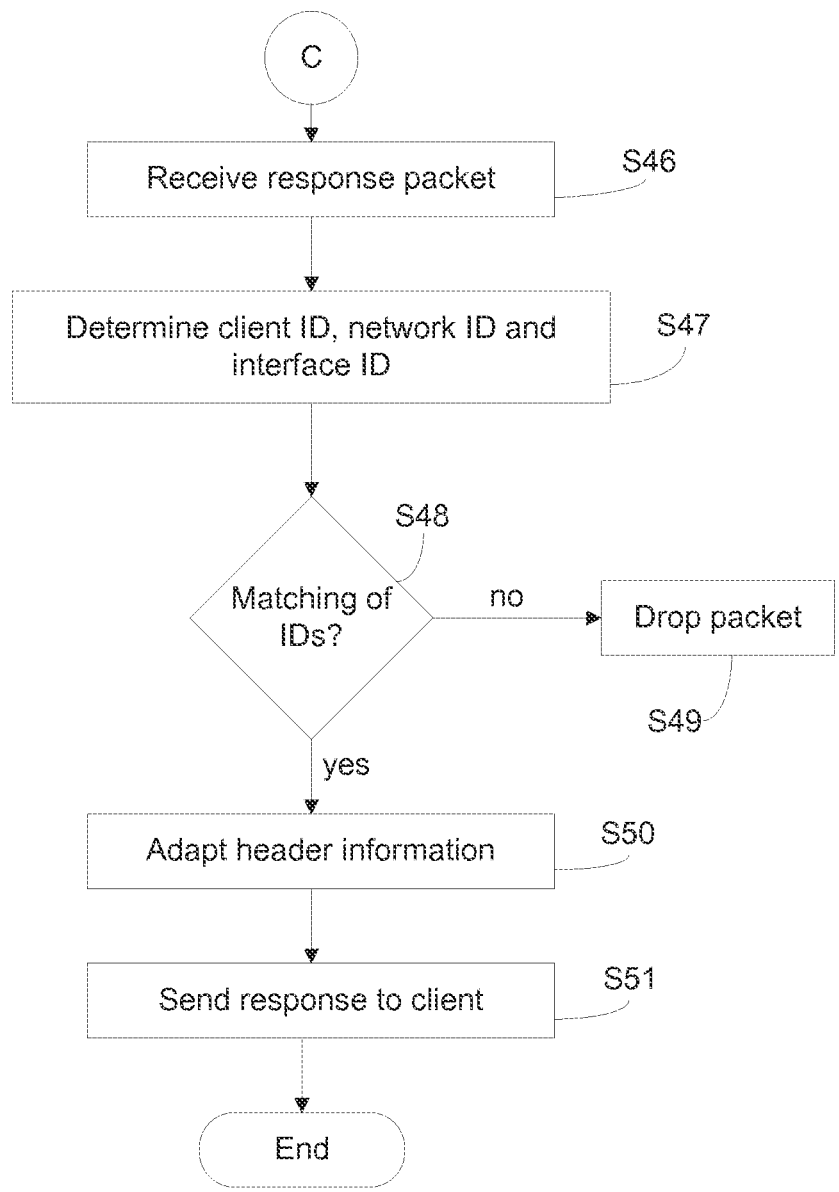
FIG. 31B illustrates a response process performed at the network interface portion at the hardware-side of the file system server according to an example implementation.

FIG. 31B illustrates a response process performed at the network interface portion at the hardware-side of the file system server according to an example implementation.

In step S46, the network interface portion receives a prepared response packet from the data management movement portion of the hardware-side of the file system server or from the software-side of the file system server as described later.

Based on header information of the prepared response packet, the network interface portion determines the client ID, network ID and interface ID in step S47 and checks whether a corresponding entry exists in the metadata table MTD1 similar to step S4 above, and if step S4 returns NO, the process continues with step S49 of dropping the packet similar to step S5 above. If step S48 returns YES and the IDs are determined to match an entry in the metadata table MTD1, the response packet is prepared by adapting the header information. Specifically, header information which has been added similar to step S7 above may be removed, in particular in that the interface ID and/or the virtual server ID may be removed. Also each of the interface ID, the virtual server ID, the client ID and the network ID may be removed from the header information.

In the subsequent step S51, the response packet is transmitted to the client connected via the network as a response packet for the previously received request packet (step S1).

Figure 32:
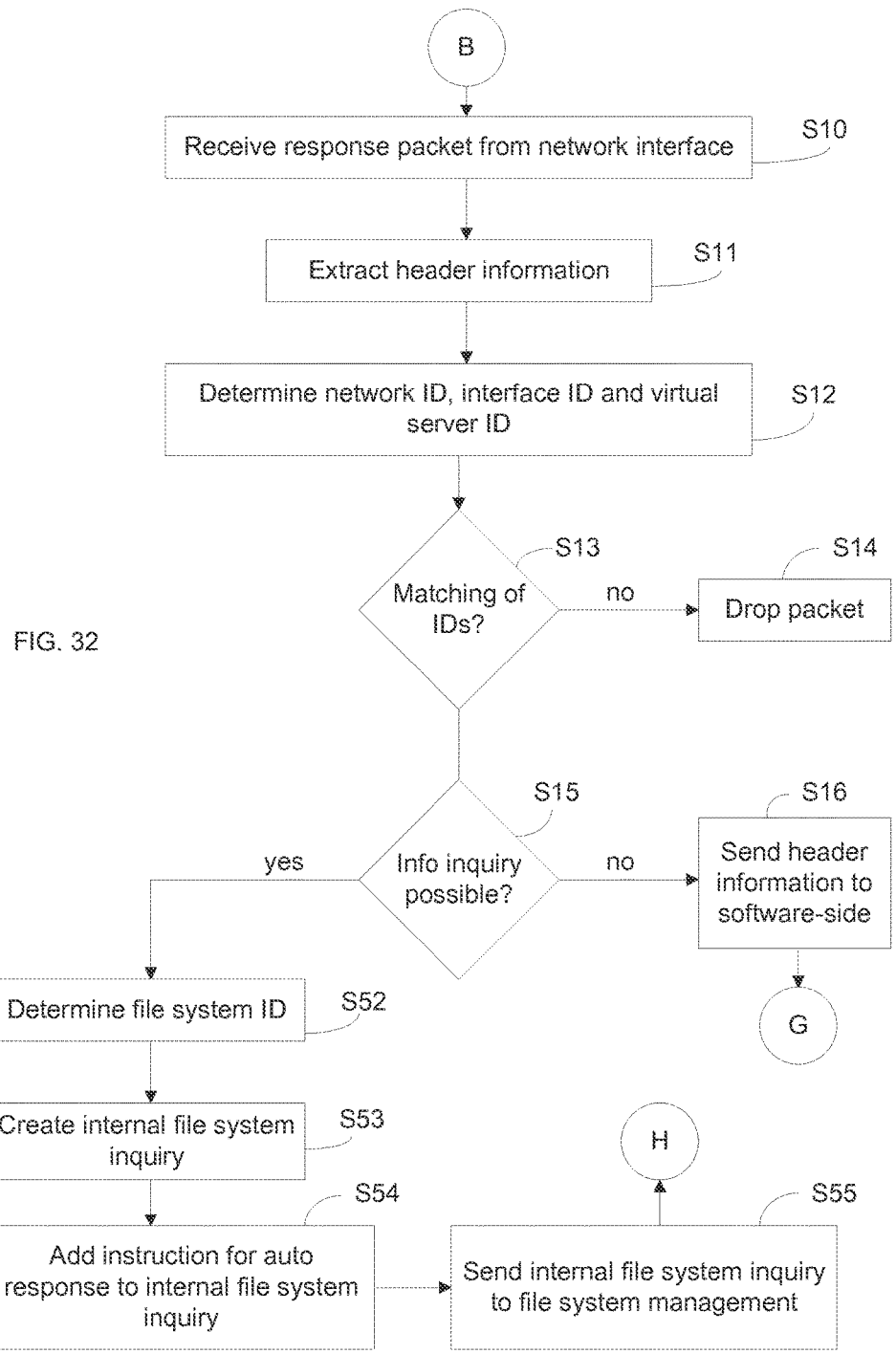
FIG. 32 illustrates a request processing process performed at a data movement management portion at the hardware-side of the file system server according to an example implementation.

FIG. 32 illustrates a request processing process performed at a data movement management portion at the hardware-side of the file system server according to an example implementation.

In step S10, the data movement management portion receives the request packet from the network interface portion as transmitted in step S9 above. In step S11, the data movement management portion extracts the header (or headers in case of a compound message having multiple headers) of the received request packet.

In step S12, the data movement management portion determines the network ID, interface ID and virtual server ID based on the extracted header information (based on the header information added in step S7 above).

In step S13, based on the network ID, the interface ID, and the interface ID as determined in step S12, the data movement management portion determines whether a corresponding entry of the determined network ID, interface ID, and virtual server ID exists in the metadata table MTD2 stored in the memory or register of the data movement management portion.

If the corresponding entry of the determined network ID, interface ID, and virtual server ID exists in the metadata table MTD2, it is determined in step S13 that the determined IDs do match and indicate a correct request (step S13 returns YES). Otherwise, if step S13 returns NO and the determined network ID, interface ID, and virtual server ID does not exist in the metadata table MTD2, the packet is dropped in step S14.

In step S14, in some example implementations, the main aspect is that the packet request is not processed. In some example implementations, it is possible to further issue an alert notification to the software-side of the apparatus 1200, 1200A or 1200B, and/or to instruct the network interface portion to return a failure response to the client. Also, an entry in a failure log register may be created for later reference.

Otherwise, if step S13 returns YES, the process continues with step S15.

In case of normal processing, which may involve the software-side for parsing and decoding the received packet, the extracted header(s) are sent to the software-side in step S16.

However, in some example implementations, an autoinquiry function may be implemented which allows to process at least some request packets without involvement of the software-side to avoid additional processing burden on the software-side. Such autoinquiry function may be possible for some specific command types included in the request packet and/or on the basis of whether the function has been enabled by a user.

For example, autoinquiry may be enabled for non-modifying requests in some example implementations, but it may also be enabled for simple modifying requests. Further, autoinquiry may be enabled for non-modifying requests such as read requests, get metadata requests, flush data from cash to disk requests.

For example, for the SMB2 protocol, autoinquiry may be enabled for non-modifying commands such as e.g. SMB2_FLUSH, SMB2_READ, SMB2_QUERY_DIRECTORY and SMB2_QUERY_INFO or the like. Per connection and/or client or globally, the administrator may enable/disable autoinquiry function for one or more requests individually. Then the hardware-side processing device may store data (such as a table or register) that indicates per command, per client, and/or per connection, whether the respective command has autoinquiry disabled or enabled. Specifically, the memory of the data movement management portion may have a stored register or table that associates a command of a request packet header (e.g. according to a network protocol) to a corresponding related internal file system inquiry command. Such register or table may additionally include the information of whether autoinquiry is enabled or disabled by a user (and if the corresponding command has autoinquiry disabled, step S6 may be performed instead).

It is to be noted that even for commands/request for which autoinquiry is enabled, there may occur situations in which the request packet cannot be parsed by the hardware-side processing device and is preferably sent to the software-side for packet decoding (no autoinquiry). For example, packets which cannot be parsed and are preferably sent to the software-side may include: corrupt, unparsable packets, or packets where values violate specified limits, requests for unsupported info levels, asynchronous packets, compounds, and/or signed requests.

In step S15, the data movement management portion determines whether executing the autoinquiry function is possible for the underlying command(s) of the received request packet based on analyzing the extracted header(s) and/or on the basis of whether the autoinquiry function is enabled for the underlying command type.

If step S15 returns NO, the extracted header(s) are sent to the software-side in step S16 according to the normal request processing.

Otherwise, if it is determined that executing the autoinquiry function is possible and step S15 returns YES, the data movement management portion continues by determining the file system ID based on the network ID and/or the virtual server ID as determined in step S12 and based on a metadata table MTD3 stored in the memory or register of the data movement management portion in step S52.

Then, the data movement management portion continues with step S52 and automatically creates a file system inquiry (as a file system server internal command) based on the specific command type(s) included in the request packet and based on the file system to be accessed determined on the basis of the virtual server ID and/or file system ID determined in step S52.

In the following, the created internal file system inquiry will be referred to as FS inquiry.

A memory or register at the hardware-side processing device. e.g. at the data movement management portion, may associate respective protocol commands (preferably for each of the supported network protocols) with the associated internal inquiries so as to allow for the generation of the corresponding internal file system inquiry.

For example, for SMB2 commands, it may exemplarily associate the respective SMB2 commands to internal FS inquiries as follows: SMB2_FLUSH->WFILE_COMMIT, SMB2_READ->WFILE_READ, SMB2_WRITE->WFILE_WRITE, SMB2_QUERY_DIRECTORY->WFILE_READDIR, SMB2_QUERY_DIRECTORY (no wildcards)->WFILE_LOOKUP, SMB2_QUERY_INFO->WFILE_GET_ATTR, SMB2_SET_INFO->WFILE_SET_ATTR, etc. Of course, the implementations of the present disclosure may relate to plural network protocols such as SMB (e.g. SMB1, SMB2, or higher), NFS (e.g. NFSv4[.1] or higher), RPCSEC_GSS, etc. and may have such association tables or association data for plural different protocols (mapping commands of the respective protocol to the above exemplary internal FS inquiries).

Autoinquiry function is a process which processes a request packet and inquires the file system based on the request packet without involvement in the processing by the software-side in order to increase IOPS efficiency. However, in the end, a response packet must still be created to be sent back to the client/host. If such process of creating the response packet is also performed without involvement in the processing by the software-side in order to increase IOPS efficiency, this is referred to as a so-called autoresponse in the following.

In step S54, the data movement management portion adds an instruction for autoresponse to the created FS inquiry in order to inform the file system management portion about the requirement of an autoresponse.

In step S55, the data movement management portion transmits the created FS inquiry to the file system management portion of the hard-ware side of the file system server.

Figure 33A:
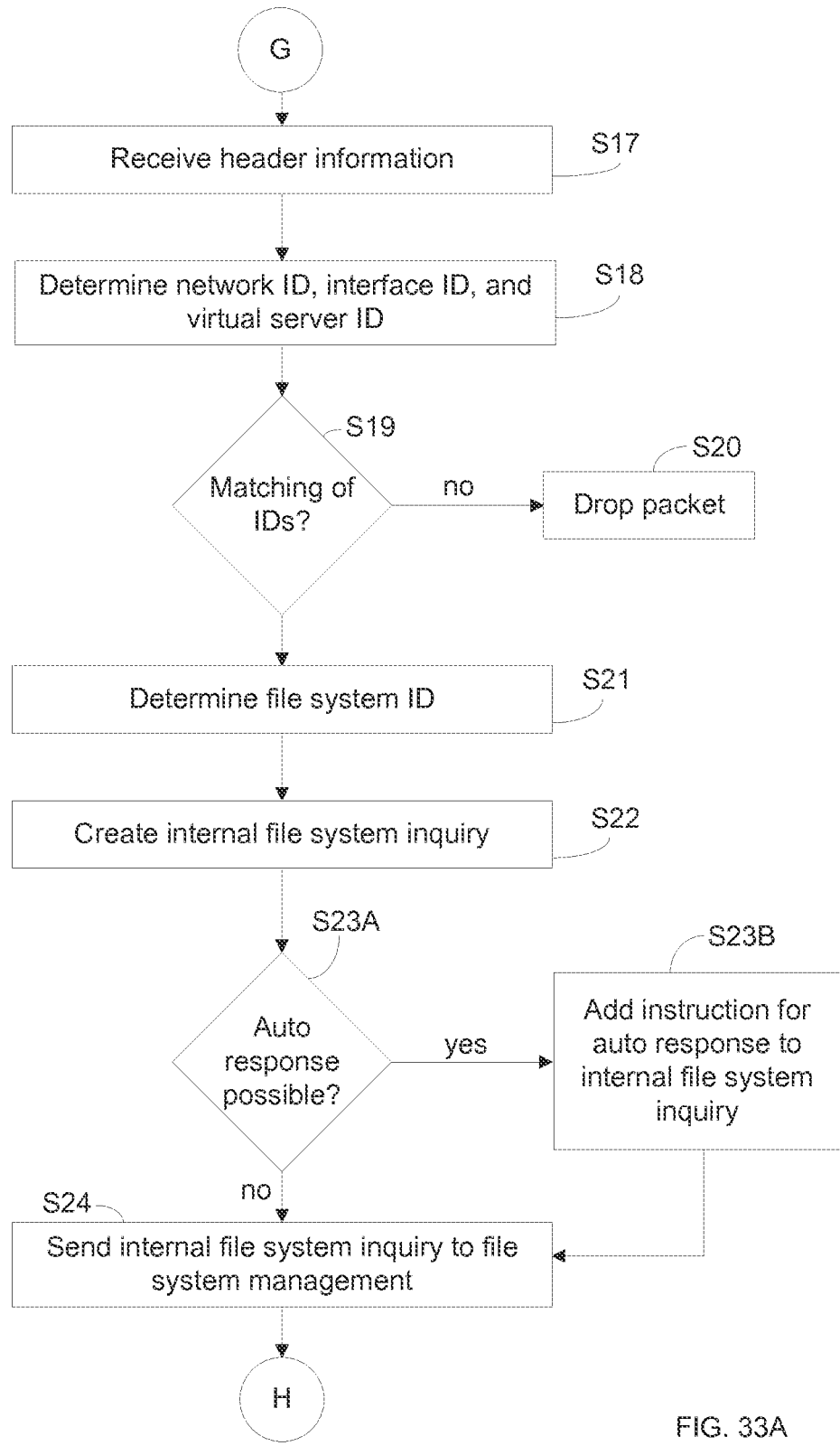
FIG. 33A illustrates a request processing process performed at a software-side of the file system server according to an example implementation.

FIG. 33A illustrates a request processing process performed at a software-side of the file system server according to an example implementation.

In step S17, the software-side portion (which includes one or more CPUs for executing the steps based on executing software instructions) receives the header information/header(s) of the current request packet from the data movement management portion (step S16 above).

Based on the received header information, a processing unit of the software-side portion of the file system server determines the network ID, interface ID and virtual server ID (and potentially also the client ID, if included) in step S18 and determines in metadata such as metadata tables MTD1 and/or MTD2 whether a corresponding entry with matching network ID, interface ID and virtual server ID (and potentially also the client ID, if included) exists in step S19.

If the corresponding entry does not exist and the IDs do not match, when step S19 returns NO, the software-side continues with step S20 and drops the packet. In step S20, in some example implementations, the main aspect is that the packet request is not processed. In some example implementations, it is possible to further issue an alert notification to the hardware-side of the apparatus 1200, 1200A or 1200B, and/or to instruct the network interface portion to return a failure response to the client. Also, an entry in a failure log register may be created for later reference.

On the other hand, if step S19 returns YES and the IDs do match, the processing unit of the software-side portion of the file system server determines the corresponding file system ID in step S21. Specifically, it determines the file system ID based on the network ID and/or the virtual server ID as determined in step S18 and based on a metadata table MTD3 stored in the memory or register of the software-side in step S21.

The processing unit of the software-side portion of the file system server then creates an internal file system inquiry (FS inquiry, similar to step S53) in step S22.

A memory or register at the hardware-side processing device, e.g. at the file system management portion, may associate respective protocol commands (preferably for each of the supported network protocols) with the associated internal inquiries so as to allow for the generation of the corresponding internal file system inquiry.

For example, for SMB2 commands, it may exemplarily associate the respective SMB2 commands to internal FS inquiries as follows: SMB2_FLUSH->WFILE_COMMIT, SMB2_READ->WFILE_READ. SMB2_WRITE->WFILE_WRITE. SMB2_QUERY_DIRECTORY->WFILE_RE-ADDIR, SMB2_QUERY_DIRECTORY (no wildcards)-> WFILE_LOOKUP, SMB2_QUERY_INFO->WFILE_GET_ATTR, SMB2_SET_INFO->WFILE_SET_ATTR, etc. Of course, the present disclosure may relate to plural network protocols such as SMB (e.g. SMB1, SMB2, or higher), NFS (e.g. NFSv4[.1] or higher), RPCSEC_GSS, etc. and may have such association tables or association data for plural different protocols (mapping commands of the respective protocol to the above exemplary internal FS inquiries).

In step S23A, the processing unit of the software-side portion of the file system server determines whether the autoresponse function is possible for the current request. i.e. whether the hard-ware side can create the required response packet for transmittal to the client without further processing involvement by the software-side of the file system server.

If step S23A returns YES, the processing unit of the software-side portion of the file system server adds an instruction for autoresponse to the created FS inquiry in order to inform the file system management portion about the requirement of an autoresponse in step S23B, and sends the created FS inquiry to the file system management portion of the hardware-side of the file system server in step S24.

On the other hand, if it is determined in step S23A that autoresponse is not possible, it just sends the created FS inquiry to the file system management portion of the hardware-side of the file system server in step S24 (without instruction for autoresponse).

For example, autoresponse may be enabled for modifying and/or non-modifying requests in some example implementations. In an example implementation, autoresponse may be enabled for non-modifying requests such as read requests, get metadata requests, flush data from cash to disk requests, as well as for modifying requests such as write requests and set metadata requests. For example, for the SMB2 protocol, autoresponse may be enabled for non-modifying commands such as e.g. SMB2_FLUSH, SMB2_READ, SMB2_ QUERY_DIRECTORY and SMB2_QUERY_INFO or the like, and for modifying commands such as e.g. SMB2_WRITE and SMB2_SET_ATTR, etc. Per connection and/or client or globally, the administrator may enable/disable autoresponse function for one or more requests individually. Then the hardware-side processing device may store data (such as a table or register) that indicates per command, per client, and/or per connection, whether the respective command has autoresponse disabled or enabled. Specifically, the memory of the file system management portion may have a stored register or table that associates a command of a request packet header (e.g. according to a network protocol) to a corresponding related internal file system inquiry command. Such register or table may additionally include the information of whether autoresponse is enabled or disabled by a user. Also, the software-side processing device may have such management data in order to be able to instruct autoresponse in some embodiments.

Figure 33B:
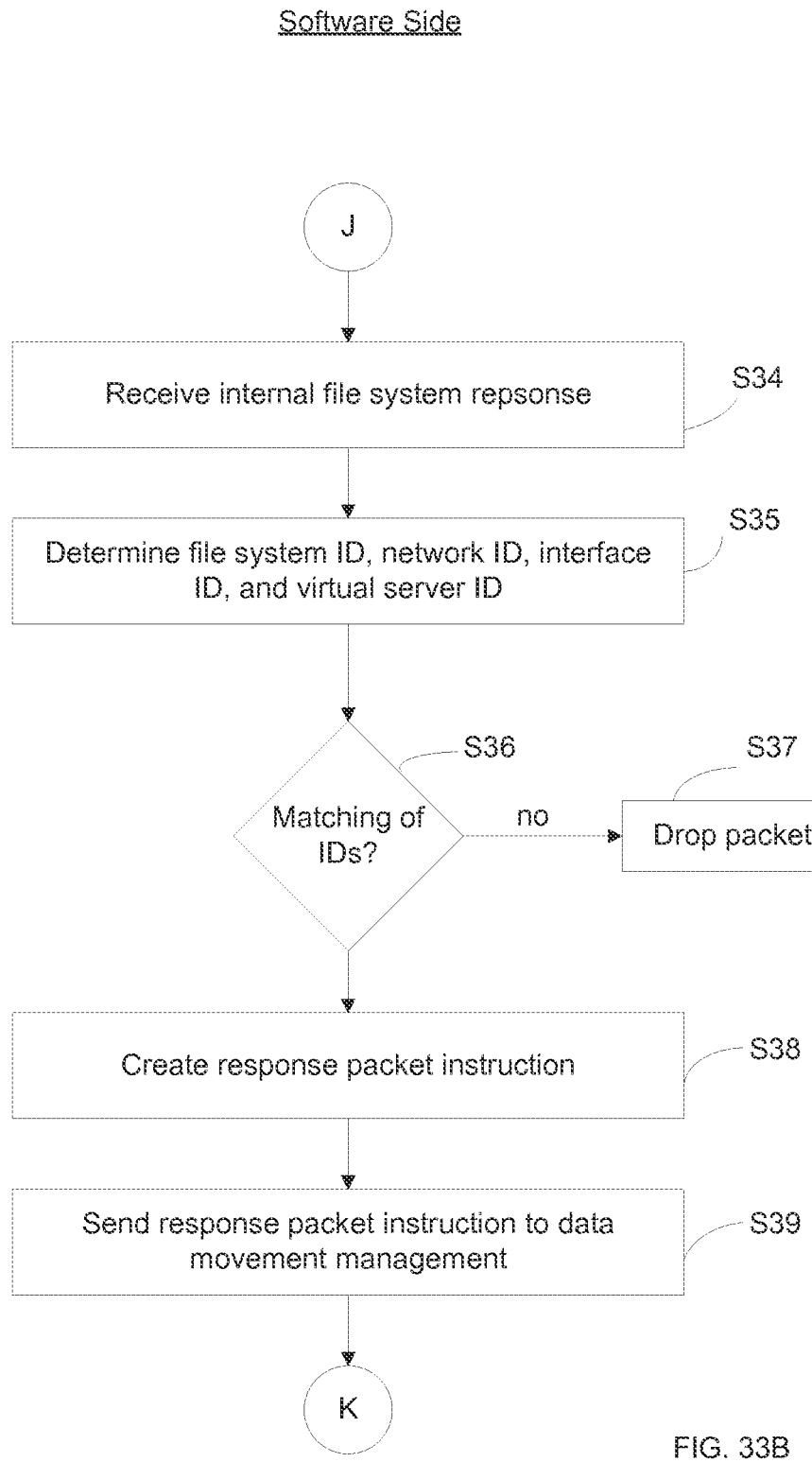
FIG. 33B illustrates a response processing process performed at a software-side of the file system server according to an example implementation.

FIG. 33B illustrates a response processing process performed at a software-side of the file system server according to an example implementation.

In step S34, the software-side of the file system server receives an FS response from the file system management portion of the hardware-side of the file system server.

In step S35, based on header information of the FS response, the software-side of the file system server determines the file system ID, network ID, interface ID and/or virtual server ID, and checks in step S36 whether a corresponding entry exists in one or more corresponding metadata tables such as e.g. metadata tables MTD1, MTD2 and/or MTD3 as discussed above so as to check whether the IDs do match. If step S36 returns NO, then the software-side of the file system server drops the packet in step S37.

In step S37, in example implementations, the main aspect is that the packet request is not processed. In some example implementations, it is possible to further issue an alert notification to the hardware-side of the apparatus 1200, 1200A or 1200B, and/or to instruct the network interface portion to return a failure response to the client. Also, an entry in a failure log register may be created for later reference.

If step S36 returns YES, in step S38, the software-side of the file system server creates a respective response packet instruction (which may already include a fully prepared header of a respective response packet) for an appropriate response packet to be sent to the client in response to the previously received and currently processed request packet.

In step S39, the software-side of the file system server sends the created response packet instruction to the data movement management portion of the hardware-side of the file server.

Figure 34:
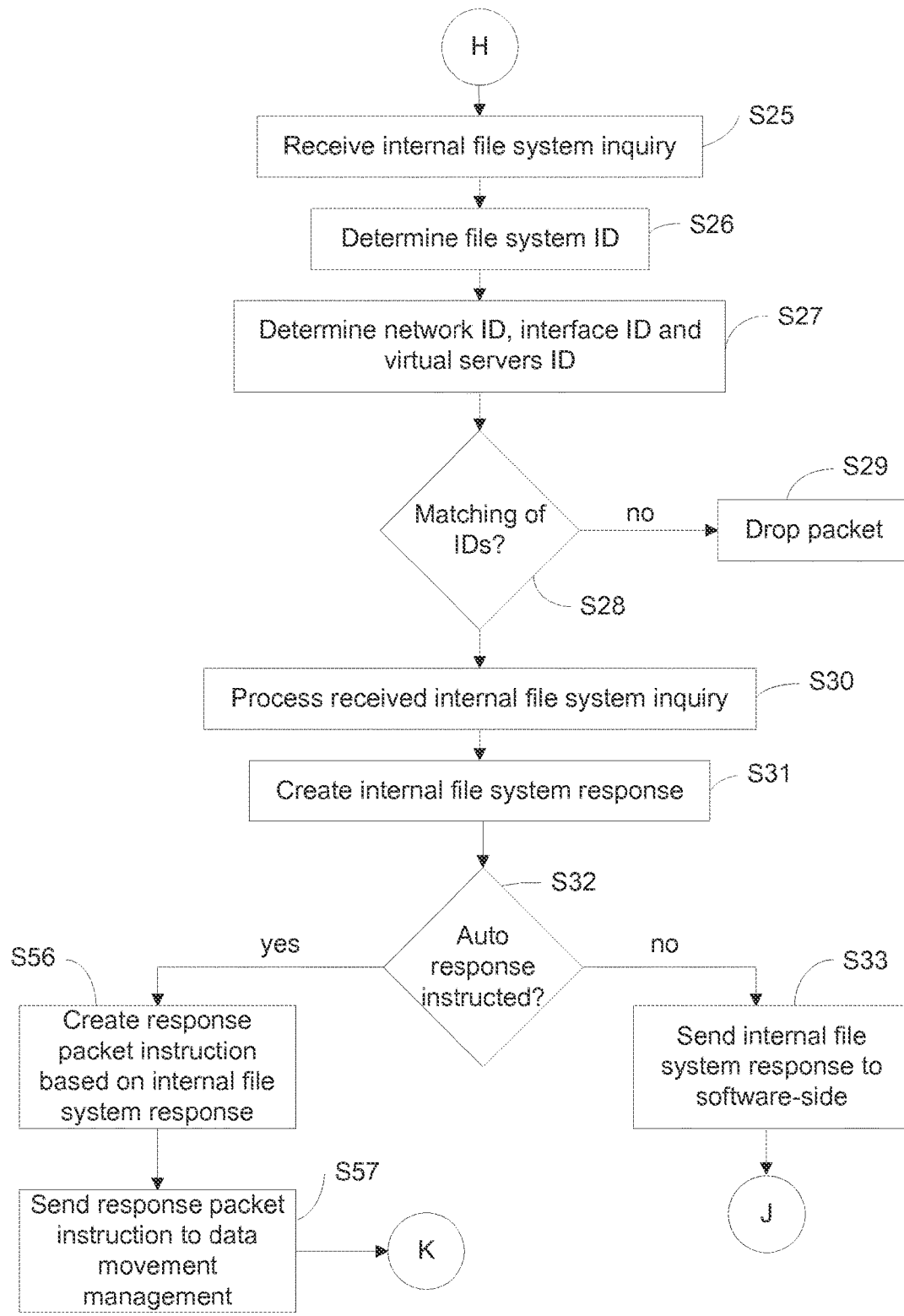
FIG. 34 illustrates a request processing process performed at a file system management portion of the hardware-side of the file system server according to an example implementation

FIG. 34 illustrates a request processing process performed at a file system management portion of the hardware-side of the file system server according to an example implementation.

In step S25, the file system management portion of the hardware-side of the file system server receives an FS inquiry either from the software-side (step S24) or directly as an autoinquiry from the data movement management portion of the hardware-side of the file system (S55).

In step S26, the file system management portion of the hardware-side of the file system server determines the file system ID of the file system to be accessed on the basis of the received FS inquiry.

In step S27, based on header information of the FS inquiry, the file system management portion of the hardware-side of the file system server determines the network ID, interface ID and/or virtual server ID.

In step S28, based on the IDs determined in steps S26 and/or S27 and metadata tables such as metadata tables MTD1, MTD2 and/or MTD3, the file system management portion of the hardware-side of the file system checks whether the corresponding entries exist so as to determine whether the IDs do match.

If step S28 returns NO, the file system management portion of the hardware-side of the file system server drops the packet in step S29.

In step S29, in some example implementations, the main aspect is that the packet request is not processed. In some example implementations, it is possible to further issue an alert notification to the software-side of the apparatus 1200, 1200A or 1200B, and/or to instruct the network interface portion to return a failure response to the client. Also, an entry in a failure log register may be created for later reference.

If step 28 returns YES, in step S30, the file system management portion of the hardware-side of the file system server processes the received FS inquiry and generates a respective appropriate files system response (FS response) in step S31.

In step S32, the file system management portion determines whether autoresponse is instructed or not (i.e. whether an autoresponse instruction is added to the received FS inquiry). If step S32 returns NO, the created FS response is sent back to the software-side of the file system server in step S33.

On the other hand, if step S32 returns YES (either because the packet is already processed as autoinquiry and the data movement management portion had instructed autoresponse, or because the software-side has instructed autoresponse), the file system management portion generates a response packet instruction based on the created FS response in step S56 and sends the created FS response and the created response packet instruction directly to the data movement management portion of the hardware-side of the file system server in step S57 without involvement of the software side in the generation of the response packet.

Figure 35A:
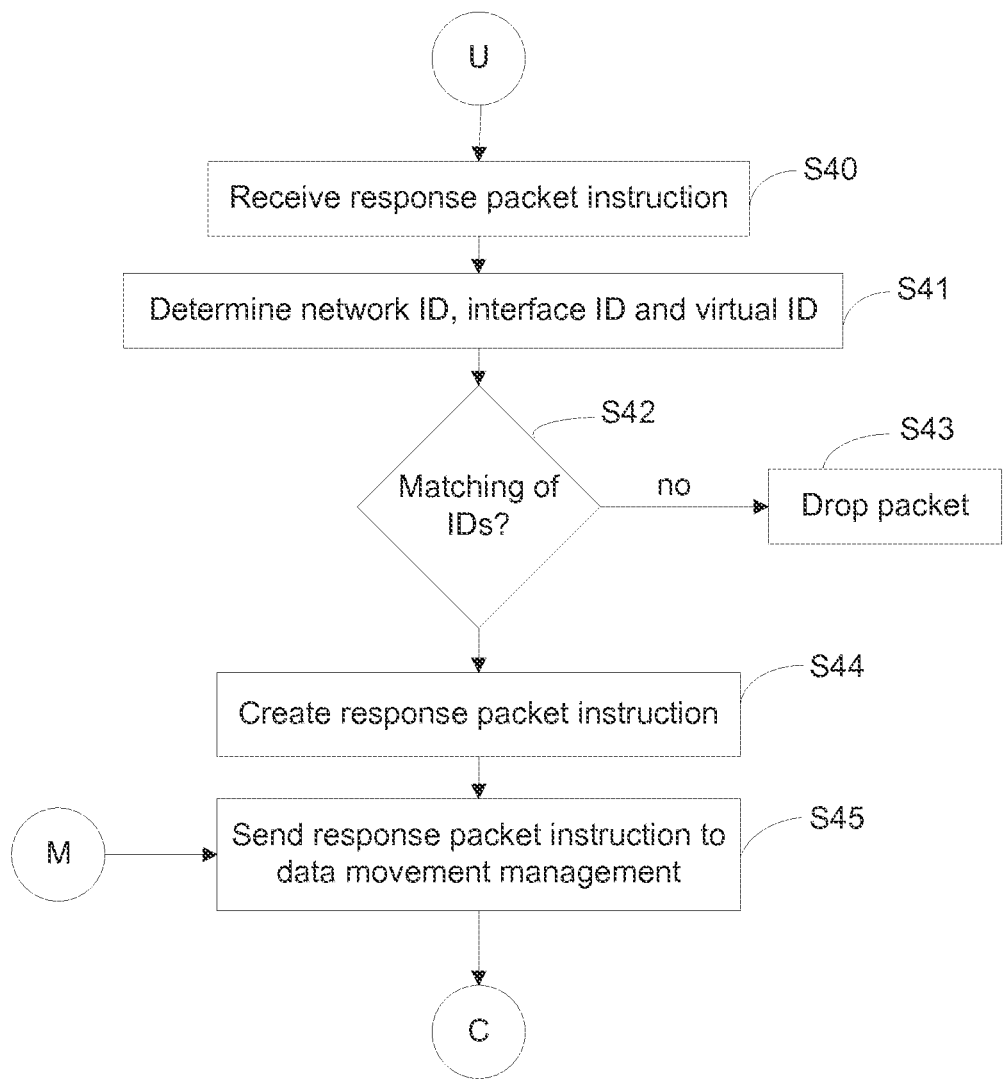
FIG. 35A illustrates a response processing process performed at the data movement management portion of the hardware-side of the file system server according to an example implementation.

FIG. 35A illustrates a response processing process performed at the data movement management portion of the hardware-side of the file system server according to an example implementation.

In step S40, the data movement management portion of the hardware-side of the file system server receives the response packet instruction either from the software-side (step S39) or from the file system management portion of the hardware-side of the file system server (step S57).

In step S41, based on header information of the response packet, the data movement management portion of the hardware-side of the file system server determines the network ID, interface ID and/or virtual server ID.

In step S42, based on the IDs determined in step S41 and metadata tables such as metadata tables MTD1, MTD2 and/or MTD3, the data movement management portion of the hardware-side of the file system checks whether the corresponding entries exist so as to determine whether the IDs do match.

If step S42 returns NO, the file system management portion of the hardware-side of the file system server drops the packet in step S43.

In step S43, in some example implementations, the main aspect is that the packet request is not processed. In some example implementations, it is possible to further issue an alert notification to the software-side of the apparatus 1200, 1200A or 1200B, and/or to instruct the network interface portion to return a failure response to the client. Also, an entry in a failure log register may be created for later reference.

If step 42 returns YES, the data movement management portion of the hardware-side of the file system server generates a response packet for the client on the basis of the received response packet instruction in step S44. Then, the data movement management portion sends the generated response packet to the network interface portion in step S45.

Figure 35B:
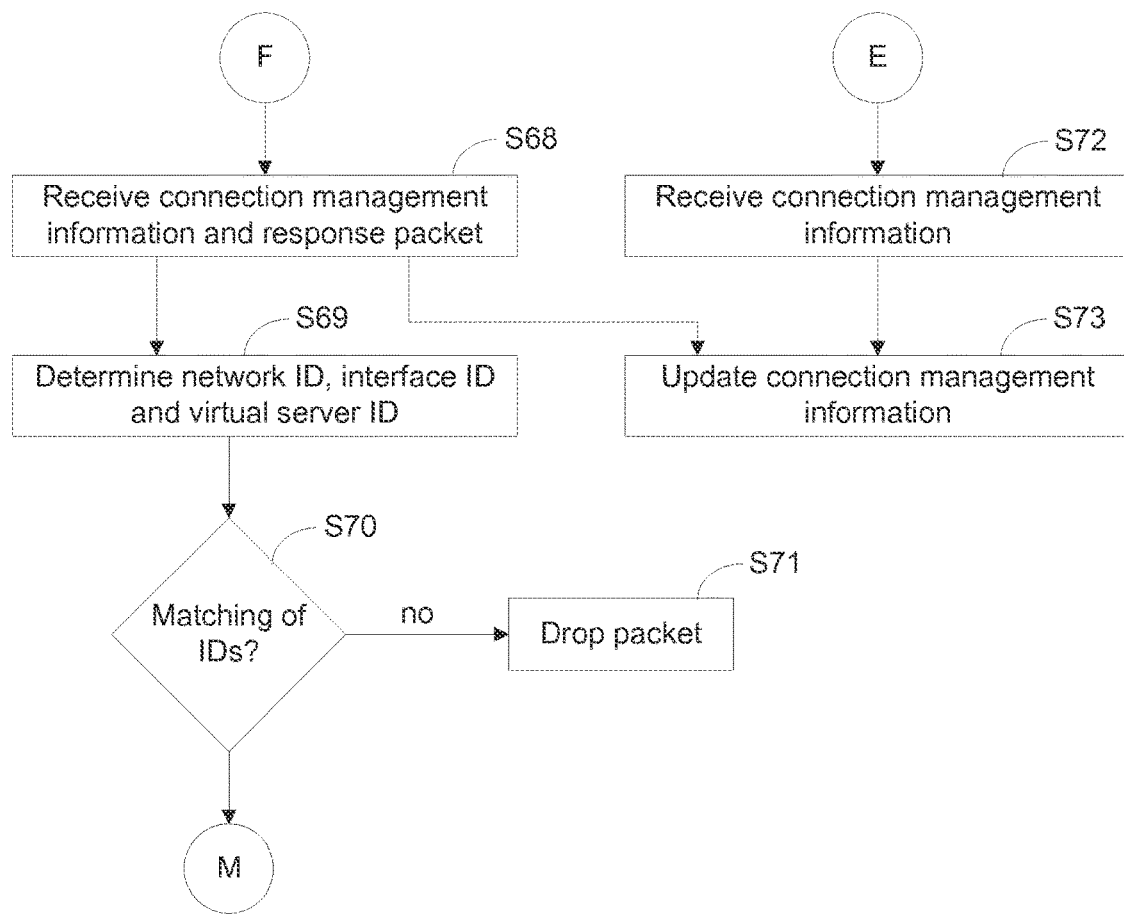
FIG. 35B illustrates a management process performed at the data movement management portion of the hardware-side of the file system server according to an example implementation.

FIG. 35B illustrates a management process performed at the data movement management portion of the hardware-side of the file system server according to an example implementation.

Upon a connection to the client has been opened first by the software-side, the data movement management portion either receives only management information about the opened connection in step S72 or management information about the opened connection and a prepared response packet in step S68, and then updates the management information about opened connection to clients by adding the management information about the newly opened connection in step S73. If the response packet has been received (step S68) and if step S70 returns YES, the response packet is send to the network interface portion of the hardware-side of the file system server (go to step S45).

Here, prior to step S45, the data movement management portion determines the network ID, interface ID and/or virtual server ID in step S69, based on header information of the response packet.

In step S70, based on the IDs determined in step S69 and metadata tables such as metadata tables MTD1, MTD2 and/or MTD3, the data movement management portion of the hardware-side of the file system checks whether the corresponding entries exist so as to determine whether the IDs do match.

If step S70 returns NO, the file system management portion of the hardware-side of the file system server drops the packet in step S71.

In step S71, in some example implementations, the main aspect is that the packet request is not processed. In some example implementations, it is possible to further issue an alert notification to the software-side of the apparatus 1200, 1200A or 1200B, and/or to instruct the network interface portion to return a failure response to the client. Also, an entry in a failure log register may be created for later reference.

Figure 36A:
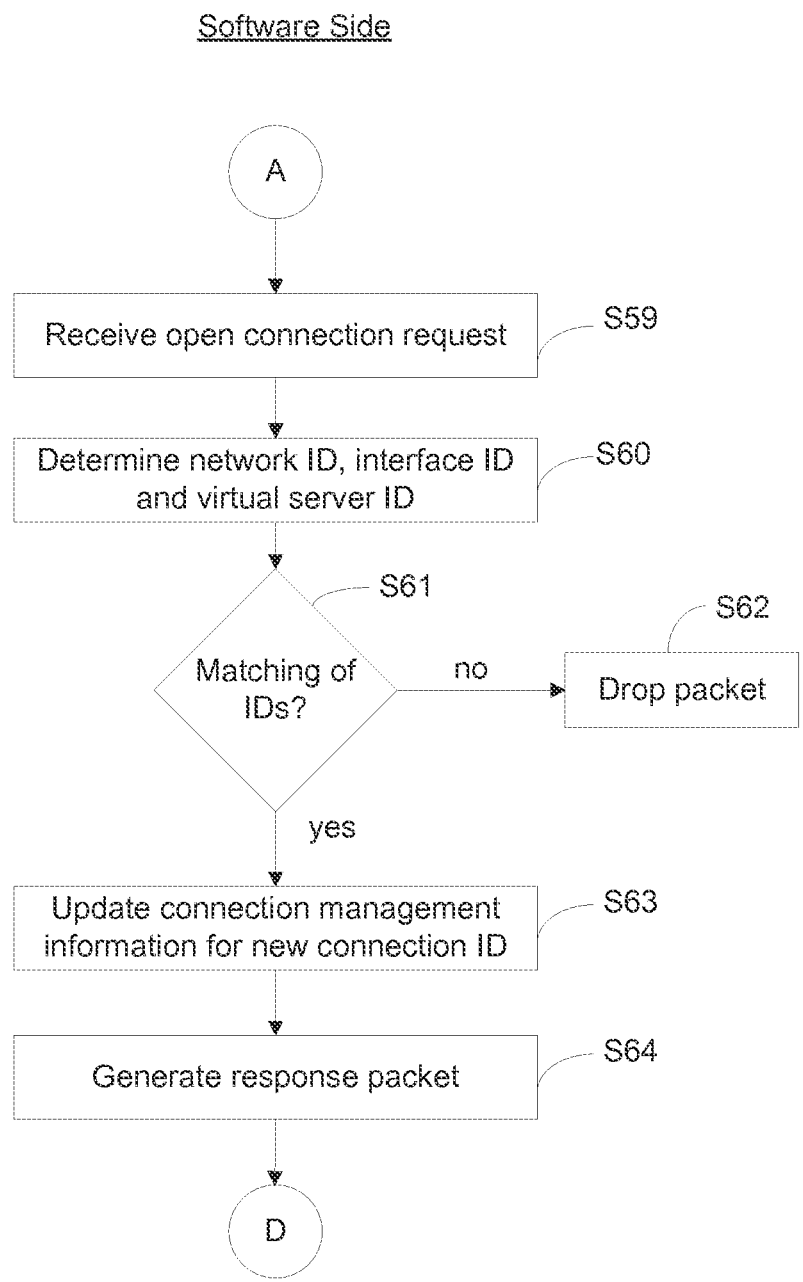
FIGS. 36A to 36C exemplarily show examples of open connection processes performed at the software-side of the file system server according to some example implementations.
Figure 36B:
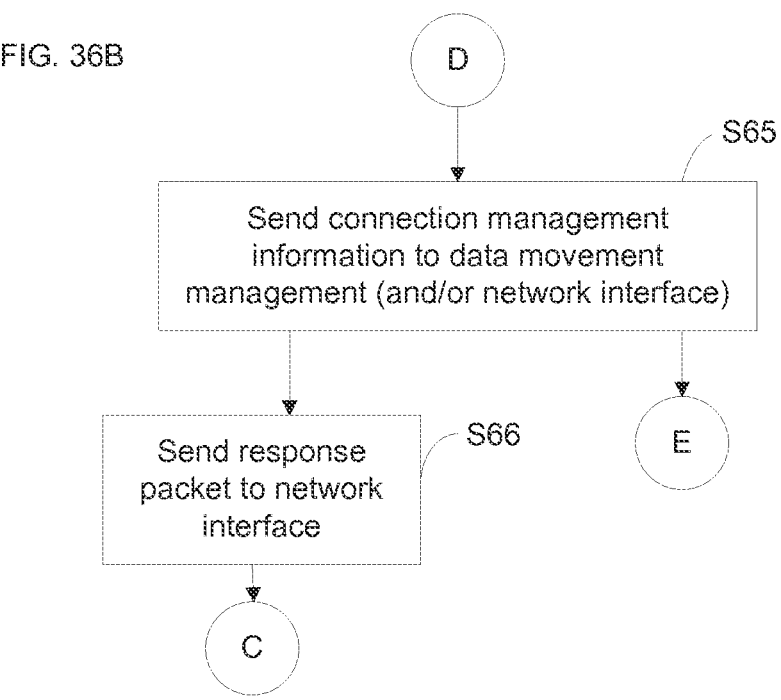
Figure 36C:
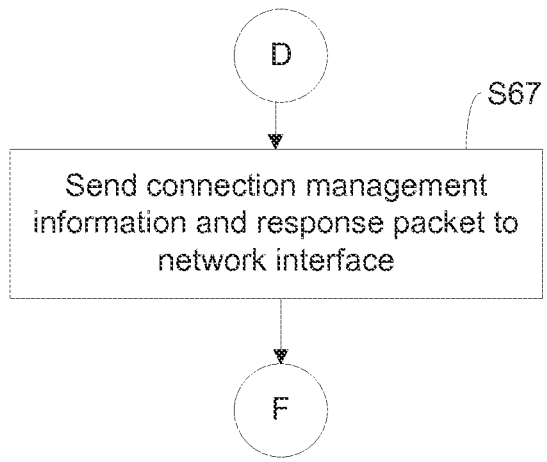

FIGS. 36A to 36C illustrate examples of open connection processes performed at the software-side of the file system server according to some example implementations.

As illustrated in FIG. 36A, in step S59, the software-side receives the open connection request (step S58)

In step S60, based on header information of the open connection request, the software-side of the file system server determines the network ID, interface ID and/or virtual server ID, and checks in step S61 whether a corresponding entry exists in one or more corresponding metadata tables such as e.g. metadata tables MTD1, MTD2 and/or MTD3 as discussed above so as to check whether the IDs do match. If step S61 returns NO, then the software-side of the file system server drops the packet in step S62.

In step S62, in some example implementations, the main aspect is that the packet request is not processed. In some example implementations, it is possible to further issue an alert notification to the hardware-side of the apparatus 1200, 1200A or 1200B, and/or to instruct the network interface portion to return a failure response to the client. Also, an entry in a failure log register may be created for later reference.

If step S61 returns YES, in step S63, the software-side updates connection management information for the new connection and provides a new connection ID to be included in the connection management information. Then, a response packet is generated in step S64 which includes the information about the connection ID.

Then, as illustrated in FIG. 36B, in some example implementations, the software-side sends connection management information about the new connection to the data movement management portion (and/or the network interface) in step S65 and sends the created response packet to the network interface portion in step S66.

Alternatively, as illustrated in FIG. 36C, in some example implementations, the software-side may send the connection management information about the new connection and the created response packet to the network interface in step S67.

Figure 37A:
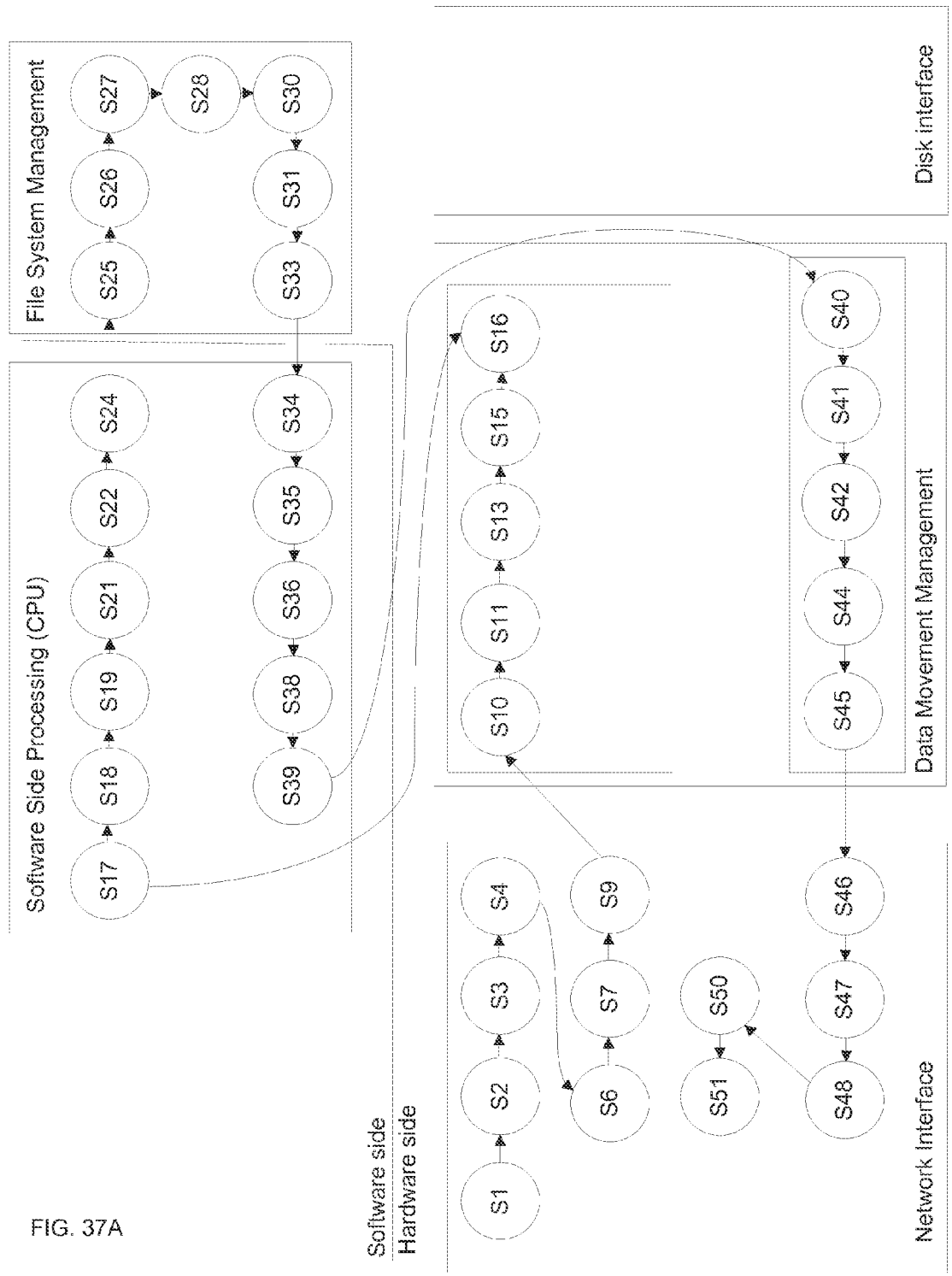
FIG. 37A illustrates a configuration of the file system server and the steps of the normal processing of a request packet according to an example implementation.

FIG. 37A illustrates a configuration of the file system server and the steps of the normal processing of a request packet. At first, the steps S1, S2, S3, S4, S6, S7 and S9 are performed at the network interface portion (hardware-side) and the steps S10, S11, S12, S13, S15 and S16 are performed at the data movement management portion (hardware-side).

Then, the processing is given over to the software-side which performs steps S17, S18, S19, S21, S22 and S24 (1st processing of software-side, avoided by autoinquiry).

The file system management portion (hardware-side) performs steps S25, S26, S27, S28, S30, S31 and S33 and gives over again to the software-side which performs steps S34, S35, S36, S38 and S39 (2nd processing of software side, avoided by autoinquiry and by autoresponse).

Then, the data movement management portion (hardware-side) performs steps S40, S41, S42, S44 and S45, and the network interface portion (hardware-side) performs steps S46, S47, S48, S50 and S51.

Figure 37B:
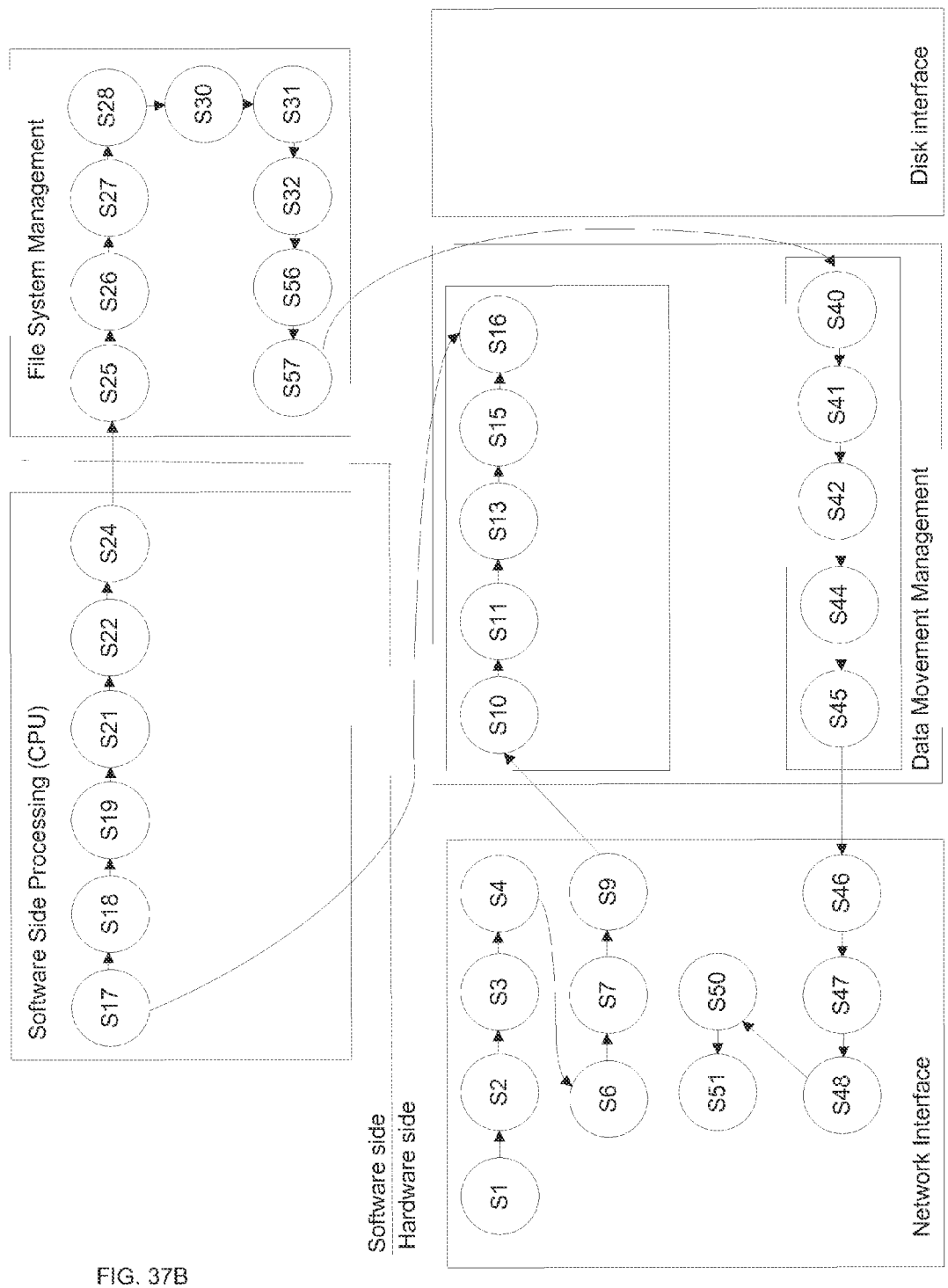
FIG. 37B illustrates a configuration of the file system server and the steps of the autoresponse processing of a request packet according to an example implementation.

FIG. 37B illustrates a configuration of the file system server and the steps of the autoresponse processing of a request packet, in accordance with an example implementation.

At first, the steps S1, S2, S3, S4, S6, S7 and S9 are performed at the network interface portion (hardware-side) and the steps S10, S11, S12, S13, S15 and S16 are performed at the data movement management portion (hardware-side).

Then, the processing is given over to the software-side which performs steps S17, S18, S19, S21, S22, S23B and S24 (1st processing of software side, avoided by autoinquiry).

The file system management portion (hardware-side) performs steps S25, S26, S27, S28, S30, S31, S32, S56 and S57.

Then, the data movement management portion (hardware-side) performs steps S40, S41, S42, S44 and S45, and the network interface portion (hardware-side) performs steps S46, S47, S48, S50 and S51.

Figure 37C:
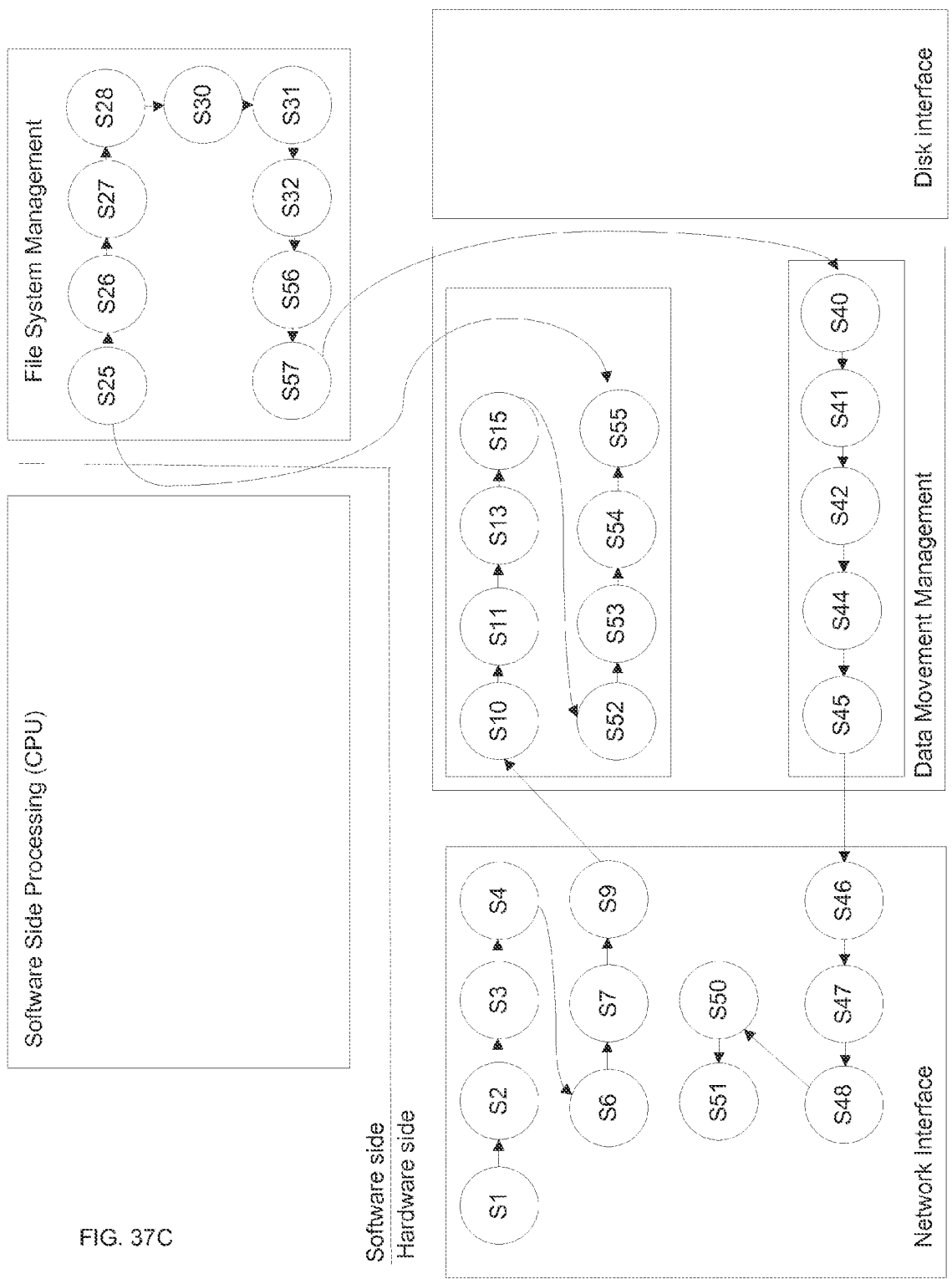
FIG. 37C illustrates a configuration of the file system server and the steps of the autoinquiry processing of a request packet according to an example implementation.

FIG. 37C illustrates a configuration of the file system server and the steps of the autoinquiry processing of a request packet, in accordance with an example implementation.

At first, the steps S1, S2, S3, S4, S6, S7 and S9 are performed at the network interface portion (hardware-side) and the steps S10, S11, S12, S13, S15, S52, S53, S54 and S55 are performed at the data movement management portion (hardware-side), and steps S25, S26, S27, S28, S30, S31, S32, S56 and S57 are performed by the file system management portion (hardware-side).

Then, the data movement management portion (hardware-side) performs steps S40, S41, S42, S44 and S45, and the network interface portion (hardware-side) performs steps S46, S47, S48, S50 and S51.

FIG. 38A to FIG. 38D illustrate request processing between a client/host computer and a file system server according to an example implementation. It is to be noted that example implementations as described above and below may relate to plural network protocols such as SMB (e.g. SMB1, SMB2, or higher), NFS (e.g. NFSv4[.1] or higher), RPCSEC_GSS, etc.

Figure 38A:
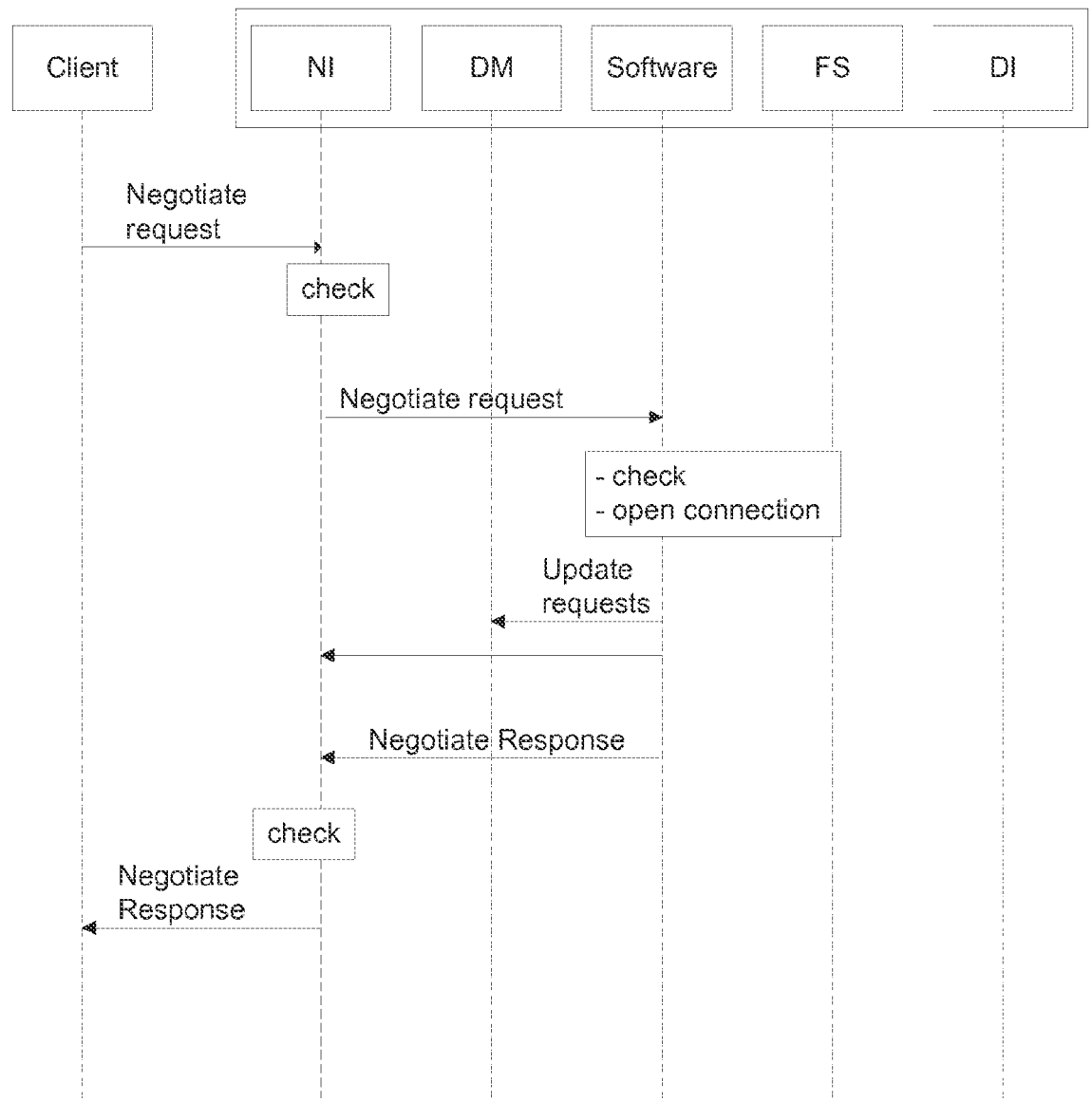
FIG. 38A to FIG. 38D exemplarily illustrate request processing between a client/host computer and a file system server according to an example implementation.

FIG. 38A illustrates request processing between a client/host computer and a file system server according to an example implementation in connection with an open connection request or NEGOTIATE request, e.g. such as SMB2_NEGOTIATE.

The client sends the NEGOTIATE request which is received at the network interface NI (hardware-side, e.g. having one or more programmable chips of the hardware-side processing device), see e.g. step S1 above, and the NEGOTIATE request is transferred to the software-side SW (software-side processing device), see e.g. S58 above, after a check is performed at the network interface NI as to whether the interface ID, network ID and client ID do match, e.g. according to steps S2 to S4 above.

Then, the software-side (software-side processing device) may do its own check based on a check the interface ID, network ID, client ID and/or virtual server ID of the header information do match, e.g. according to steps S60 to S61 above prior to opening the connection, and to send the management information to the data movement management portion DM (hardware-side). The NEGOTIATE response may then sent directly (or indirectly via the data movement management portion DM) to the network interface NI (hardware-side) and then to the client.

In addition, based on the newly opened connection, the software-side (software-side processing device) may update memories and/or registers on the hardware-side such as e.g.

the memories and registers of the network interface and/or the data movement management portion.

Prior to sending the NEGOTIATE response to the client, the network interface Ni may perform another check as to whether the interface ID, network ID and client ID do match.

Figure 38B:
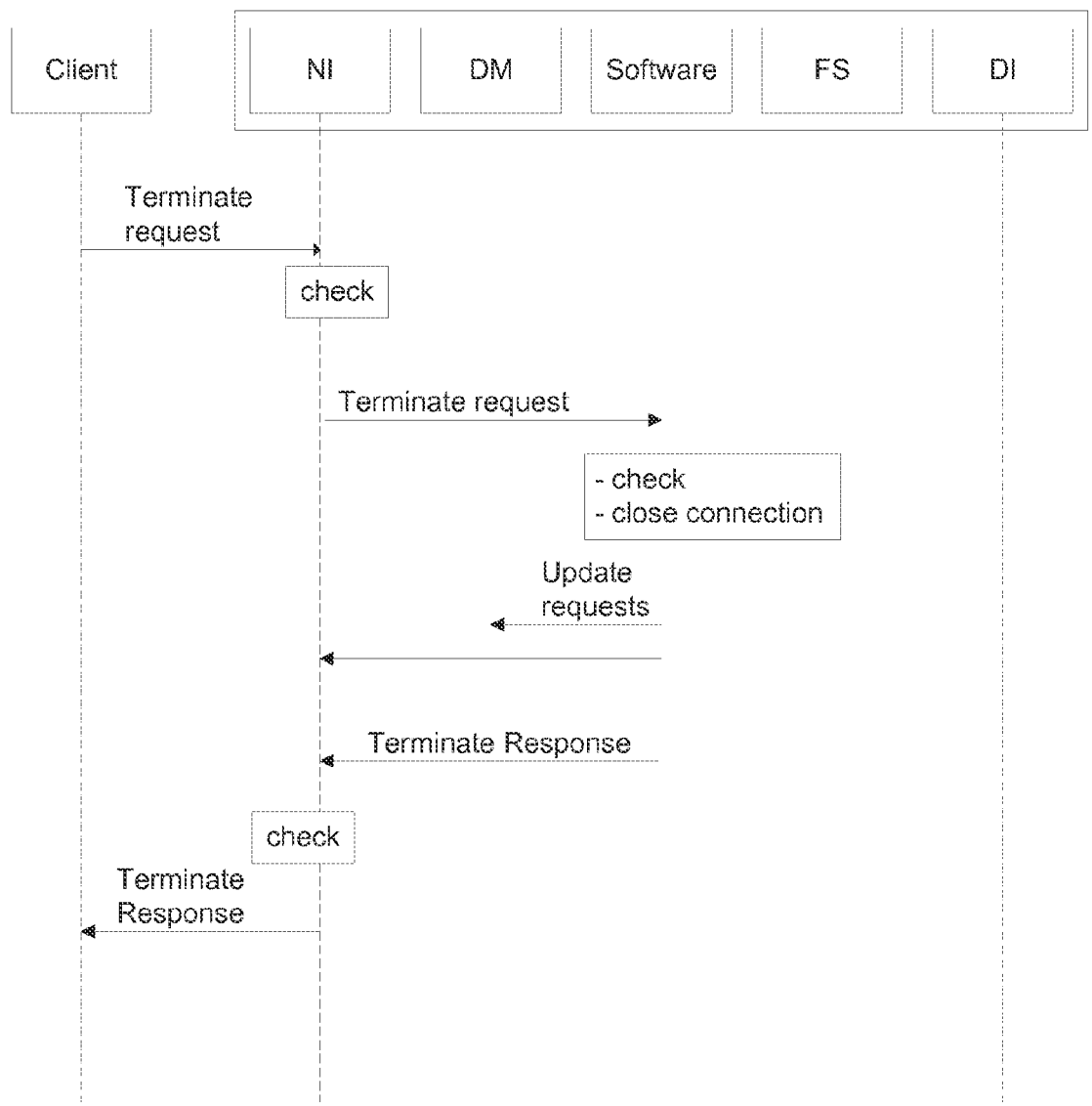

FIG. 38B illustrates request processing between a client/host computer and a file system server according to an example implementation in connection with a close connection request or TERMINATE request for closing an established connection.

The client sends the TERMINATE request which is received at the network interface NI (hardware-side, e.g. having one or more programmable chips of the hardware-side processing device), see e.g. step S1 above, and the TERMINATE request is transferred to the software-side (software-side processing device), e.g. analogous to S58 above, after a check is performed at the network interface NI as to whether the interface ID, network ID and client ID do match. If the IDs match, the TERMINATE request is transferred to the software-side, where the connection may be closed or terminated after the software side may perform its own multi-tenancy check based on the client ID, network ID, interface ID and/or virtual server ID, and the management information for informing the data movement management portion DM about termination of the connection is sent to the data movement management portion DM and the network interface NI (hardware-side) to update the memories or registers.

The data movement management portion DM and network interface NI (hardware-side) can then remove the management data in connection with the now closed connection from its memory or register in order to allow for storage space for new connections and management thereof.

The TERMINATE response generated by the software-side processing device SW is sent directly (or indirectly via the data movement management portion DM) to the network interface NI (hardware-side) and then to the client, potentially after another multi-tenancy check at the network interface based on the client ID, network ID, interface ID and/or virtual server ID.

Figure 38C:
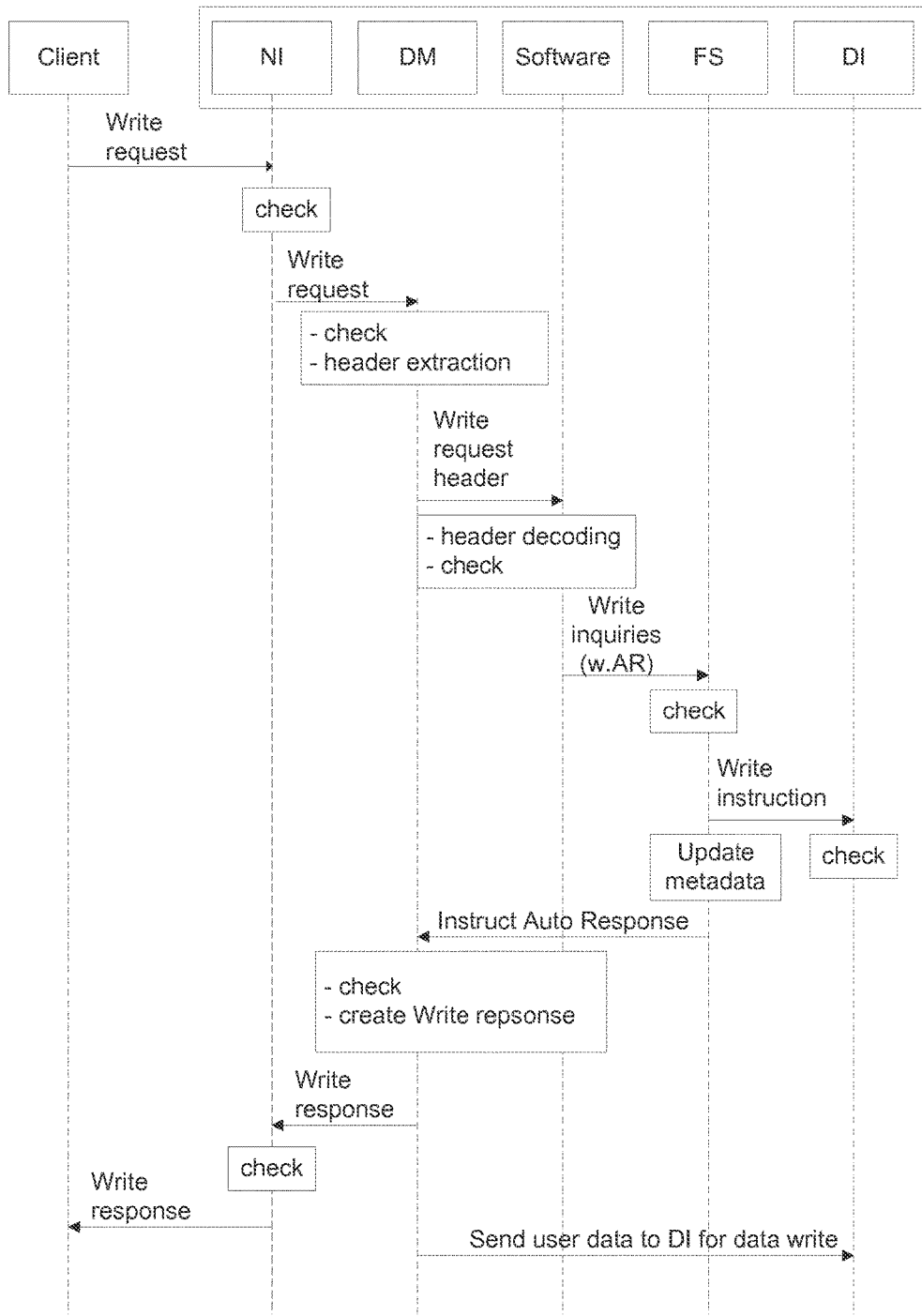

FIG. 38C exemplarily illustrates request processing between a client/host computer and a file system server according to an example implementation in connection with a WRITE request, e.g. such as SMB2_WRITE.

It is to be noted that FIG. 38C assumes that autoresponse is enabled for SMB2_WRITE. Also, it is to be noted that a similar process could be provided, in addition to a WRITE request, in connection with other modifying commands such as a Metadata modifying command such as e.g. SMB2_SET_INFO.

The client sends the WRITE request (e.g. SMB2_WRITE) which is received at the network interface NI (hardware-side, e.g. having one or more programmable chips of the hardware-side processing device), see e.g. step S1 above, and the WRITE request is transferred to the data movement management portion DM of the hardware-side (e.g. having one or more programmable chips of the hardware-side processing device) after a multi-tenancy check at the network interface based on the client ID, network ID, interface ID and/or virtual server ID.

At the data movement management portion DM of the hardware-side, header extraction and an optional multi-tenancy check based on the client ID, network ID, interface ID and/or virtual server ID is performed.

The extracted WRITE header is sent to the software-side for decoding of the received WRITE header at the software-side and for sending a created file system inquiry (internal WRITE inquiry, e.g. WFILE_WRITE) to the file system management portion FS of the hardware-side (including an autoresponse instruction) after another optional multi-tenancy check based on the client ID, network ID, interface ID and/or virtual server ID at the software-side.

According to the received internal WRITE inquiry, after another optional multi-tenancy check based on the client ID, network ID, interface ID and/or virtual server ID, the file system management portion FS of the hardware-side issues a corresponding WRITE instruction to the disk interface portion DI of the hardware-side (for writing the corresponding data to disk and/or cache, at least upon receipt of the corresponding user data/write data from the data movement management portion DM, such processing may however be performed later and asynchronously).

Also, the file system management portion FS of the hardware-side updates file system metadata and file system object metadata according to the issued WRITE instruction and instructs an Autoresponse to the data movement management portion DM of the hardware-side.

The data movement management portion DM of the hardware-side generates, based on the received Autoresponse instruction, the corresponding WRITE response packet and sends the WRITE response packet to the network interface NI of the hardware-side after another optional multi-tenancy check based on the client ID, network ID, interface ID and/or virtual server ID.

That is, the WRITE response generated by the data movement management portion DM of the hardware-side is sent to the network interface NI (hardware-side) and then to the client after another multi-tenancy check based on the client ID, network ID, interface ID and/or virtual server ID at the network interface.

Figure 38D:
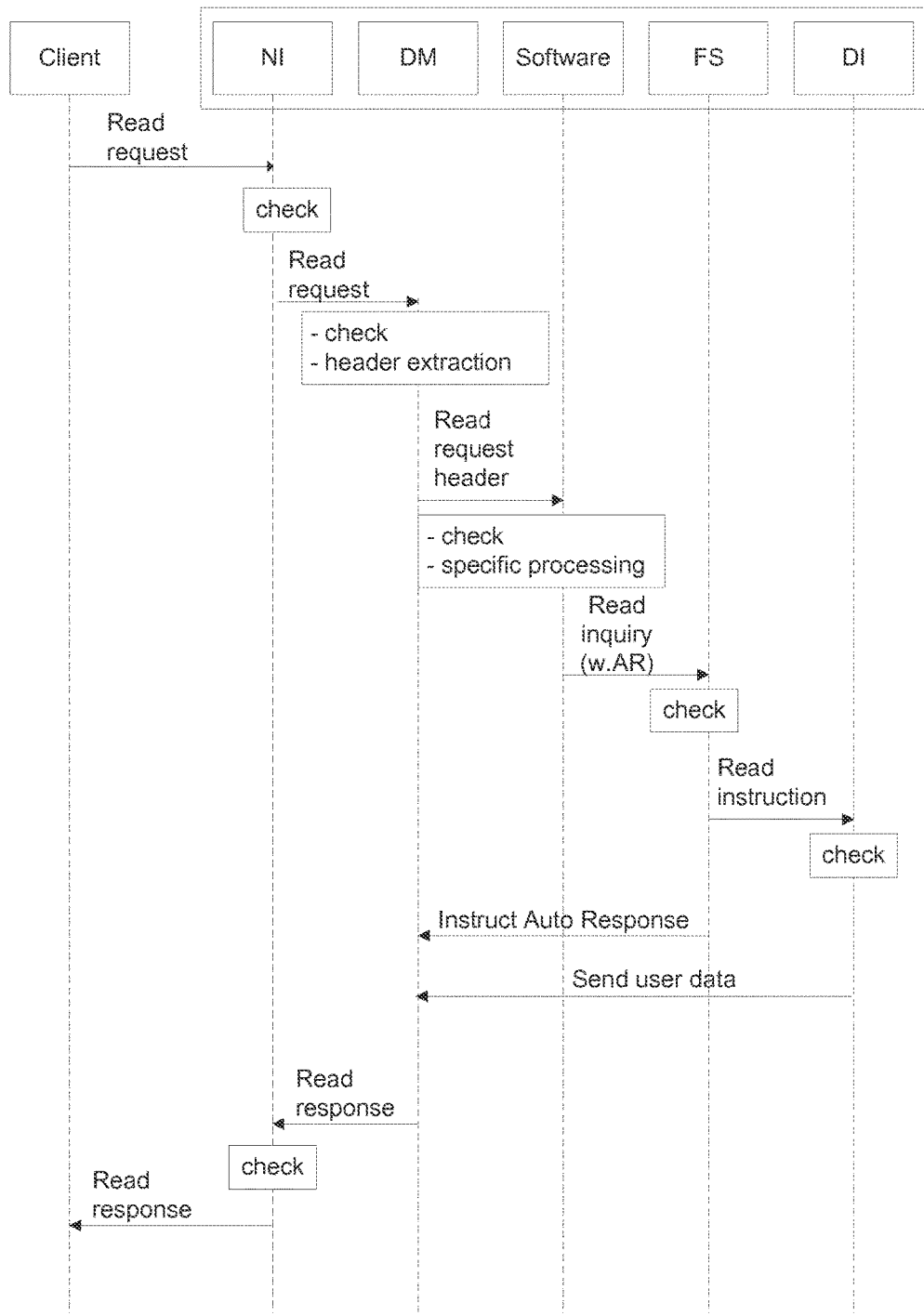

FIG. 38D illustrates request processing between a client/host computer and a file system server according to an example implementation in connection with a READ request, e.g. such as SMB2_READ, however in connection with a previously non-opened file.

It is to be noted that FIG. 38D assumes that autoinquiry is enabled for SMB2_READ, but the request is still executed according to autoresponse only because the target file of the read request is not yet opened, and the software side is responsible in some embodiments for opening a file. Also, it is to be noted that a similar process could be provided in addition to a READ request in connection with other non-modifying commands such as a Metadata obtaining commands such as e.g. SMB2_QUERY_INFO to metadata of a non-opened file or SMB2_QUERY_DIRECTORY to metadata of a directory.

The client sends the READ request (e.g. SMB2_READ) which is received at the network interface NI (hardware-side. e.g. having one or more programmable chips of the hardware-side processing device), see e.g. step S1 above, and the READ request is transferred to the data movement management portion DM of the hardware-side (e.g. having one or more programmable chips of the hardware-side processing device) after a multi-tenancy check based on the client ID, network ID, interface ID and/or virtual server ID.

At the data movement management portion DM of the hardware-side, after another optional multi-tenancy check based on the client ID, network ID, interface ID and/or virtual server ID, header extraction is performed.

Since it can be determined in the open file table that the target file is not yet opened, although autoinquiry may generally enabled for READ requests, autoinquiry is not performed, and the extracted READ header is sent to the software-side after another optional multi-tenancy check based on the client ID, network ID, interface ID and/or virtual server ID for decoding of the received READ header at the software-side and for sending a created file system inquiry (internal READ inquiry. e.g. WFILE_READ) to the file system management portion FS of the hardware-side (including an autoresponse instruction) upon carrying out the open file processing and after another optional multi-tenancy check based on the client ID, network ID, interface ID and/or virtual server ID.

In addition, the software side SW sends management information (including a file ID of the opened file) to the data movement management portion DM which then may update the open file table accordingly.

According to the received internal READ inquiry, the file system management portion FS of the hardware-side issues a corresponding READ instruction to the disk interface portion DI of the hardware-side (for reading the corresponding data from disk and/or cache) after another optional multi-tenancy check based on the client ID, network ID, interface ID and/or virtual server ID. Also, the file system management portion FS of the hardware-side instructs an Autoresponse to the data movement management portion DM of the hardware-side.

The data movement management portion DM of the hardware-side generates, based on the received Autoresponse instruction and based on the READ user data sent from the disk interface, the corresponding READ response packet (including the READ user data) and sends the READ response packet to the network interface NI of the hardware-side after another optional multi-tenancy check based on the client ID, network ID, interface ID and/or virtual server ID. That is, the READ response generated by the data movement management portion DM of the hardware-side is sent to the network interface NI (hardware-side) and then to the client after another multi-tenancy check based on the client ID, network ID, interface ID and/or virtual server ID at the network interface.

FIG. 38E exemplarily illustrates request processing between a client/host computer and a file system server according to an example implementation in connection with a READ request, e.g. such as SMB2_READ, however in connection with an already opened file. It is to be noted that FIG. 47E assumes that autoinquiry is enabled for SMB2_READ.

Also, it is to be noted that a similar process could be provided in addition to a READ request in connection with other non-modifying commands such as a Metadata obtaining commands such as e.g. SMB2_QUERY_INFO to metadata of an opened file or SMB2_QUERY_DIRECTORY to metadata of a directory.

The client sends the READ request (e.g. SMB2_READ) which is received at the network interface NI (hardware-side, e.g. having one or more programmable chips of the hardware-side processing device), see e.g. step S above, and the READ request is transferred to the data movement management portion DM of the hardware-side (e.g. having one or more programmable chips of the hardware-side processing device) after a multi-tenancy check based on the client ID, network ID, interface ID and/or virtual server ID at the network interface.

At the data movement management portion DM of the hardware-side, header extraction is performed after another optional multi-tenancy check based on the client ID, network ID, interface ID and/or virtual server ID.

Since it can be determined in the open file table that the target file is already opened, autoinquiry is performed at the data movement management portion DM of the hardware-side, and the extracted READ header is used to perform generation of a corresponding internal file system inquiry (e.g. internal READ inquiry, e.g. WFILE_READ) and, after another optional multi-tenancy check based on the client ID, network ID, interface ID and/or virtual server ID, the created file system inquiry (internal READ inquiry. e.g. WFILE_READ) is sent to the file system management portion FS of the hardware-side (including an autoresponse instruction).

According to the received internal READ inquiry, the file system management portion FS of the hardware-side issues a corresponding READ instruction to the disk interface portion DI of the hardware-side (for reading the corresponding data from disk and/or cache) after another optional multi-tenancy check based on the client ID, network ID, interface ID and/or virtual server ID. Also, the file system management portion FS of the hardware-side instructs an Autoresponse to the data movement management portion DM of the hardware-side.

The data movement management portion DM of the hardware-side generates, based on the received Autoresponse instruction and based on the READ user data sent from the disk interface, the corresponding READ response packet (including the READ user data) and sends the READ response packet to the network interface NI of the hardware-side after another optional multi-tenancy check based on the client ID, network ID, interface ID and/or virtual server ID.

That is, the READ response generated by the data movement management portion DM of the hardware-side is sent to the network interface NI (hardware-side) and then to the client after another multi-tenancy check based on the client ID, network ID), interface ID and/or virtual server ID at the network interface.

In the above examples, multi-tenancy checks based on the client ID, network ID, interface ID and/or virtual server ID have been performed at multiple involved units, modules and/or portions, however, it is to be noted that this is not limited and in some example implementations the check is done only once, or more often. For example, in some embodiments, the multi-tenancy checks are only performed at the network interface for incoming packets and/or for outgoing packets.

It should be noted that headings are used above for convenience and readability of the detailed description and are not to be construed as limiting the present disclosure in any way.

Finally, some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating." "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A server configured to manage one or more storage systems, the server comprising:
    a first type processing device comprising a memory configured to store a request associated with a client for deletion of a directory tree representative of a directory stored in the one or more storage systems;
    a second type processing device comprising one or more programmable hardware implemented chips, the second type processing device configured to:
        move the directory tree to an isolated portion of the one or more storage systems, the isolated portion configured to be inaccessible by the associated client;
        read each of one or more objects of the directory tree;
        for a work queue of the server not exceeding a threshold, push the each of the one or more objects of the directory tree into the work queue;
        for the work queue exceeding the threshold, remove all objects of the directory tree from the work queue; and
        for the work queue having at least one object of the one or more objects of the directory tree, pop an object of the one or more objects of the directory tree from the work queue to a thread process configured to delete a directory tree object;
    wherein the second type processing device is configured to implement the thread process configured to delete the directory tree object by:
        for the popped object being a subdirectory object, pushing the popped object into a subtree queue;
        wherein for the second type processing device managing the subtree queue, copy the last pushed object in the subtree queue into the work queue.

2. The server of claim 1, wherein for the subtree queue exceeding a predetermined threshold, the second type processing device is configured to pop an oldest object of the subtree queue and cancel a delete operation of the directory tree.

3. The server of claim 1, wherein the second type processing device is further configured to:
    for the subtree queue being empty, push the one or more objects of the directory tree into the work queue.

4. The server of claim 1, wherein the first type processing device is configured to manage the work queue and the subtree queue in the memory; wherein the second type processing device is configured to utilize the one or more programmable hardware implemented chips to interact with the memory to facilitate operations on the work queue and the subtree queue, the one or more programmable chips further configured to facilitate functionality of the thread process.

5. The server of claim 1, wherein the second type processing device is further configured to:
    execute the thread process with the at least one or more programmable hardware implemented chip on the popped object, the thread process configured to:
        for the popped object being a file, delete the file,
        for the popped object being a directory, create the subdirectory object and push the subdirectory object into the work queue.

6. A server configured to manage one or more storage systems, the server comprising:
    a first type processing device comprising a memory configured to store a deletion request of a directory tree representative of a directory stored in the one or more storage systems; and
    a second type processing device comprising one or more programmable hardware implemented chips, the second type processing device configured to:
        read one or more objects of the directory and push each of the one or more objects in a first queue;
        for the each of the one or more objects being indicative of a subdirectory:

create a directory work item and for the first queue having a number of objects not exceeding a threshold and push the directory work item into the first queue;
for the first queue having a number of objects exceeding a threshold:
push the directory work item into a second queue, the second queue implemented in a last in first out manner; and
remove all objects in the first queue.

7. The server of claim 6, wherein the second type processing device is configured to implement a thread process configured to delete the directory tree object by:
popping an object from the first queue;
for the popped object being the directory work item, pushing the popped object into the second queue;
wherein for the second type processing device managing the second queue, copy the last pushed object in the second queue into the first queue.

8. The server of claim 7, wherein for the second queue exceeding a predetermined threshold, the second type processing device is configured to pop an oldest object of the second queue and cancel a delete operation of the directory tree.

9. The server of claim 7, wherein the second type processing device is further configured to:
for the second queue being empty, push the one or more objects of the directory tree into the first queue.

10. The server of claim 7, wherein the first type processing device is configured to manage the first queue and the second queue in the memory; wherein the second type processing device is configured to utilize the one or more programmable hardware implemented chips to interact with the memory to facilitate operations on the first queue and the second queue, the one or more programmable chips further configured to facilitate functionality of the thread process.

11. The server of claim 7, wherein the second type processing device is further configured to:
execute the thread process with the at least one or more programmable hardware implemented chip on the popped object, the thread process configured to:
for the popped object being a file, delete the file,
for the popped object being a directory, create a subdirectory object and push the subdirectory object into the second queue.

12. The server of claim 6, wherein the second type processing device is configured to move the directory tree to an isolated portion of the one or more storage systems, the isolated portion configured to be inaccessible by a client associated with the directory tree.

13. A server configured to manage one or more storage systems, the server comprising:
a first type processing device comprising a memory configured to store a request associated with a client for deletion of a directory tree representative of a directory stored in the one or more storage systems;
a second type processing device comprising one or more programmable hardware implemented chips, the second type processing device configured to:
move the directory tree to an isolated portion of the one or more storage systems, the isolated portion configured to be inaccessible by the associated client;
read each of one or more objects of the directory tree;
for a work queue of the server not exceeding a threshold, push the each of the one or more objects of the directory tree into the work queue;
for the work queue exceeding the threshold, remove all objects of the directory tree from the work queue; and
for the work queue having at least one object of the one or more objects of the directory tree, pop an object of the one or more objects of the directory tree from the work queue to a thread process configured to delete a directory tree object;
wherein the second type processing device is further configured to:
execute the thread process with the at least one or more programmable hardware implemented chip on the popped object, the thread process configured to:
for the popped object being a file, delete the file,
for the popped object being a directory, create a subdirectory object and push the subdirectory object into the work queue.

14. The server of claim 13, wherein the second type processing device is configured to implement the thread process configured to delete the directory tree object by:
for the popped object being the subdirectory object, pushing the popped object into a subtree queue;
wherein for the second type processing device managing the subtree queue, copy the last pushed object in the subtree queue into the work queue.

15. The server of claim 14, wherein for the subtree queue exceeding a predetermined threshold, the second type processing device is configured to pop an oldest object of the subtree queue and cancel a delete operation of the directory tree.

16. The server of claim 14, wherein the second type processing device is further configured to:
for the subtree queue being empty, push the one or more objects of the directory tree into the work queue.

17. The server of claim 14, wherein the first type processing device is configured to manage the work queue and the subtree queue in the memory; wherein the second type processing device is configured to utilize the one or more programmable hardware implemented chips to interact with the memory to facilitate operations on the work queue and the subtree queue, the one or more programmable chips further configured to facilitate functionality of the thread process.

* * * * *